United States Patent
Holman et al.

(10) Patent No.: US 10,053,280 B2
(45) Date of Patent: Aug. 21, 2018

(54) SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE

(71) Applicant: Elwha LLC, Bellevue, WA (US)

(72) Inventors: Pablos Holman, Seattle, WA (US); Roderick A. Hyde, Redmond, WA (US); Muriel Y. Ishikawa, Livermore, CA (US); Jordin T. Kare, Seattle, WA (US); Max R. Levchin, San Francisco, CA (US); Royce A. Levien, Lexington, MA (US); Richard T. Lord, Gig Harbor, WA (US); Robert W. Lord, Seattle, WA (US); Mark A. Malamud, Seattle, WA (US); Nathan P. Myhrvold, Bellevue, WA (US); Robert C. Petroski, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/144,163

(22) Filed: Dec. 30, 2013

(65) Prior Publication Data

US 2015/0186966 A1    Jul. 2, 2015

(51) Int. Cl.
B65D 85/00    (2006.01)
G07F 17/00    (2006.01)
(Continued)

(52) U.S. Cl.
CPC ......... *B65D 85/70* (2013.01); *G06Q 30/0621* (2013.01); *G07F 9/023* (2013.01);
(Continued)

(58) Field of Classification Search
CPC ........... G06Q 30/0601–30/0645; G06Q 30/08; G06Q 50/12; B65D 81/34; B65D 85/70;
(Continued)

(56) References Cited

U.S. PATENT DOCUMENTS 5,147,068 A    9/1992  Wright
5,997,924 A    12/1999 Olander, Jr. et al.
(Continued)

OTHER PUBLICATIONS

EatWaveTM Vending Launches the Industry's First "All-in-One" Vending Machine for Hot and Cold Food Items as well as Snacks and Drinks, Nov. 6, 2012, Business Wire (Year: 2012).*
(Continued)

Primary Examiner — Brandy A Zukanovich
Assistant Examiner — Brittney N Miller

(57) ABSTRACT

Computationally implemented methods and systems include acquiring user information associated with one or more users for preparing one or more customized food items for the one or more users, the user information including one or more user preferences related to integrity of one or more food ingredients to be included in the one or more customized food items; and directing generation of one or more customized packagings for holding the one or more customized food items of the one or more users, the one or more customized packagings having one or more features that are customized based, at least in part, on the acquired user information. In addition to the foregoing, other aspects are described in the claims, drawings, and text.

43 Claims, 41 Drawing Sheets

(51) Int. Cl.
*G07F 17/26* (2006.01)
*G06Q 30/06* (2012.01)
*G07F 9/02* (2006.01)
*G07F 11/70* (2006.01)
*G06Q 50/12* (2012.01)

(52) U.S. Cl.
CPC .......... *G07F 11/70* (2013.01); *G07F 17/0064* (2013.01); *G07F 17/0092* (2013.01); *G07F 17/26* (2013.01); *G06Q 50/12* (2013.01)

(58) Field of Classification Search
CPC ......... B65D 25/22; G07F 9/023; G07F 11/70; G07F 17/0064; G07F 17/0092; G07F 17/26
USPC .................. 705/26.1–27.2, 15; 700/231, 235
See application file for complete search history.

(56) References Cited

U.S. PATENT DOCUMENTS

| | | | |
|---|---|---|---|
| 6,646,659 B1* | 11/2003 | Brown | G06Q 30/02 705/15 |
| 6,662,195 B1 | 12/2003 | Langseth et al. | |
| 7,076,438 B1* | 7/2006 | Tobelmann | G06F 19/3475 128/921 |
| 7,421,285 B1* | 9/2008 | Rao | G06F 3/023 455/556.1 |
| 8,255,699 B2 | 8/2012 | Tagscherer | |
| 8,429,026 B1 | 4/2013 | Kolawa et al. | |
| 8,504,440 B1 | 8/2013 | Kolawa et al. | |
| 8,751,334 B2 | 6/2014 | Wijaya et al. | |
| 8,863,649 B1 | 10/2014 | Rao et al. | |
| 9,172,738 B1 | 10/2015 | daCosta | |
| 9,239,246 B2 | 1/2016 | Jones | |
| 2001/0011680 A1 | 8/2001 | Soltesz et al. | |
| 2002/0081356 A1 | 6/2002 | Bebiak et al. | |
| 2003/0006281 A1 | 1/2003 | Thomas et al. | |
| 2003/0028885 A1 | 2/2003 | Wilcox et al. | |
| 2003/0061094 A1 | 3/2003 | Banerjee et al. | |
| 2004/0238555 A1* | 12/2004 | Parks | G07F 9/105 221/80 |
| 2005/0267811 A1 | 12/2005 | Almblad | |
| 2006/0188620 A1 | 8/2006 | Gutwein et al. | |
| 2007/0112460 A1* | 5/2007 | Kiselik | G06Q 30/02 700/233 |
| 2007/0231425 A1 | 10/2007 | Ream et al. | |
| 2007/0294129 A1* | 12/2007 | Froseth | G06Q 10/08 705/7.32 |
| 2008/0012726 A1 | 1/2008 | Publicover | |
| 2009/0077007 A1 | 3/2009 | Schwarzberg et al. | |
| 2009/0204492 A1* | 8/2009 | Scifo | G06Q 30/0236 705/14.36 |
| 2009/0228325 A1 | 9/2009 | Simmons et al. | |
| 2009/0275075 A1* | 11/2009 | Dodd | C12Q 1/22 435/34 |
| 2010/0255484 A1* | 10/2010 | Halverson | G01N 1/38 435/6.1 |
| 2011/0208617 A1 | 8/2011 | Weiland | |
| 2011/0238296 A1 | 9/2011 | Purks et al. | |
| 2012/0102993 A1 | 5/2012 | Hortin | |
| 2012/0226698 A1 | 9/2012 | Silvestre et al. | |
| 2012/0239683 A1 | 9/2012 | Starkman | |
| 2012/0323691 A1 | 12/2012 | McLaughlin et al. | |
| 2013/0024299 A1 | 1/2013 | Wong et al. | |
| 2013/0029693 A1 | 1/2013 | Bradley, Jr. et al. | |
| 2013/0054016 A1* | 2/2013 | Canter | G06Q 30/0269 700/237 |
| 2013/0085345 A1* | 4/2013 | Geisner | G06Q 30/00 600/300 |
| 2013/0218687 A1* | 8/2013 | Sohangir | G06F 17/30867 705/14.66 |
| 2013/0311311 A1* | 11/2013 | Chopra | G06Q 30/018 705/15 |
| 2013/0317921 A1 | 11/2013 | Havas | |
| 2014/0037805 A1 | 2/2014 | Minvielle | |
| 2014/0080102 A1* | 3/2014 | Krishna | G06Q 30/02 434/127 |
| 2014/0108320 A1 | 4/2014 | Baca et al. | |
| 2015/0058063 A1 | 2/2015 | Pinel et al. | |
| 2015/0227140 A1 | 8/2015 | Douglas et al. | |

OTHER PUBLICATIONS

"Burritobot: A 3-D Printer That Spits Out Burritos"; bearing a date of Jun. 19, 2012; retrieved on Aug. 26, 2015; pp. 1-9; located at: http://www.fastcodesign.com/1670070/burritobot-a-3-d-printer-that-spits-out-burritos (hereinafter "Burritobot").

"Inside Redbox Mobile Demo"; bearing a date of Feb. 1, 2009; uploaded to YouTube by habdeira; retrieved on Aug. 27, 2015; 1 page; located at: https://www.youtube.come/watch?v=iroan2BtzDc ("Redbox").

"Say Hello to Burritobox, The World's First Burrito Vending Machine"; bearing a date of Jan. 8, 2014; updated on Jan. 23, 2014; pp. 1-3.

Andersen; "Freshly Baked Pizzas . . . from a Vending Machine?"; bearing a date of Aug. 27, 2013; pp. 1-2; located at: http://slice.seriouseats.com/archives/2013/08/freshly-baked-pizzasfrom-a-vending-machine.html.

pizzamarketplace.com; "Let's Pizza vending machine ready for U.S. debut"; bearing a date of Jun. 5, 2017; pp. 1-2; located at: https://www.pizzamarketplace.com/articles/lets-pizza-vending-machine-ready-for-us-debut/.

* cited by examiner

Hard implementation

**304\* Customized Packaging Generation Controlling Module**

420 Instruction Providing Module

422 Component Control Module

424 Customized Information Label Printing Controlling Module

426 Label Affixing Controlling Module

428 Customized Information Packaging Printing Controlling Module

430 User Related Information Customized Packaging Generation Controlling Module

432 User Identified Customized Packaging Generation Controlling Module

434 Secondary User Information Customized Packaging Generation Controlling Module 436 User Related Dietary Information Customized Packaging Generation Controlling Module 438 Customized Food Item Related Information Customized Packaging Generation Controlling Module 440 Packaging Selecting Module

FIG. 4B

325' Robotic Packing System

160 Customized Food Item Placement System

162 Customized Packaging Wrapping System

FIG. 4G

325" Robotic Packing System

164 Customized Food Item Deposition System

FIG. 4H

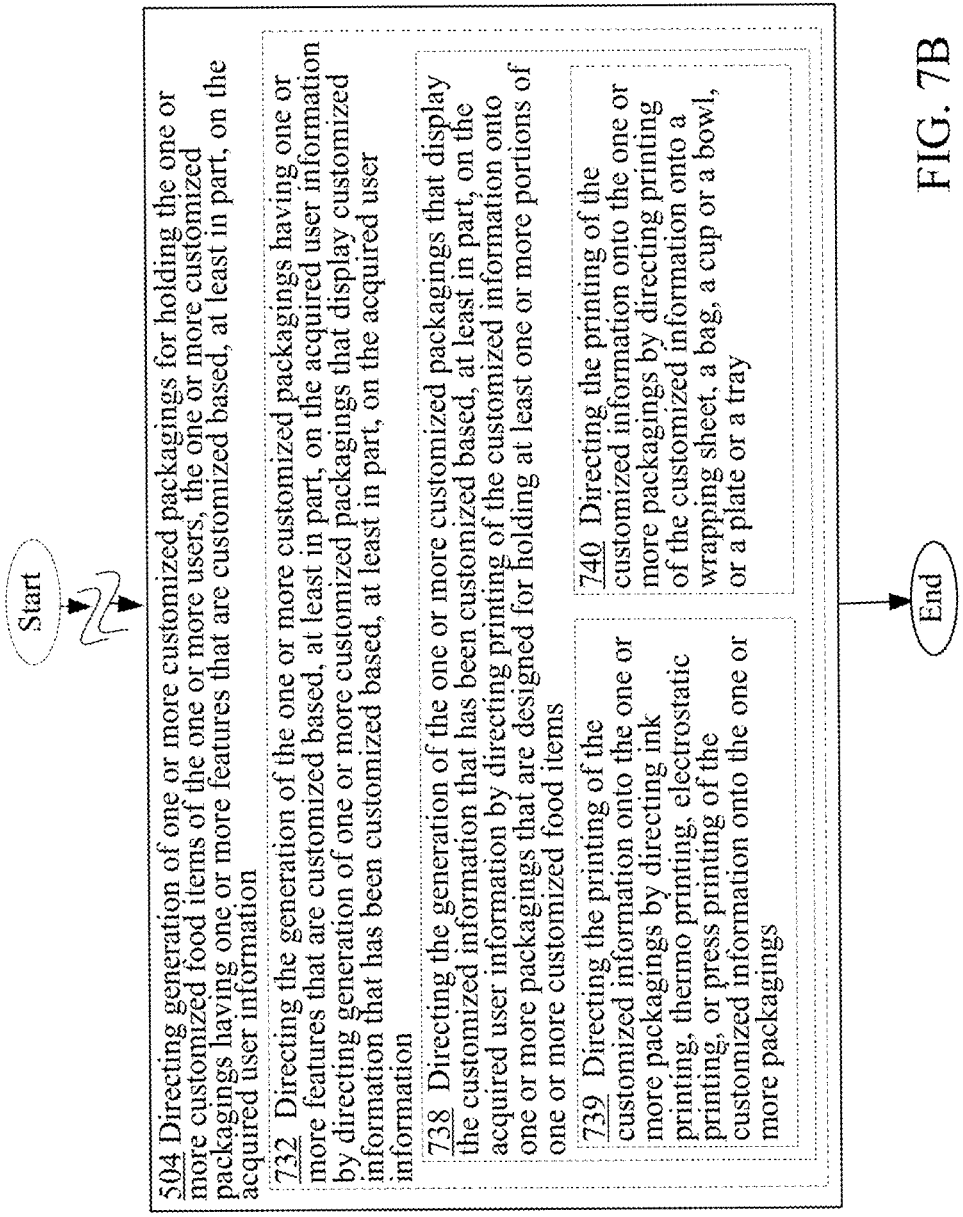

SYSTEMS AND METHODS FOR PROVIDING CUSTOMIZED PACKAGINGS FOR CUSTOMIZED FOOD ITEMS THAT WERE CUSTOMIZED BASED, AT LEAST IN PART, ON CUSTOMIZED FOOD ITEM INTEGRITY PREFERENCE

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None as of the filing date

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, acquiring user information associated with one or more users for preparing one or more customized food items for the one or more users, the user information including one or more user preferences related to integrity of one or more food ingredients to be included in the one or more customized food items, and directing generation of one or more customized packagings for holding the one or more customized food items of the one or more users, the one or more customized packagings having one or more features that are customized based, at least in part, on the acquired user information. In various implementations, at least one of the above recited operations is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring user information associated with one or more users for preparing one or more customized food items for the one or more users, the user information including one or more user preferences related to integrity of one or more food ingredients to be included in the one or more customized food items, and means for directing generation of one or more customized packagings for holding the one or more customized food items of the one or more users, the one or more customized packagings having one or more features that are customized based, at least in part, on the acquired user information. In addition to the foregoing, other system aspects are described in the claims, drawings, and text forming a part of the disclosure set forth herein.

In one or more various aspects, a system includes, but is not limited to, circuitry for acquiring user information associated with one or more users for preparing one or more customized food items for the one or more users, the user information including one or more user preferences related to integrity of one or more food ingredients to be included in the one or more customized food items, and circuitry for directing generation of one or more customized packagings for holding the one or more customized food items of the one or more users, the one or more customized packagings having one or more features that are customized based, at least in part, on the acquired user information. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, acquiring user information associated with one or more users for preparing one or more customized food items for the one or more users, the user information including one or more user preferences related to integrity of one or more food ingredients to be included in the one or more customized food items, directing generation of one or more customized packagings for holding the one or more customized food items of the one or more users, the one or more customized packagings having one or more features that are customized based, at least in part, on the acquired user information, and directing generation of one or more customized packagings for holding the one or more customized food items of the one or more users, the one or more customized packagings having one or more features that are customized based, at least in part, on the acquired user information. In addition to the foregoing, other computer program product aspects are described in the claims, drawings, and text forming a part of the disclosure set forth herein.

In one or more various aspects, a system includes, but is not limited to, a user information obtaining module configured to obtain user information associated with one or more users for preparing one or more customized food items for the one or more users, the user information including one or more user preferences related to integrity of one or more food ingredients to be included in the one or more customized food items; a customized packaging generation controlling module configured to control generation of one or more customized packagings for holding the one or more customized food items of the one or more users, the one or more customized packagings having one or more features that are customized based, at least in part, on the obtained user information; and a customized food item packing directing module configured to direct packing at least one or more portions of the one or more customized food items into the one or more customized packagings, respectively.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 2A illustrates an exemplary customized food item 22a being deposited onto an exemplary customized packaging 24a.

FIG. 3A shows a block diagram of a particular implementation of the customized food preparation system 10* of FIG. 1A illustrated as customized food preparation system 10a.

FIG. 3D shows a block diagram of a particular implementation of the network control system 12* of FIG. 1B illustrated as network control system 12a.

FIG. 4B shows another perspective of the customized packaging generation controlling module 304* of FIGS. 3A, 3B, 3D, and 3E (e.g., the customized packaging generation controlling module 304' of FIG. 3A, the customized packaging generation controlling module 304" of FIG. 3B, the customized packaging generation controlling module 304'" of FIG. 3D, or the customized packaging generation controlling module 304"" of FIG. 3E) in accordance with various implementations.

FIG. 4G shows a particular implementation of the robotic packing system 325\* of FIG. 4D illustrated as robotic packing system 325'.

FIG. 4H shows another implementation of the robotic packing system 325\* of FIG. 4D illustrated as robotic packing system 325".

FIG. 7B is a high-level logic flowchart of a process depicting alternate implementations of the customized packaging generation directing operation 504 of FIG. 5.

DETAILED DESCRIPTION

Figure 1A:
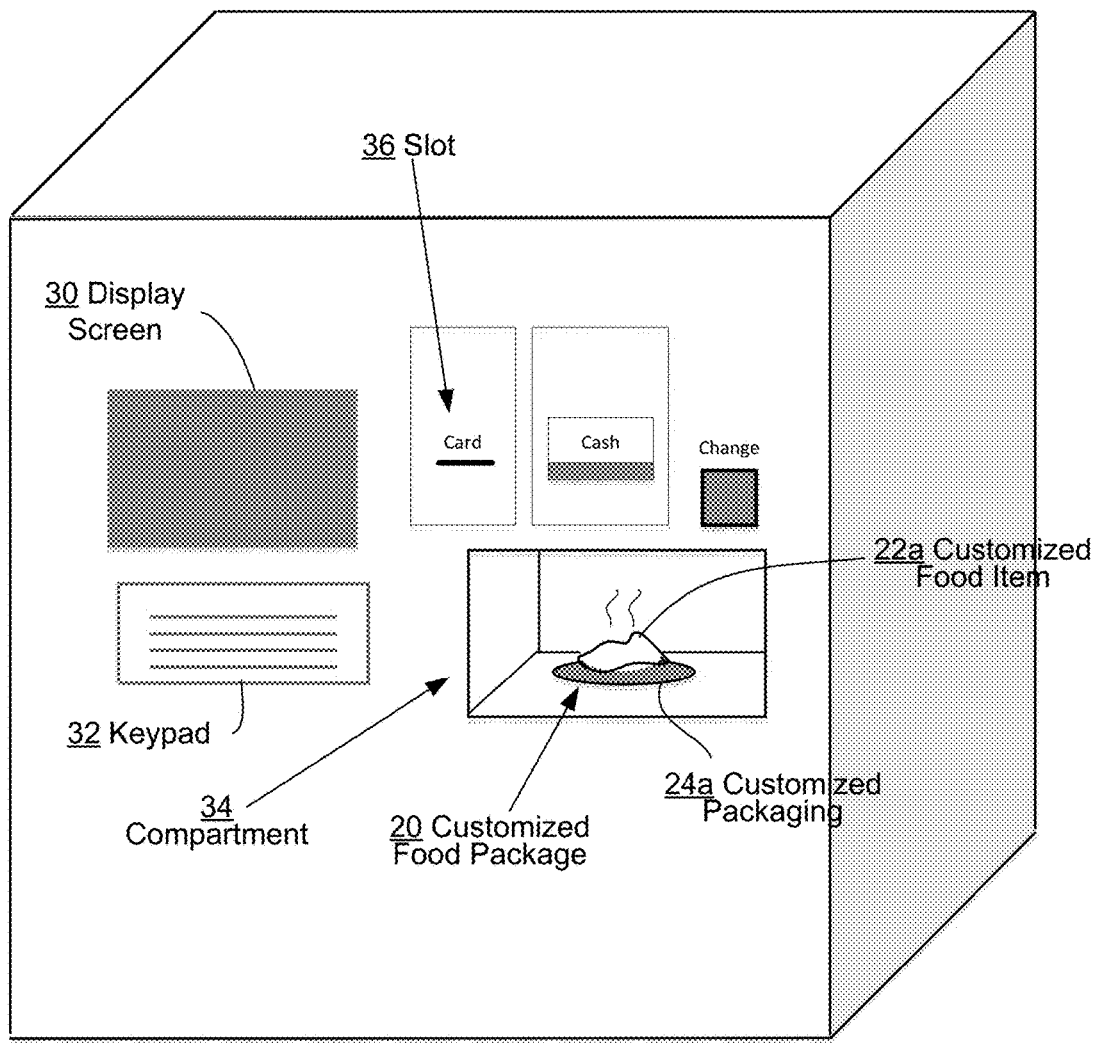
FIG. 1A illustrates an exemplary customized food preparation system 10* that is designed to prepare customized food items for users.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The development of food vending machine technology has remained relatively stagnant over the last few decades even though there have been substantial technological advancements in the fields of microelectronics, automated manufacturing, and robotics. That is, today's food vending machines are not that different from those that were around thirty or even forty years ago. With the exception of a very limited number vending machines (such as coffee machines that allow users to make certain limited customizations of their order such as making their coffee sweeter or adding cream), the vast majority of today's food vending machines do not allow any customization of customer purchases. The vast majority of today's food vending machines only allow a user/customer to select and purchase a food item (e.g., candy bars, chips, sandwiches, drinks, and so forth) from a plurality of ready-to-eat or substantially ready-to-eat food items (note that some current food vending machines do offer food items that will need to be heated using a microwave oven) and that do not allow the user to customize their purchased food item.

With the advancement of microelectronics, robotics, and automated manufacturing technologies such as 3-D (three-dimensional) printing, it is envisioned that future food vending machines will not only be able to manufacture food items "on the spot" but will also be able to customized food items to the specific needs of users. For example, with the development of 3-D (three-dimensional) printing technology, it is envisioned that customized food bars (e.g., customized energy bars) may be printed for users based on their needs (e.g., if a user is allergic to peanuts, no peanut ingredients are used in forming an energy bar for the user). It is also envisioned that with the use of robotics, fully customized meals (e.g., beef stew with low salt content, spaghetti with extra meat, and so forth) may be manufactured using automated vending machines that employ robotics or other forms of automation.

It is also envisioned that the simple manufacture of customized food items through automated systems (e.g., automated food vending machines) will not be satisfactory in many cases. That is, it is envisioned that at least some users may also want the customized food items that they order through automated systems to be packaged in customized packagings (e.g., customized wrappers, customized cups, customized bags, and so forth) that provide, for example, customized information (e.g., listing of customized ingredients, user dietary information such as total salt consumption for the week, warnings related to specific ingredients or to a specific user, and so forth). It may also be preferable for sanitary reasons to provide the customized food items in sanitary packaging.

Also, there is much concern today regarding the integrity (e.g., purity, cleanliness, disease free, pesticide free, and so forth) of our food supply. It seems as though in recent years, food supply contamination (e.g., *salmonella*, mad-cow disease, *E-coli*, and so forth) headlines occur on a regular basis. That is, there are many sources for today's food supply from a vast number of food vendors located across the globe from countries in the southern hemisphere that supply meats, fruits, and vegetables, to the countless domestic farms and ranches that supply chickens, pork, and beef, to the vegetable and fruit farms of California and Florida. It is often very difficult for end consumers to ensure that the ingredients used to, for example, make ready-to-eat foods are of high purity and free of any disease or pesticides.

Accordingly, methods, systems, and articles of manufactures are presented herein that are designed to, among other things, acquiring user information (e.g., user preference regarding food item integrity, user identification, user food selection, user customization selections, ingredient preferences, and so forth) associated with one or more users for use, at least in part, for preparing one or more customized food items (e.g., customized energy bars, customized meals, customized soup or stew, customized drinks, and so forth) for the one or more users; and directing generation of one or more customized packagings (e.g., customized wrappers, customized bags, customized cups, and so forth) for holding the one or more customized food items of the one or more users, the one or more customized packagings having one or more features (e.g., images, icons, or text) that are customized based, at least in part, on the acquired user information. In various embodiments the customized packagings may be generated through one or more customized food preparation systems that are designed to prepare/manufacture customized food items as well as customized packagings.

Figure 1B:
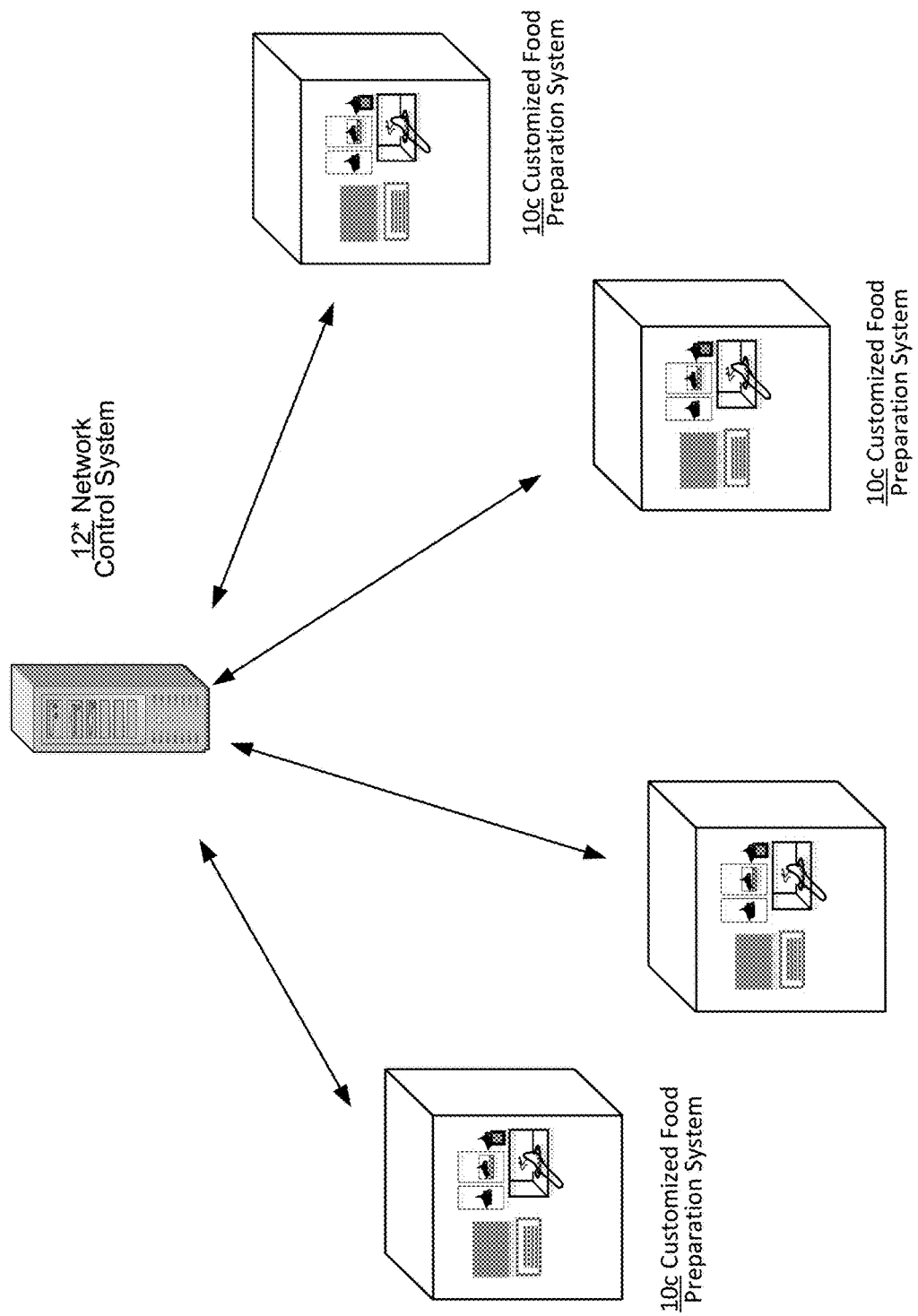
FIG. 1B shows a network control system 12* in communication with a plurality of customized food preparation systems 10c.

Referring now to FIG. 1A, which illustrates an exemplary customized food preparation system 10\* that is designed to generate customized food items 22*a* as well as customized packagings 24*a* (illustrated in this case as being a customized plate) for the customized food items 22*a*. In some embodiments, the exemplary customized food preparation system 10\* may be a standalone system that is self-contained with all of the logic needed to execute all of its operations, or in alternative embodiments and as illustrated in FIG. 1B, the exemplary customized food preparation system 10\* may be one of one or more network devices (e.g., illustrated as exemplary customized food preparation systems 10*c*) that are controlled by a network control system 12\* (e.g., a server, a workstation, a laptop, and so forth).

Figure 3A:
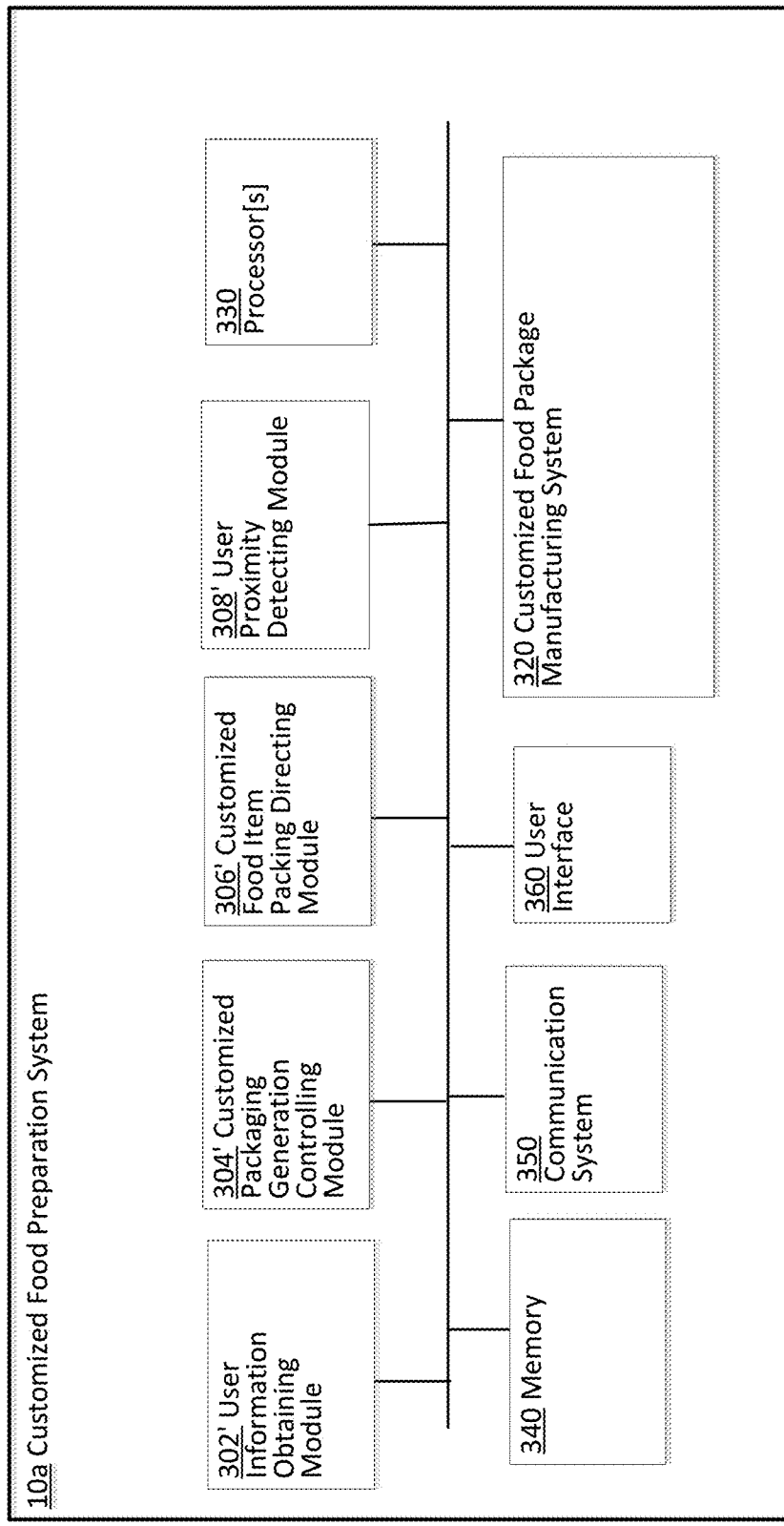
Figure 3B:
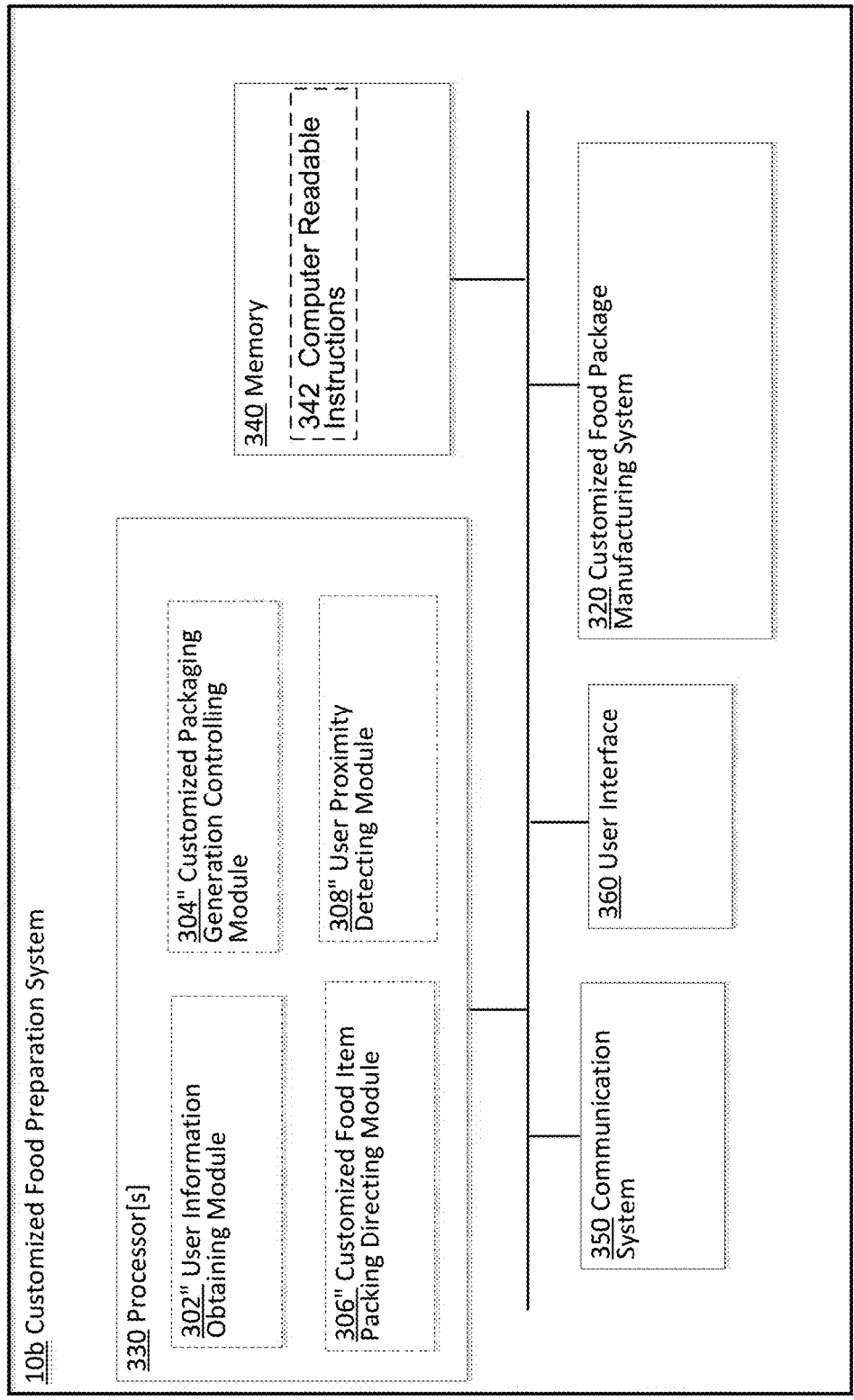
FIG. 3B shows a block diagram of another implementation of the customized food preparation system 10* of FIG. 1A illustrated as customized food preparation system 10b.
Figure 3C:
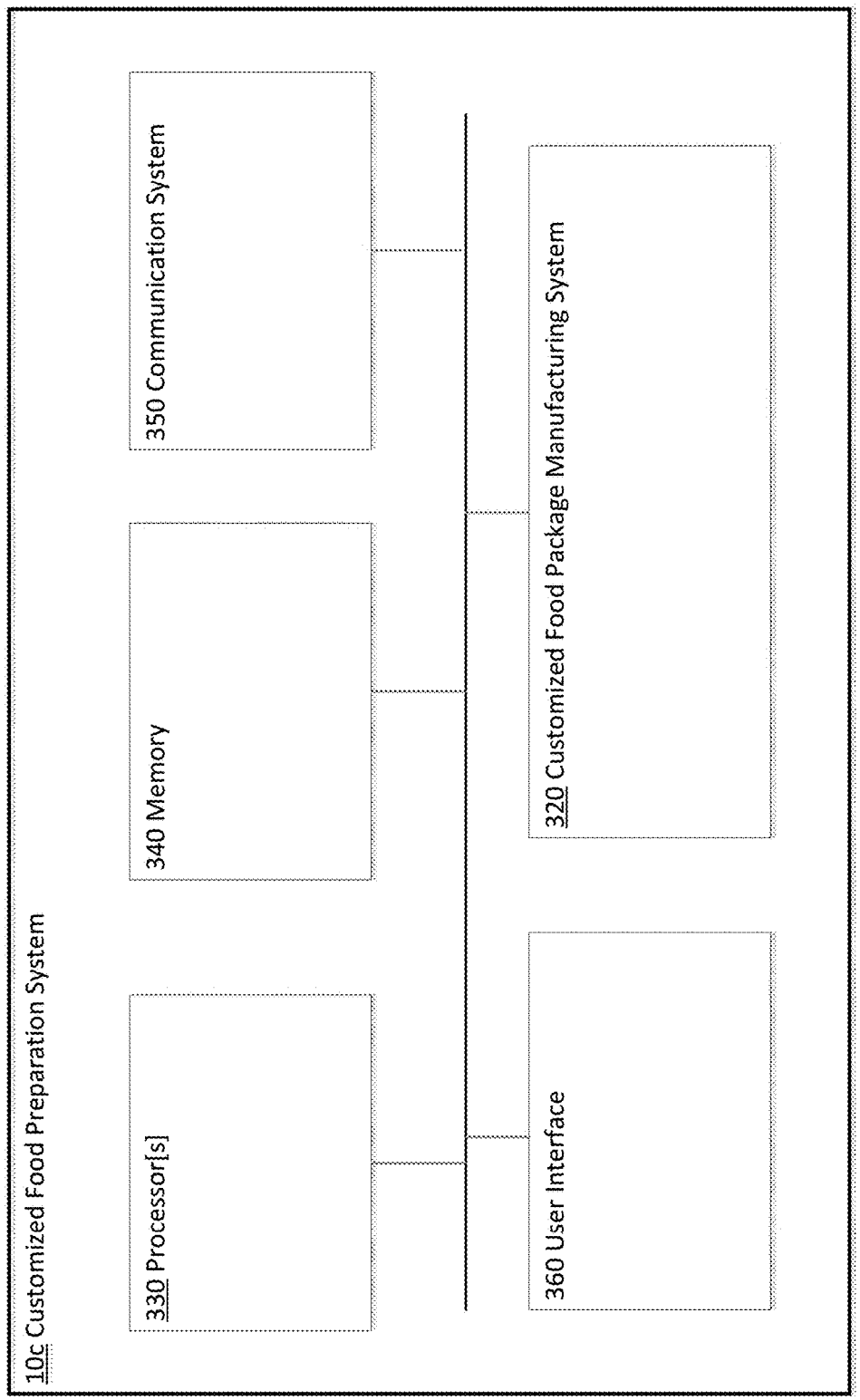
FIG. 3C shows a block diagram of another implementation of the customized food preparation system 10* of FIG. 1A illustrated as customized food preparation system 10c.

Note that FIGS. 3A, 3B, and 3C are three block diagrams of three different implementations of the exemplary customized food preparation system 10\* of FIG. 1 illustrated as exemplary customized food preparation system 10*a*, exemplary customized food preparation system 10*b*, and exemplary customized food preparation system 10*c*. Further note that for purposes of the following description, "\*" represents a wildcard. Thus, references in the following description to, for example, "exemplary customized food preparation system 10\*" may be in reference to the exemplary customized food preparation system 10*a* of FIG. 3A, the exemplary customized food preparation system 10*b* of FIG. 3B, or the exemplary customized food preparation system 10*c* of FIG. 3C, which again are three different implementations of the exemplary customized food preparation system 10\* of FIG. 1A.

Figure 2A:
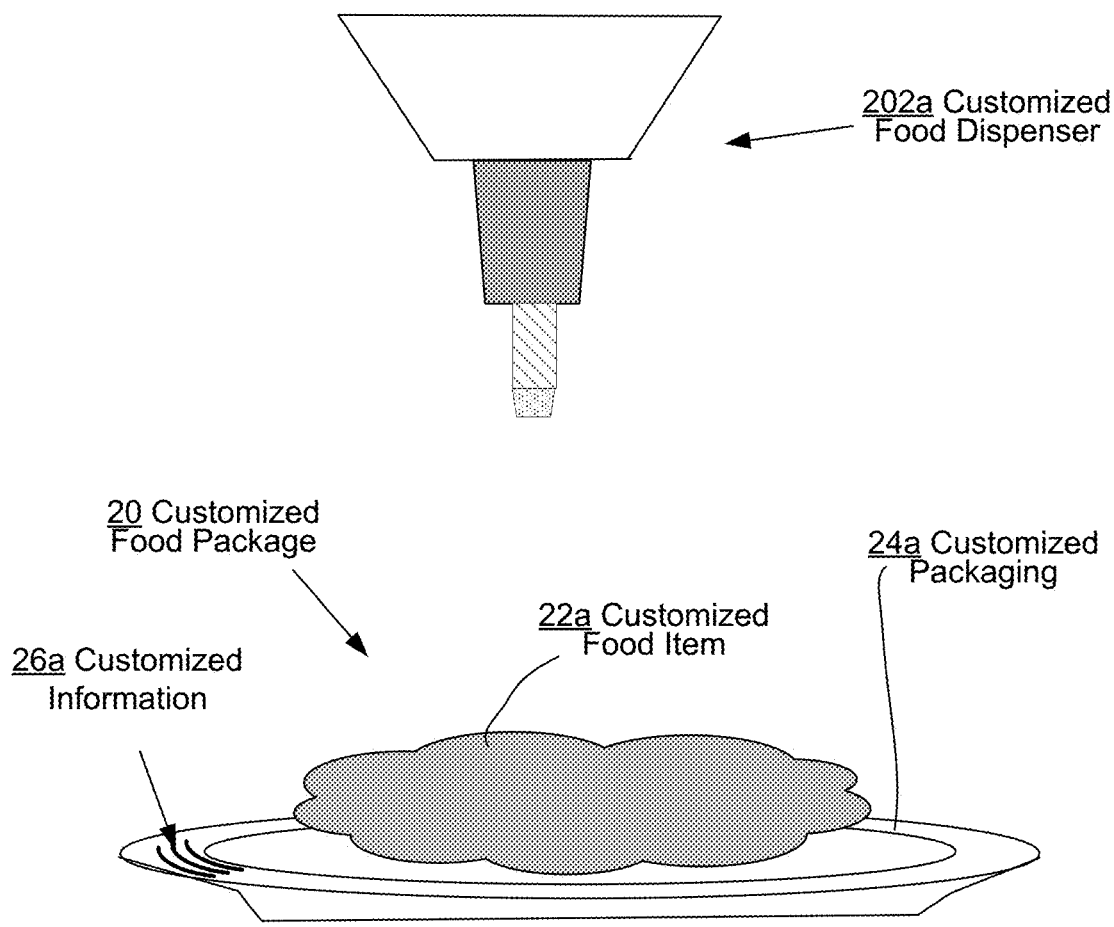

Referring back to the exemplary customized food preparation system 10\* of FIG. 1A, the exemplary customized food preparation system 10\*, as illustrated, includes a display screen 30 (which may be a touchscreen), a keypad 32, and a compartment 34 for providing a customized food package 20 (which includes a customized food item 22*a* and a customized packaging 24*a* in the form of a plate that has been customized, for example, to provide/display customized information—see FIG. 2A). Note that although the customized food item 22*a* is illustrated in FIG. 1A as being a solid or semi-solid food item, in alternative embodiments, the customized food item 22*a* may be in liquid form. Similarly, although the customized packaging 24*a* is depicted in FIG. 1A as being a customized plate, in alternative embodiments, the customized packaging 24*a* may be in a variety of other forms including, for example, a customized wrapper sheet, a customized cup, a customized bag, and so forth.

The display screen 30 may be employed to display (as well as to enter user input if it is a touchscreen) food menus, customization options, ingredient options, food item integrity preferences (e.g., ingredients of a customized food item being tested to be free of antibiotics), and so forth. The display screen 30 may also be used to provide to a user an option to have packagings of customized food items 24*a* to be customized to include customized information. In various embodiments, keypad 32 may be used by a user to make selections (e.g., selection of user preferences), as well as to provide input for other types of information (e.g., user identification, credit card information, dietary information, and so forth).

The customized food preparation system 10* may further include a slot 36 for reading a credit card or a Smartcard. Such cards may be a source for providing certain user information including user identification information. Such cards, particularly Smartcards, which may have connectivity to mobile devices such as Smartphones, may be used in order to obtain other types of user data including social data through their connectivity or directly from such cards.

Referring briefly now to FIGS. 3A and 3B, which illustrate two block diagrams of two different implementations of the exemplary customized food preparation system 10* of FIG. 1A when the exemplary customized food preparation system 10* is a "standalone" device that has, for example, most or all of the various logic needed in order to execute its various functionalities. In particular, FIGS. 3A and 3B illustrates two extreme implementations of the standalone implementation of the customized food preparation system 10* of FIG. 1A in which all of the logic modules are implemented using purely hardware solutions (e.g., employing dedicated circuitry such as application specific integrated circuitry or ASIC) as illustrated in FIG. 3A (e.g., illustrated in FIG. 3A as customized food preparation system 10a) or in which all of the logic modules are implemented using software solutions (e.g., software executed by one or more processors or controllers) as illustrated in FIG. 3B (e.g., illustrated in FIG. 3B as customized food preparation system 10b).

Note that for purposes of simplicity and for ease of illustration, only the two extreme implementations of the standalone customized food preparation system 10* are presented here. However, it is recognized that any combination of software and hardware solutions are possible and may be employed in various alternative embodiments. In any event, the "standalone" customized food preparation system 10a depicted in FIG. 3A is the "hard" implementation of the standalone implementation of the customized food preparation system 10* of FIG. 1A where all of the logic modules (e.g., the user information obtaining module 302'', the customized packaging generation controlling module 304', the customized food item packing directing module 306', and the user proximity detecting module 308') are implemented using purely hardware solutions (e.g., circuitry such as application specific integrated circuit or ASIC). In contrast, the customized food preparation system 10b of FIG. 3B is the soft implementation of the standalone implementation of the customized food preparation system 10* of FIG. 1A where all of the logic modules (e.g., the user information obtaining module 302'', the customized packaging generation controlling module 304'', the customized food item packing directing module 306'', and the user proximity detecting module 308'') are implemented using software solutions (e.g., programmable instructions in the form of computer readable instructions 342 being executed by hardware such as one or more processors 330) as illustrated in, for example, FIG. 3B. Note that FIG. 3C illustrates a block diagram (illustrated in FIG. 3C as customized food preparation system 10c) of a particular implementation of the customized food preparation system 10* of FIG. 1 when the customized food preparation system 10* is not a standalone device (e.g., when one or more logic modules may be remotely located, such as at a network control system 12*, as illustrated in FIG. 1B)

Turning now to FIG. 1B, which illustrates a network of customized food preparation systems 10c in communication with a network control system 12*. The various customized food preparation systems 10c may be designed to generate the same or different types of customized food items 22* (see, for example, the customized food items 22a, 22b, and 22c of FIGS. 2A, 2B, 2C, 2D, 2E, and 2F) such as energy bars, full meals, soups, stews, drinks, and so forth. That is, in some cases, all of the customized food preparation systems 10c may offer the same types of food items while in other cases the various customized food preparation systems 10c will offer different types of food items (e.g., customized energy bars as opposed to customized drinks). Each of the customized food preparation systems 10c may rely on the network control system 12* to provide at least some of the logic needed for executing various operations including, for example, operation for generating customized packagings 24* (see, for example, customized packagings 24a, 24b, 24c, and 24f of FIGS. 2A, 2B, 2C, 2D, 2E, and 2F) for customized food items 22*. In various embodiments, the network control system 12* may be a server, a plurality of servers, a workstation (or a plurality of workstations) a laptop, and so forth.

Figure 3D:
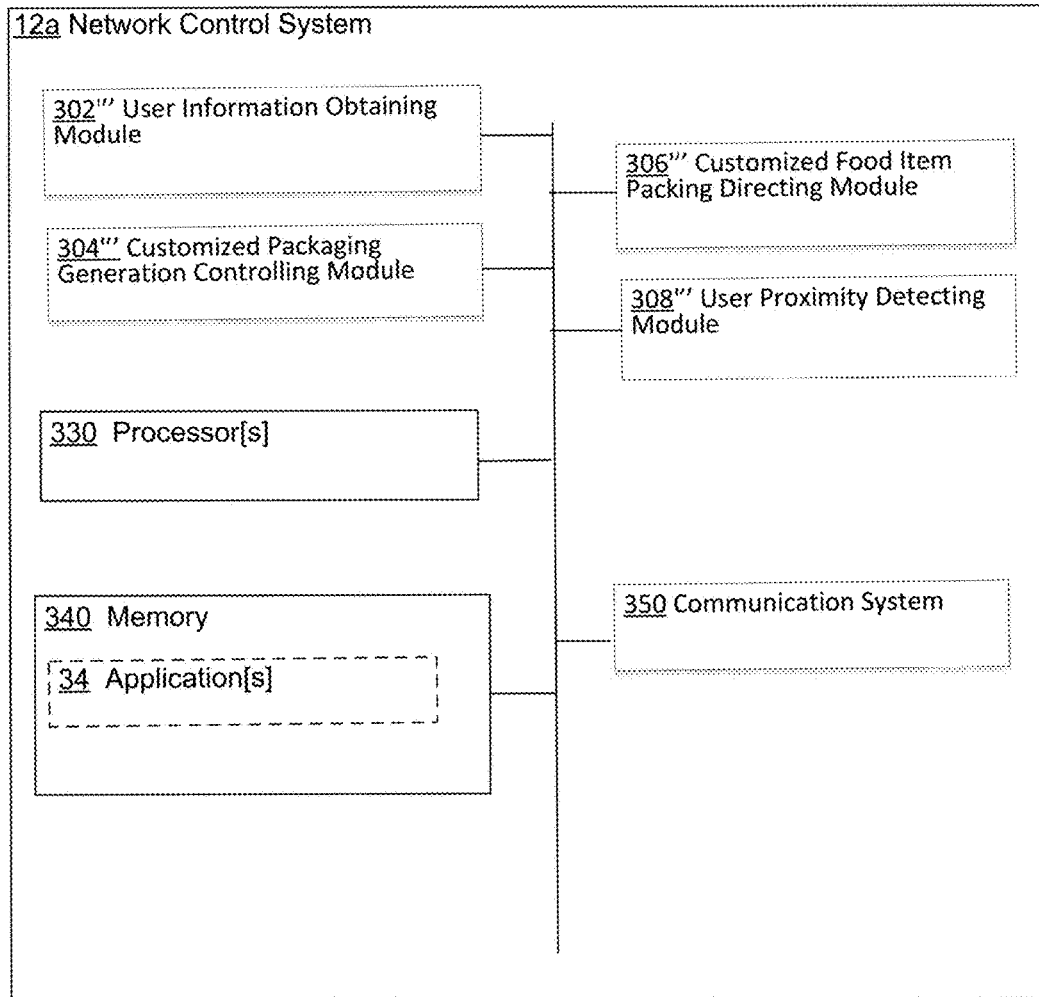
Figure 3E:
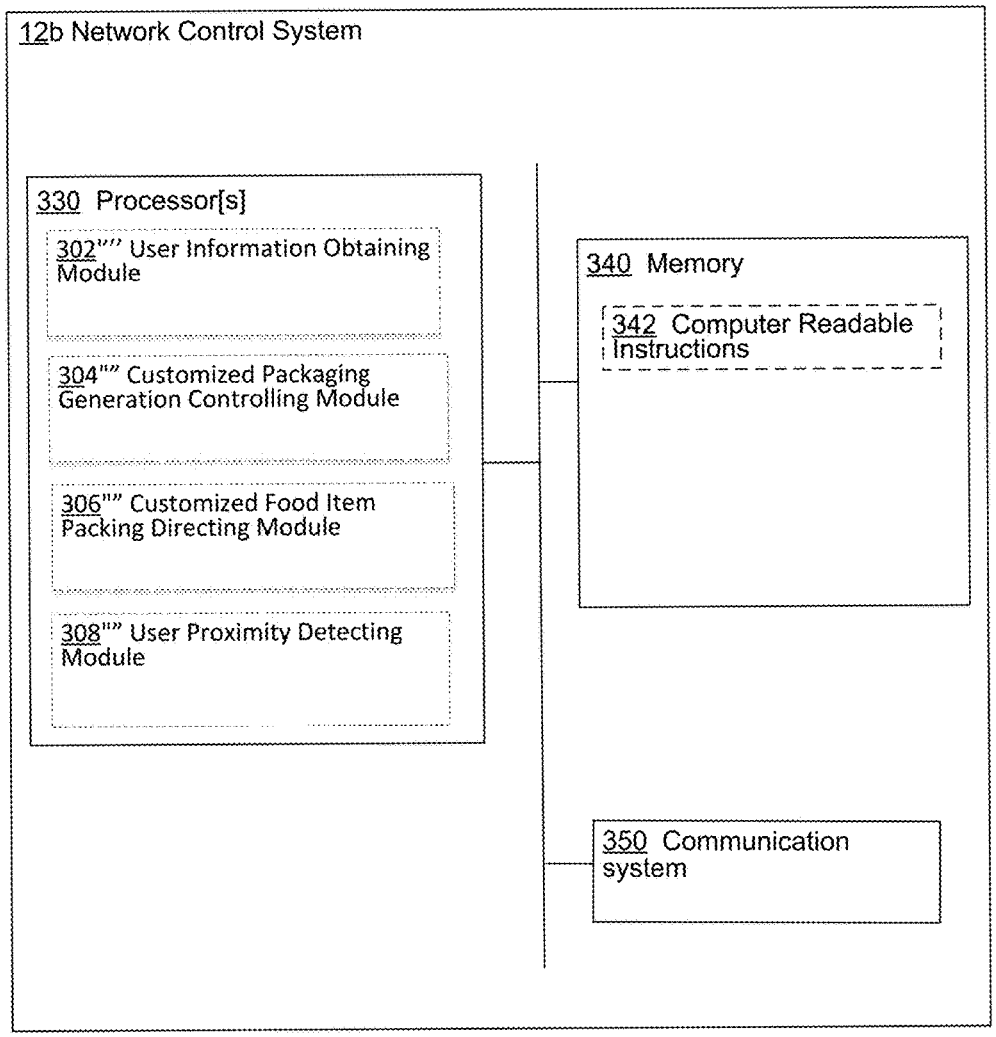
FIG. 3E shows a block diagram of a particular implementation of the network control system 12* of FIG. 1B illustrated as network control system 12b.

FIG. 3C illustrates a block diagram of one of the customized food preparation systems 10c of FIG. 1B (e.g., the customized food preparation system 10* of FIG. 1A when the customized food preparation system 10* is not a standalone device but instead relies on another device, such as a network control system 12* of FIG. 1B, to supply the logic needed to perform its various functionalities) in accordance with some embodiments. In contrast to FIG. 3C, FIGS. 3D and 3E illustrate two block diagrams of two extreme implementations of the network control system 12* of FIG. 1B in which all of the logic modules are implemented using purely hardware solutions (e.g., employing dedicated circuitry such as application specific integrated circuitry or ASIC) or all of the logic modules are implemented using software solutions (e.g., software executed by one or more processors or controllers). Note that for purposes of simplicity and for ease of illustration only, only the two extreme implementations are presented herein. However, it is recognized that any combination of software and hardware solutions are possible and may be employed in various alternative embodiments. In any event, the network control system 12a depicted in FIG. 3D is the "hard" implementation of the network control system 12* of FIG. 1B where all of the logic modules (e.g., the user information obtaining module 302''', the customized packaging generation controlling module 304''', the customized food item packing directing module 306''', and the user proximity detecting module 308''') are implemented using purely hardware solutions (e.g., circuitry such as application specific integrated circuit or ASIC). In contrast, the network control system 12b of FIG. 3E is the soft implementation of the network control system 12* of FIG. 1B where all of the logic modules (e.g., the user information obtaining module 302'''', the customized packaging generation controlling module 304'''', the customized food item packing directing module 306'''', and the user proximity detecting module 308'''') are implemented using software solutions (e.g., programmable instructions in the form of computer readable instructions 342 being executed by hardware such as one or more processors 330) as illustrated in, for example, FIG. 3E.

Referring now to FIGS. 2A, 2B, 2C, 2D, 2E, and 2F, which illustrate various exemplary ways that various exemplary customized food items 22* may be placed into or on various exemplary customized packagings 24*. Also, FIGS. 2A, 2B, 2D, and 2F illustrate various types of customized textual information 26* that may be placed on customized packagings 24*. Note that although it appears in FIGS. 2A, 2B, 2D, and 2F that the customized information 26* were placed (e.g., printed or glued) onto the customized packagings 24* prior to the associated customized food items 22* being placed into or on the customized packagings 24, in various embodiments, the customized information 26* may be placed onto the associated customized packaging 24* only after the customized food items 22* have already been placed into or on the associated customized packaging 24*.

Turning specifically to FIG. 2A, which shows a customized food item 22a that was deposited or dispensed onto a customized packaging 24a (which is in the form of a plate) using a customized food dispenser 202a. The customized food item 22a may be any one of a variety of customized food items including, for example, customized mashed potatoes, customized macaroni and cheese, customized pudding, and so forth. In some cases, the customized food item 22a may be customized gravy or sauce that is placed onto another customized food item 22* (e.g., noodles or mashed potatoes) that was previously placed onto the customized packaging 24a. That is, in some cases, a customized food preparation system 10* may perform multiple customized item dispensing operations to dispense multiple customized food items 22* onto a customized packaging 24*. Note that printed on the customized packaging 24a is a customized feature in the form of customized information 26a, which may further be in the form of text, icons, or images. Various types of information may be provided through the customized information 26a including, for example, the identity of the user that the customized food item 22a is designated for, a listing of one or more of the ingredients of the customized food item 22a, a listing of ingredients missing from the customized food item 22a, the calorie content of the customized food item 22a, total consumption of a particular ingredient (e.g., salt) by the user for a specific time period such as for the past week, that a particular ingredient like beef was tested to confirm that it did not have prions, and so forth. In some embodiments, the customized information 26a may provide information related to the customization that was executed in generating the customized food item 22a. In the same or alternative embodiments, the customized information 26a may provide dietary information related to the user that the customized food item 22a is designed for. As will be further described herein, other types of information may be provided through the customized information 26a in various alternative embodiments.

Figure 2B:
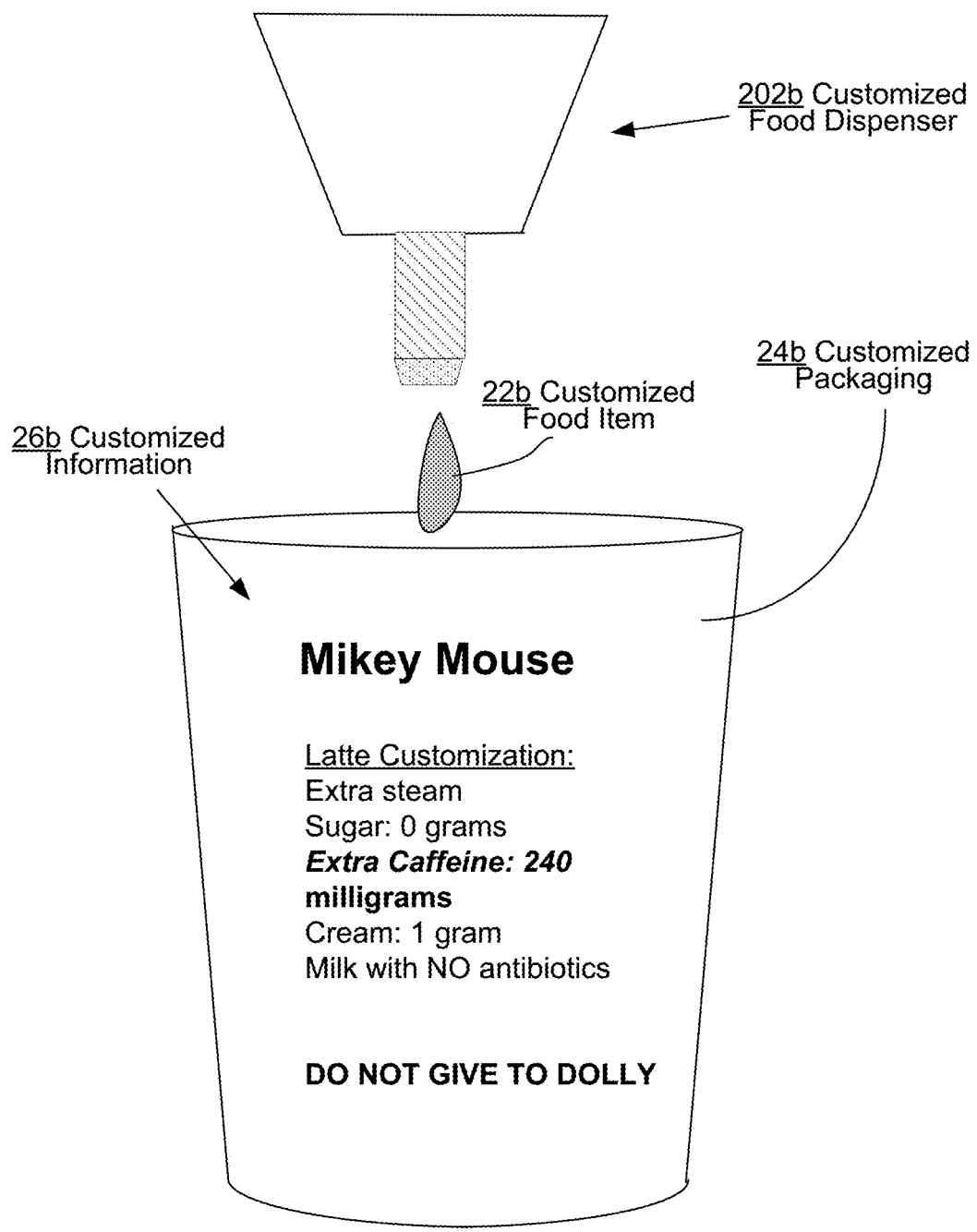
FIG. 2B illustrates another exemplary customized food item 22b being deposited into another exemplary customized packaging 24b.

Turning now to FIG. 2B, which illustrates another example of an exemplary customized food item 22b being dispensed or deposited into a customized packaging 24b (which in this case, is in the form of a cup) through a customized food dispenser 202b. The customized food item 22b may be any one of a variety of consumable food items that are substantially in liquid form including, for example, juice, soup (e.g., beef vegetable soup or corn chowder), noodle soup, broth, and so forth. Printed on the customized packaging 24b are customized features in the form of customized information 26b that may be based, at least in part, on user information provided by a user or retrieved from a memory 340, the Internet, or from another source.

In FIG. 2B, the customized information 26b identifies the user (e.g., "Mikey Mouse") who the customized food item 22b is associated with, the name of the customized food item (e.g., "Latte"), and the customizations that were done to the food item (e.g., Extra Cream, sugar: 0 grams, Extra Caffeine: 240 milligrams, Cream: 1 gram). Note that in some cases, certain ingredients, as selected by a, for example, user, may be highlighted. For example, in this example, the "Extra Caffeine: 240 milligrams" was highlighted by being bolded. The customized information 26b, as illustrated, indicates that the milk ingredient contains "No antibiotics."

As further illustrated in FIG. 2B, the customized information 26b may further include a warning message related to a second user (e.g., "DO NOT GIVE TO DOLLY"). Such a message may be printed onto the customized packaging 24b based on a determination that a group of users who are, for example, using or near a customized food preparation system 10* are affiliated with each other (e.g., are "acquaintances") and that at least one of the "Dolly" should not consume (e.g., due to dietary restrictions) the customized food item 22b to be held by the customized packaging 24b. In some cases, the determination as to whether a group of users are affiliated with each other may be determined by accessing one or more mobile devices (e.g., Smartphones or Smartcards) of the group of users and obtaining social networking data that may be obtainable through the one or more mobile devices. Once identities of those users that are affiliated have been obtained, dietary information related to each member of the affiliated users may then be retrieved from memory 340 or from, for example, the Internet. Note that although FIG. 2B appears to illustrate the customized packaging 24b already having the printed customized information 26b prior to the customized food item 22b being deposited into the customized packaging 24b, the customized information 26b may alternatively be printed onto the customized packaging 24b after the customized food item 22b has already been placed into the customized packaging 24b.

Figure 2C:
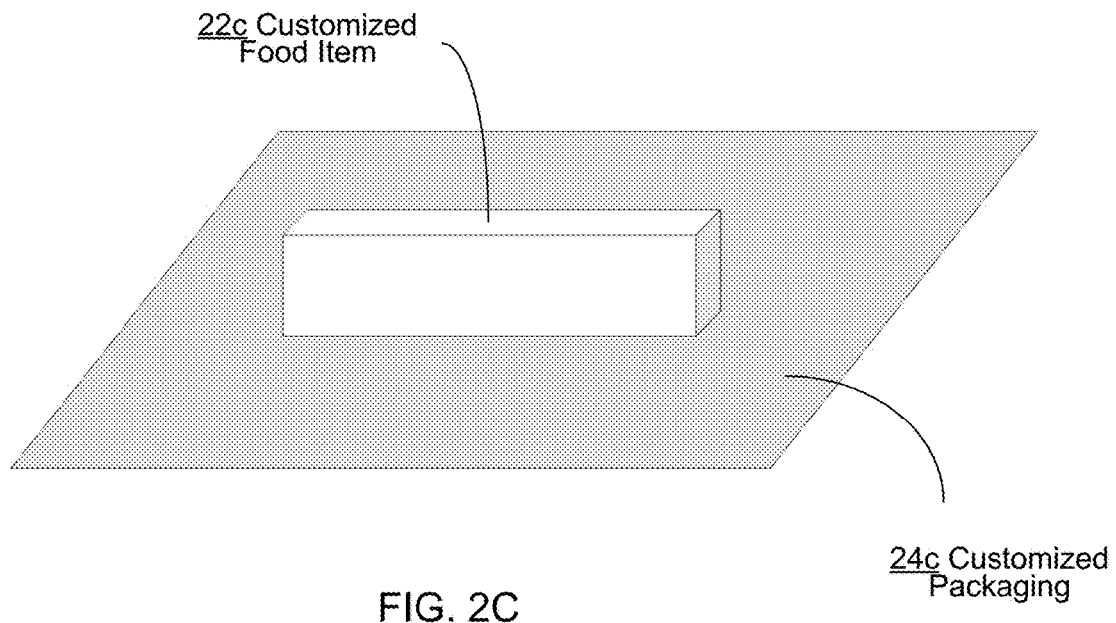
FIG. 2C illustrates another exemplary customized food item 22c being formed on another exemplary customized packaging 24c.
Figure 2D:
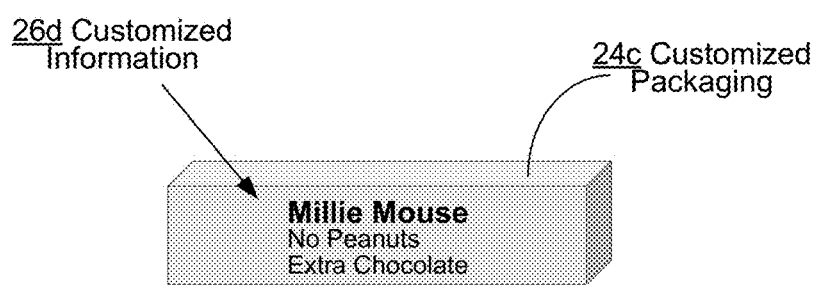
FIG. 2D illustrates the exemplary customized food item 22c of FIG. 2C after the exemplary customized food item 22c has been wrapped with the exemplary customized packaging 24c.

Turning now to FIG. 2C, which illustrates another exemplary customized food item 22c that is in the form of a food or energy bar and that is made/formed directly on a customized packaging 24c, which is in the form of a wrapping sheet. In some cases, the customized food item 22c may be formed on the customized packaging 24c using, for example, automated manufacturing techniques such as 3-D printing. After being formed/made on the customized packaging 24c, the customized food item 22c may be wrapped within the customized packaging 24c as illustrated in FIG. 2D. As further illustrated in FIG. 2D, the customized packaging 24c further includes customized information 26d that may have been placed (e.g., printed on or glued on if the customized information 26d is on a label) onto the customized packaging 24c before or after the customized food item 22c has been wrapped in the customized packaging 24c. As illustrated, the customized information 26d includes the name of the user that the customized food item 22c is associated for, a missing ingredient (e.g., "No Peanuts"), and customization information (e.g., "Extra Chocolate"). Note that in some cases, the user who is associated with the customized food item 22c may not be identified at all on the customized packaging 24* or may not be identified by name but instead, may be identified by a customer number. That is, in some cases, the user may not provide user identification when purchasing a customized food item through a customized food preparation system 10*. In such situations, the customized packaging 24* may simply indicate a customer number. This may be particularly useful when multiple users are using the same customized food preparation system 10*.

Figure 2E:
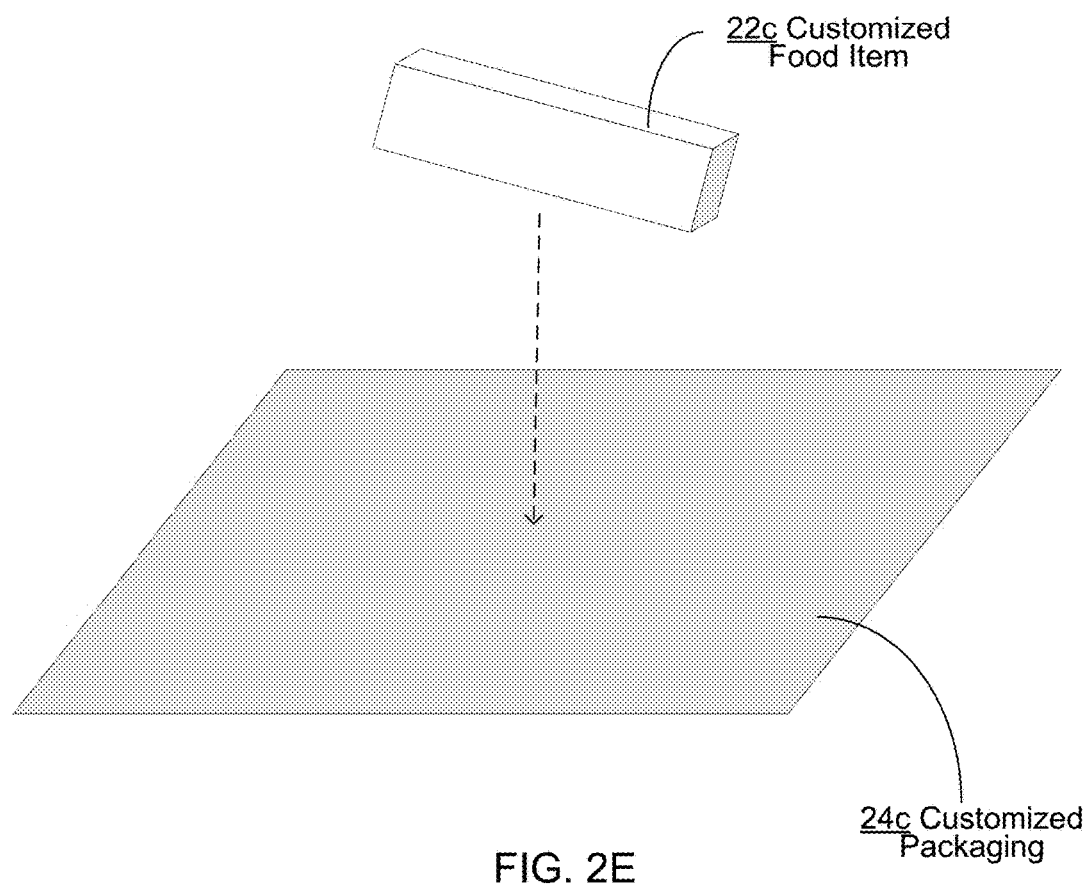
FIG. 2E illustrates the exemplary customized food item 22c of FIG. 2C being placed onto the exemplary customized packaging 24c rather than being formed on the exemplary customized packaging 24c as was illustrated in FIG. 2C.

Turning now to FIG. 2E, which illustrates how the customized food item 22c of FIGS. 2C and 2D could be formed first before being placed onto the customized packaging 24c of FIGS. 2C and 2D, and then being wrapped within the customized packaging 24c as was illustrated in FIG. 2D.

Figure 2F:
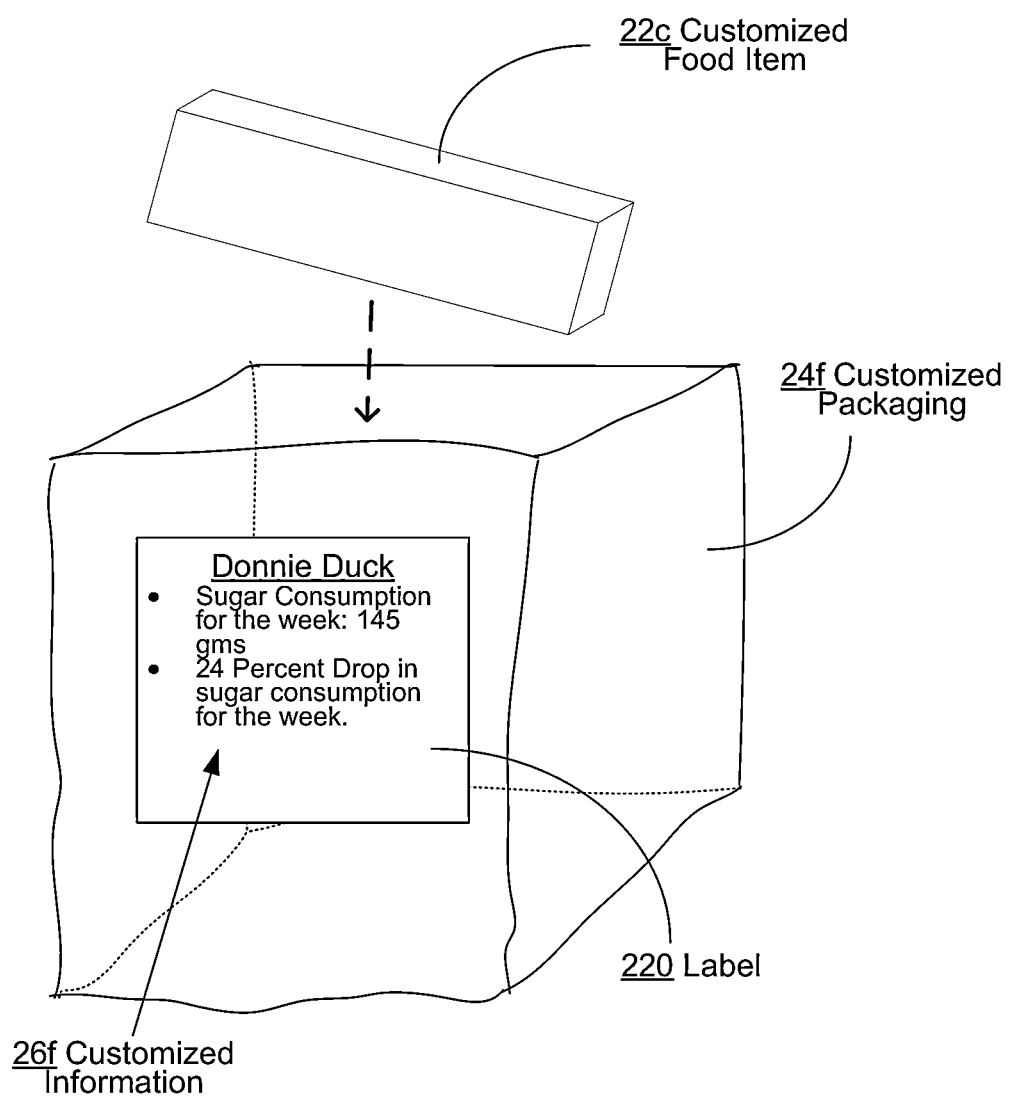
FIG. 2F illustrates the exemplary customized food item 22c of FIG. 2C being placed in another exemplary customized packaging 24f.

Referring now to FIG. 2F, which illustrates another type of customized packaging 24f that the customized food item 22c of FIGS. 2C, 2D, and 2E could be placed into. In this embodiment, the customized packaging 24f is a bag, which may be made from a variety of materials (e.g., paper, cellophane, and so forth). Affixed (e.g., glued) to the customized packaging 24f is a label 220 with customized information 26f. In this case, the customized information 26f indicates the name (e.g., "Donnie Duck") of the user that the customized food item 22c (and the customized packaging 24f) is associated with. The customized information 26f further indicates historical dietary information of the user that the customized food item 22c and the customized packaging 24f is associated with. In various embodiments, the label 220 may be affixed to the customized packaging 24f before or after the customized food item 22c has been placed into the customized packaging 24f.

Referring now to FIGS. 3A and 3B, which as briefly described above, illustrate two block diagrams of two different implementations of the customized food preparation system 10* of FIG. 1A when the customized food preparation system 10* is a standalone device with all of the necessary logic to perform the various operations that it is designed to perform (e.g., directing or controlling) generation of one or more customized packagings 24* for one or more customized food items 22*. In particular, and as will be further described herein, FIG. 3A illustrates a customized food preparation system 10a that is the "hardwired" or "hard" implementation of an automated customized food manufacturing system that can implement the operations and processes to be described herein. The customized food preparation system 10a may comprise certain logic modules including, for example, a user information obtaining module 302', a customized packaging generation controlling module 304', a customized food item packing directing module 306', and/or a user proximity detecting module 308' that are implemented using purely hardware or circuitry components (e.g., application specific integrated circuit or "ASIC"). In contrast, FIG. 3B illustrates a standalone customized food preparation system 10b that is the "soft" implementation of an automated customized food manufacturing system that can implement the operations and processes to be described herein. In various embodiments, the customized food preparation system 10b may also include certain logic modules including, for example, a user information obtaining module 302", a customized packaging generation controlling module 304", a customized food item packing directing module 306", and/or a user proximity detecting module 308" that are implemented using electronic circuitry (e.g., one or more processors 330 including one or more microprocessors, controllers, etc.) executing one or more programming instructions (e.g., software in the form of computer readable instructions 342—see FIG. 3B).

The embodiments of the standalone customized food preparation system 10* illustrated in FIGS. 3A and 3B are two extreme implementations of a standalone automated customized food manufacturing system in which all of the logic modules (e.g., the user information obtaining module 302', the customized packaging generation controlling module 304', the customized food item packing directing module 306', and the user proximity detecting module 308') are implemented using purely hardware solutions (e.g., circuitry such as ASIC) as illustrated in, for example, FIG. 3A or in which all of the logic modules (e.g., the user information obtaining module 302", the customized packaging generation controlling module 304", the customized food item packing directing module 306", and the user proximity detecting module 308") are implemented using software solutions (e.g., programmable instructions in the form of computer readable instructions 342 being executed by hardware such as one or more processors 330) as illustrated in, for example, FIG. 3B. Since there are many ways of combining hardware, software, and/or firmware in order to implement the various logic modules (e.g., the user information obtaining module 302*, the customized packaging generation controlling module 304*, the customized food item packing directing module 306*, and the user proximity detecting module 308*), only the two extreme implementations (e.g., the purely hardware solution as illustrated in FIG. 3A and the software solution of FIG. 3B) are illustrated here. It should be noted here that with respect to the "soft" implementation illustrated in FIG. 3B, hardware in the form of circuitry such as one or more processors 330 are still needed in order to execute the software. Further details related to the two implementations of the standalone customized food preparation system 10* illustrated in FIGS. 3A and 3B will be provided in greater detail below.

In still other implementations, the customized food preparation system 10* of FIG. 1A may not actually include the various logic modules (e.g., the user information obtaining module 302*, the customized packaging generation controlling module 304*, the customized food item packing directing module 306*, and the user proximity detecting module 308*) that implements the various operations/processes described herein. For example, the customized food preparation system 10c of FIG. 3C illustrates such a device that does not have the various logic modules needed for, for example, directing or controlling generation of one or more customized packagings 24* for one or more customized food items 22*. Instead, such logic modules may be located in a remote device such as at a network control system 12* as illustrated, for example, in FIG. 1B and FIGS. 3D and 3E. In such implementations, the other device (e.g., network control system 12*) having the various logic modules may direct or control a customized food preparation system 10c (see FIGS. 1B and 3C) to perform at least some of the processes and operations to be described herein.

FIGS. 3D and 3E illustrates two extreme implementations of the network control system 12* of FIG. 1B in which all of the logic modules (e.g., the user information obtaining module 302''', the customized packaging generation controlling module 304''', the customized food item packing directing module 306''', and the user proximity detecting module 308''') are implemented using purely hardware solutions (e.g., circuitry such as ASIC) as illustrated in, for example, FIG. 3D or in which all of the logic modules (e.g., the user information obtaining module 302'''', the customized packaging generation controlling module 304'''', the customized food item packing directing module 306'''', and the user proximity detecting module 308'''') are implemented using software solutions (e.g., programmable instructions in the form of computer readable instructions 342 being executed by hardware such as one or more processors 330) as illustrated in, for example, FIG. 3E. Again, although there are many ways to combine hardware, software, and/or firmware in order to implement the various logic modules (e.g., the user information obtaining module 302*, the customized packaging generation controlling module 304*, the customized food item packing directing module 306*, and the user proximity detecting module 308*), for ease of illustration only the two extreme implementations (e.g., the purely hardware solution as illustrated in FIG. D and the software solution of FIG. 3E) are illustrated here.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 3A, which illustrates a block diagram of a customized food preparation system 10a that includes a user information obtaining module 302', a customized packaging generation controlling module 304', customized food item packing directing module 306', a the user proximity detecting module 308', memory 340, a communication system 350 (e.g., a network interface card, a transceiver, and so forth), a user interface 360 (e.g., a display, a speaker, and so forth), one or more processors 330 (e.g., one or more microprocessors), and a customized food package manufacturing system 320. In various embodiments, user interface 360 may include a display screen 30 such as a touchscreen, a keypad 32, and so forth.

In various embodiments, the user information obtaining module 302' of the customized food preparation system 10a of FIG. 3A is a logic module that may be designed to, among other things, acquire or obtain user information associated with one or more users for preparing one or more customized food items 22* for the one or more users, the user information including one or more user preferences related to integrity of one or more food ingredients to be included in the one or more customized food items. In contrast, the customized packaging generation controlling module 304' of FIG. 3A is a logic module that may be configured to direct or control the customized food preparation system 10a to generate one or more customized packagings 24* for holding the one or more customized food items 22* of the one or more users, the one or more customized packagings 24* having one or more features that are customized based, at least in part, on the acquired user information. The customized food item packing directing module 306' of FIG. 3A, on the other hand, is a logic module that may be configured to direct packing at least one or more portions of the one or more customized food items 22* into the one or more customized packagings 24*, respectively. In contrast, the user proximity detecting module 308' of FIG. 3A is a logic module that may be configured to detect, among other things, presence of one or more users in the proximity (e.g., within 20 or 30 feet) of the customized food preparation system 10a.

Turning now to FIG. 3B, which illustrates a block diagram of another customized food preparation system 10b that can implement the operations and processes to be described herein. As indicated earlier, the customized food preparation system 10b in FIG. 3B is merely the "soft" version of the customized food preparation system 10a of FIG. 3A because the various logic modules: the user information obtaining module 302", the customized packaging generation controlling module 304", the customized food item packing directing module 306", and the user proximity detecting module 308" are implemented using one or more processors 330 (e.g., one or more microprocessors or controllers) executing software (e.g., computer readable instructions 342) rather than being implemented using purely hardware (e.g., ASIC) solutions as was the case in the customized food preparation system 10a of FIG. 3A. Thus, the user information obtaining module 302", the customized packaging generation controlling module 304", the customized food item packing directing module 306", and the user proximity detecting module 308" of FIG. 3B may be designed to execute the same functions as the user information obtaining module 302', the customized packaging generation controlling module 304', the customized food item packing directing module 306', and the user proximity detecting module 308' of FIG. 3A. The customized food preparation system 10b, as illustrated in FIG. 3B, may include other components (e.g., the user interface 360, the communication system 350, the memory 340 that stores the computer readable instructions 342, the customized food package manufacturing system 320, and so forth) that are the same or similar to the other components that may be included in the customized food preparation system 10a of FIG. 3A. Note that in the embodiment of the customized food preparation system 10b illustrated in FIG. 3B, the various logic modules (e.g., the user information obtaining module 302", the customized packaging generation controlling module 304", the customized food item packing directing module 306", and the user proximity detecting module 308") may be implemented by the one or more processors 330 (or other types of circuitry such as field programmable gate arrays or FPGAs) executing one or more computer readable instructions 342 stored in memory 340.

In various embodiments, the memory 340 of the customized food preparation system 10a of FIG. 3A and the customized food preparation system 10b of FIG. 3B may comprise one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

FIG. 3C illustrates the customized food preparation system 10* of FIG. 1A (e.g., illustrated in FIG. 3C as customized food preparation system 10c) when the customized food preparation system 10* of FIG. 1A is not a standalone device but instead, relies on another device (e.g., the network control system 12* of FIG. 1B) to provide the various logic needed in order to, for example, generate one or more customized packagings 24* for one or more customized food items 22*. In contrast, FIGS. 3D and 3E illustrates two extreme implementations (e.g., in which all of the logic modules are implemented using hardware solutions as illustrated in the network control system 12a of FIG. 3D or in which all of the logic modules are implemented using software solutions as illustrated in the network control system 12b of FIG. 3E) of the network control system 12* of FIG. 1B that may control or direct the customized food preparation system 10c of FIG. 3C. Note that both the network control system 12a of FIG. 3D and the network control system 12b of FIG. 3E have the same logic modules as those logic modules included in the customized food preparation systems 10a and 10b of FIGS. 3A and 3B performing the same or similar functionalities.

Figure 4A:
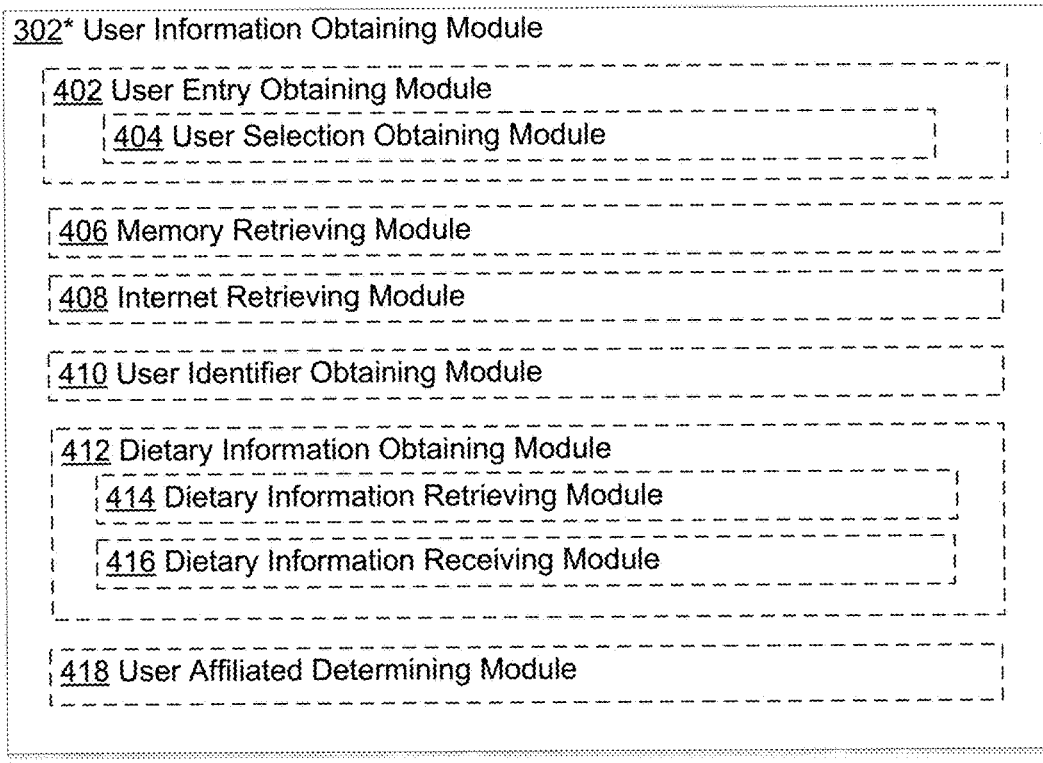
FIG. 4A shows another perspective of the user information obtaining module 302* of FIGS. 3A, 3B, 3D, and 3E (e.g., the user information obtaining module 302' of FIG. 3A, the user information obtaining module 302" of FIG. 3B, the user information obtaining module 302'" of FIG. 3D, or the user information obtaining module 302"" of FIG. 3E) in accordance with various implementations.

Turning now to FIG. 4A illustrating a particular implementation of the user information obtaining module 302* (e.g., the user information obtaining module 302', the user information obtaining module 302", the user information obtaining module 302''', and the user information obtaining module 302'''') of FIGS. 3A, 3B, 3D, and 3E. As illustrated, the user information obtaining module 302* may include one or more sub-logic modules in various alternative implementations. For example, in various embodiments, the user information obtaining module 302* may include a user entry obtaining module 402 that may further include a user selection obtaining module 404, a memory retrieving module 406, an Internet retrieving module 408, a user identifier obtaining module 410, a dietary information obtaining module 412 (which may further include a dietary information retrieving module 414 and/or a dietary information receiving module 416), and/or a user affiliated determining module 418. Specific details related to the user information obtaining module 302* as well as the above-described sub-modules of the user information obtaining module 302* will be provided below with respect to the operations and processes to be described herein.

Turning now to FIG. 4B illustrating a particular implementation of the customized packaging generation controlling module 304* (e.g., the customized packaging generation controlling module 304', the customized packaging generation controlling module 304'', the customized packaging generation controlling module 304''', or the customized packaging generation controlling module 304'''') of FIG. 3A, 3B, 3D, or 3E. As illustrated, the customized packaging generation controlling module 304* may include one or more sub-logic modules in various alternative implementations. For example, in various embodiments, the customized packaging generation controlling module 304* may include an instruction providing module 420, a component control module 422, a customized information label printing controlling module 424, a label affixing controlling module 426, a customized information packaging printing controlling module 428, a user related information customized packaging generation controlling module 430 (which may further include a user identified customized packaging generation controlling module 432 and/or a secondary user information customized packaging generation controlling module 434), a user related dietary information customized packaging generation controlling module 436, a customized food item related information customized packaging generation controlling module 438, and/or a packaging selecting module 440. Specific details related to the customized packaging generation controlling module 304* as well as the above-described sub-modules of the customized packaging generation controlling module 304* will be provided below with respect to the operations and processes to be described herein.

Figure 4C:
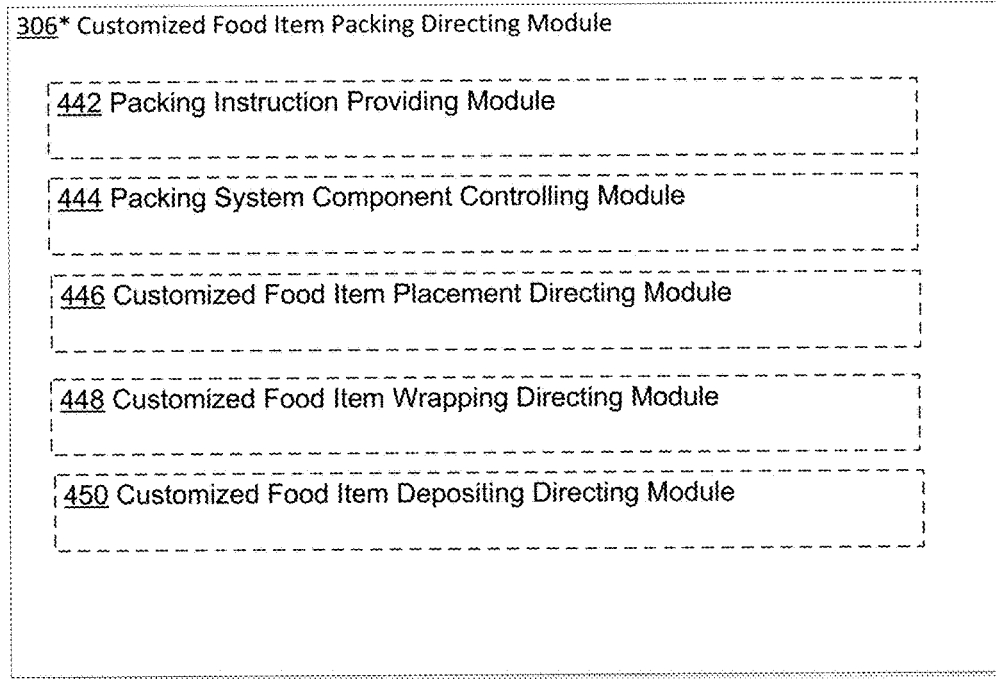
FIG. 4C shows another perspective of the customized food item packing directing module 306* of FIGS. 3A, 3B, 3D, and 3E (e.g., the customized food item packing directing module 306' of FIG. 3A, the customized food item packing directing module 306" of FIG. 3B, the customized food item packing directing module 306'" of FIG. 3D, or the customized food item packing directing module 306"" of FIG. 3E) in accordance with various implementations.

FIG. 4C illustrates a particular implementation of the customized food item packing directing module 306* (e.g., the customized food item packing directing module 306', the customized food item packing directing module 306'', the customized food item packing directing module 306''', or the customized food item packing directing module 306'''') of FIG. 3A, 3B, 3D, or 3E. As illustrated, the customized food item packing directing module 306* may include one or more sub-logic modules in various alternative embodiments. For example, in various embodiments, the customized food item packing directing module 306* may include a packaging instruction providing module 442, a packing system component controlling module 444, a customized food item placement directing module 446, a customized food item wrapping directing module 448, and/or a customized food item depositing directing module 450. Specific details related to the customized food item packing directing module 306*, as well as the above-described sub-modules of the customized food item packing directing module 306*, will be provided below with respect to the operations and processes to be described herein.

Figure 4D:
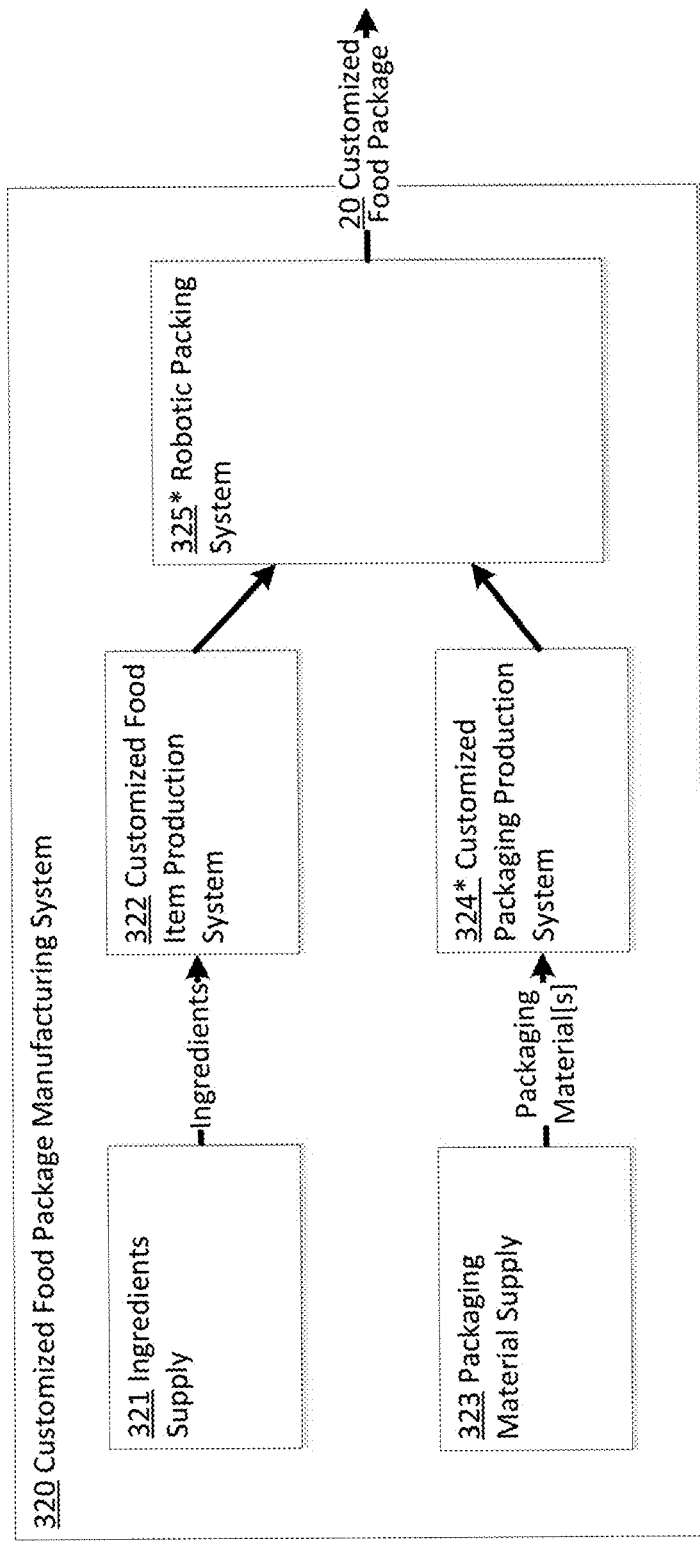
FIG. 4D shows another perspective of the customized food package manufacturing system 320 of FIGS. 3A, 3B, and 3C.

FIG. 4D illustrates a particular implementation of the customized food package manufacturing system 320 of FIGS. 3A, 3B, and 3C. The customized food package manufacturing system 320 includes an ingredients supply 321 for supplying ingredients to customized food item production system 322, which generates customized food items 22*. The customized food package manufacturing system 320 further includes a packaging material supply 323 that supplies packaging materials to a customized packaging production system 324 for generating customized packaging 24*. The customized food package manufacturing system 320 may further include a robotic packing system 325* for packing (e.g., placing or dispensing) customized food items 22* into or onto customized packagings 24* to produce customized food packages 20.

Figure 4E:
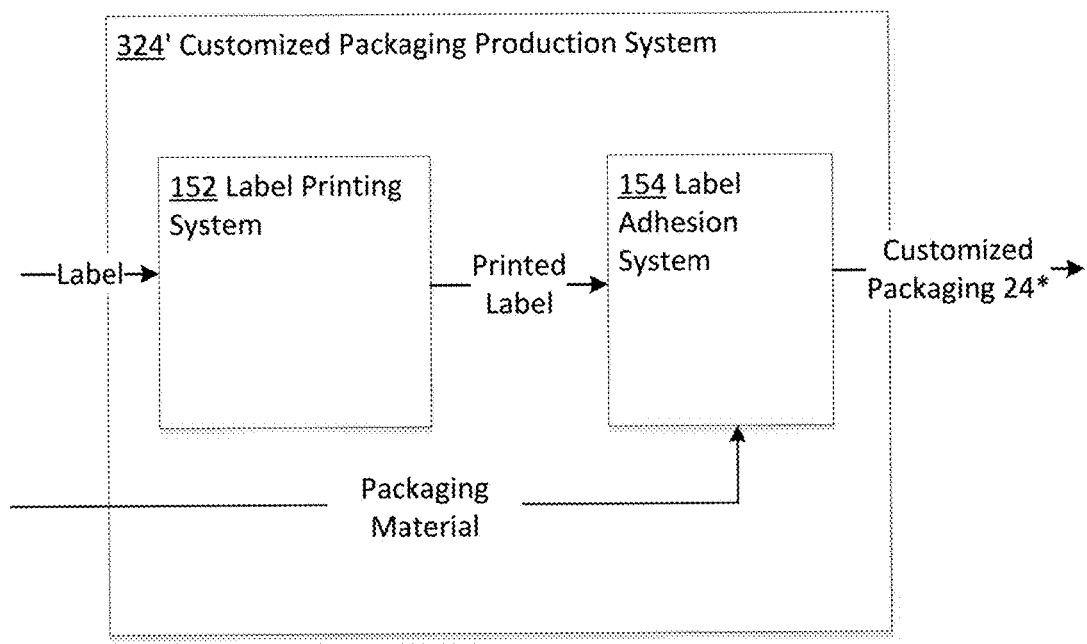
FIG. 4E shows a particular implementation of the customized packaging production system 324\* of FIG. 4D illustrated as customized packaging production system 324'.

FIG. 4E illustrates a particular implementation of the customized packaging production system 324* of FIG. 4D (illustrated as customized packaging production system 324'). The customized packaging production system 324' includes a label printing system 152 for printing customized information 26* onto a label 220, and a label adhesion system 154 for affixing the label 220 onto a packaging (e.g., a wrapping sheet, a cup, a bag, a plate, and so forth) to generate a customized packaging 24*.

Figure 4F:
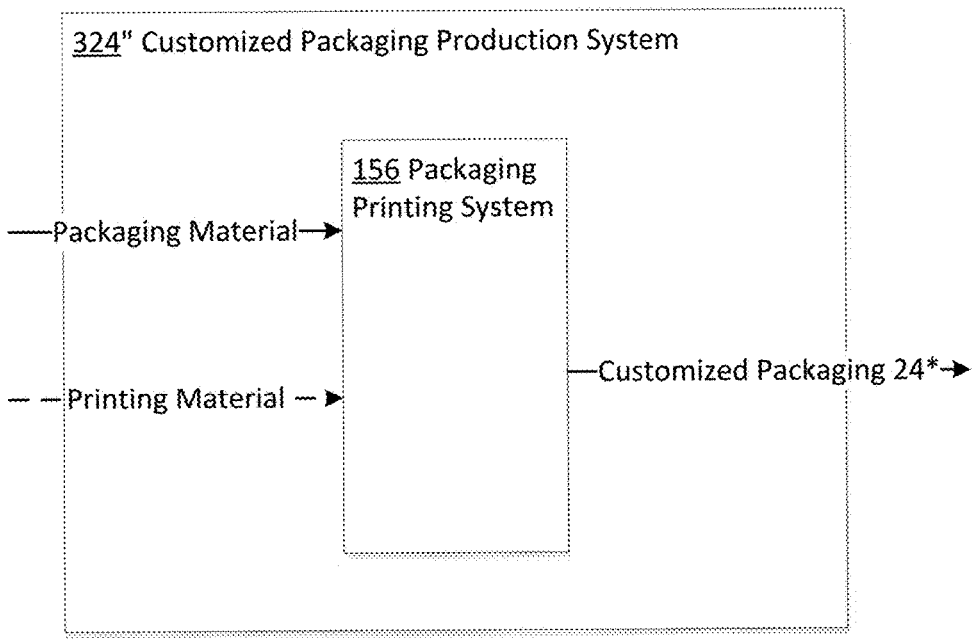
FIG. 4F shows another implementation of the customized packaging production system 324\* of FIG. 4D illustrated as customized packaging production system 324".

FIG. 4F illustrates another implementation of the customized packaging production system 324* of FIG. 4D (illustrated as customized packaging production system 324''). The customized packaging production system 324'' includes a packaging printing system 156 for printing customized information 26* directly onto packaging in order to generate customized packaging 24*. The various components of the customized packaging production system 324' of FIG. 4E and the customized packaging production system 324'' of FIG. 4F may be implemented using automated robotic components.

FIG. 4G illustrates a particular implementation of the robotic packing system 325* of FIG. 4D (illustrated as robotic packing system 325'). The robotic packing system 325' includes a customized food item placement system 160 for placing a customized food item 22c onto a customized packaging 24c, and a customized packaging wrapping system 162 for wrapping the customized food item 22c in the customized packaging 24c.

FIG. 4H illustrates another implementation of the robotic packing system 325* of FIG. 4D (illustrated as robotic packing system 325''). The robotic packing system 325'' includes a customized food item deposition system 164 for depositing or placing customized food items 22* onto customized packagings 24*. In various embodiments, both of the implementations of the robotic packing system 325* illustrated in FIGS. 4G and 4H may be automated robotic systems.

Figure 5:
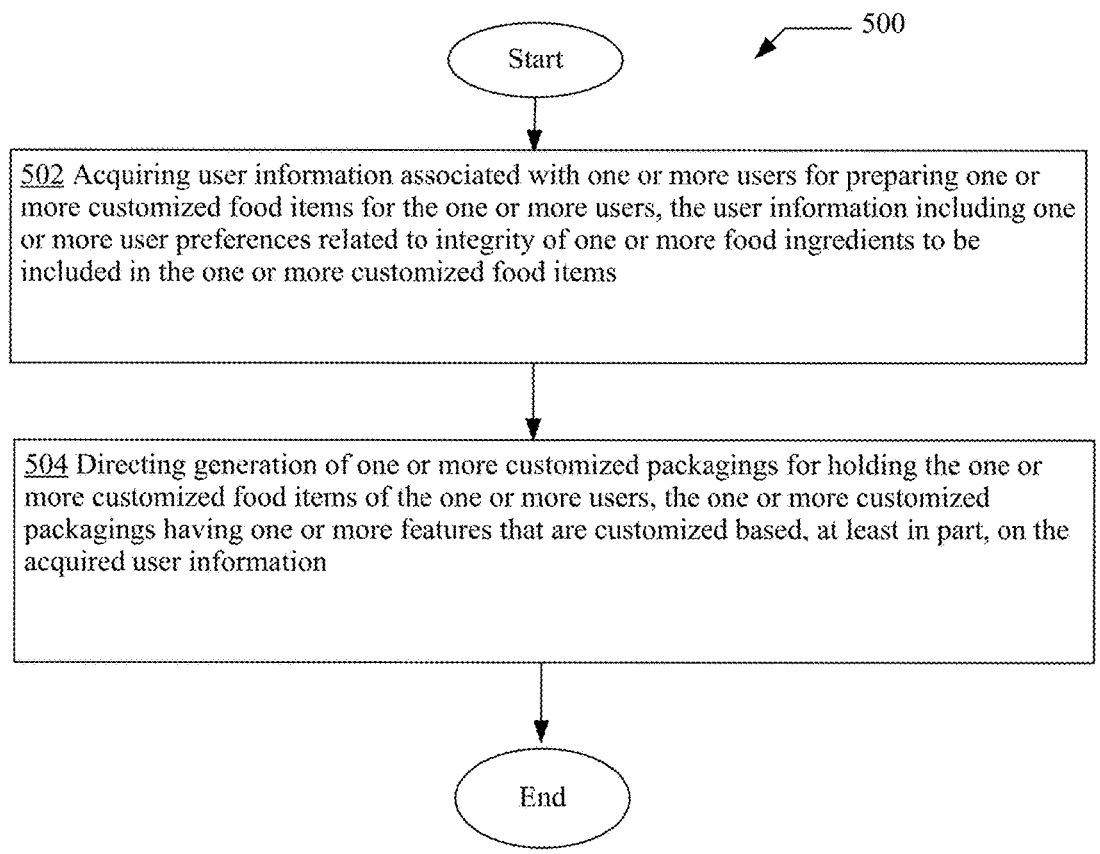
FIG. 5 is a high-level logic flowchart of a process, e.g., operational flow 500, according to some embodiments.

In the following, various operations are presented in accordance with various embodiments that may be implemented by the customized food preparation system 10* of FIG. 3A, 3B, or 3C, or that may be implemented by the network control system 12* of FIG. 3D or 3E. FIG. 5, for example, illustrates an operational flow 500 representing example computationally-implemented operations that may be implemented for, among other things, directing generation of a customized packaging for one or more customized food items that that are customized for, for example, a particular user. In some implementations, at least some portions of these operations may be implemented through the customized food preparation system 10* (e.g., the customized food preparation system 10a, customized food preparation system 10b, or the customized food preparation system 10c) of, for example, FIG. 3A, 3B, or 3C or through the network control system 12* (e.g., the network control system 12a or the network control system 12b) of FIG. 3D or 3E.

In FIG. 5 and in the following figures that include various examples of operational flows, discussions and explanations will be provided with respect to the customized food preparation system 10* or the network control system 12* described above and as illustrated in FIGS. 3A, 3B, 3C, 3D, 3E, 4A, 4B, 4C, 4D, 4E, 4F, 4G, and 4H, and/or with respect to other examples (e.g., as provided in FIGS. 1A, 1B, 2A, 2B, 2C, 2D, 2E, and 2F) and contexts. However, it should be understood that the operational flows may be executed in a number of other environments and contexts, and/or in modified versions of FIGS. 1A, 1B, 2A, 2B, 2C, 2D, 2E, 2F, 3A, 3B, 3C, 3D, 3E, 4A, 4B, 4C, 4D, 4E, 4F, 4G, and 4H. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a user information acquiring operation 502 for acquiring user information associated with one or more users for preparing one or more customized food items for the one or more users, the user information including one or more user preferences related to integrity of one or more food ingredients to be included in the one or more customized food items. For instance, and as illustration, the user information obtaining module 302* of the customized food preparation system 10* of FIG. 3A or 3B or of the network control system 12* of FIG. 3D or 3E acquiring or obtaining user information (e.g., user identification, user selection of food item or customization, user dietary information, etc.) associated with one or more users for preparing one or more customized food items 22* (e.g., customized energy bar, customized soup, customized meal, and so forth) for the one or more users, the user information including one or more user preferences related to integrity of one or more food ingredients to be included in the one or more customized food items 22*.

Operational flow 500 may also include a customized packaging generation directing operation 504 for directing generation of one or more customized packagings for holding the one or more customized food items of the one or more users, the one or more customized packagings having one or more features that are customized based, at least in part, on the acquired user information. For instance, the customized packaging generation controlling module 304* of the customized food preparation system 10* of FIG. 3A or 3B (or of the network control system 12* of FIG. 3D or 3E) directing or controlling generation of one or more customized packagings 24* (e.g., customized wrapping sheet, customized bag, customized plate, customized cup, and so forth) for holding the one or more customized food items 22* of the one or more users, the one or more customized packagings 24* having one or more features (e.g., textual information) that are customized based, at least in part, on the acquired user information.

Figure 6A:
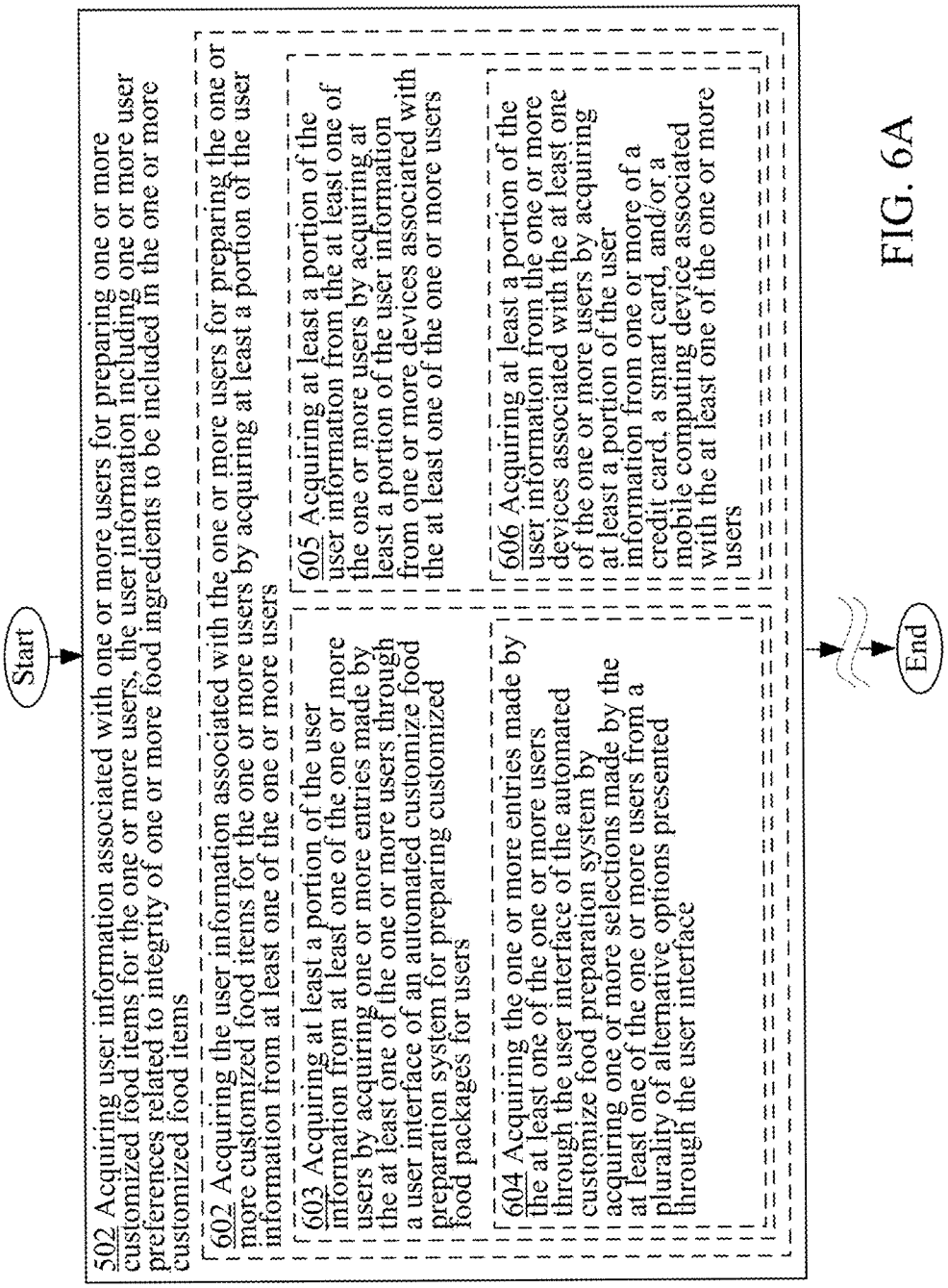
FIG. 6A is a high-level logic flowchart of a process depicting alternate implementations of the user information acquiring operation 502 of FIG. 5.

As will be described below, the user information acquiring operation 502 and the customized packaging generation directing module 504 may be executed in a variety of different ways in various alternative implementations. FIGS. 6A, 6B, 6C, 6D, 6E, 6F, 6G, 6H, and 6J for example, illustrate at least some of the alternative ways that the user information acquiring operation 502 of FIG. 5 may be executed in various alternative implementations. In some cases, for example, the user information acquiring operation 502 may include an operation 602 for acquiring the user information associated with the one or more users for preparing the one or more customized food items for the one or more users by acquiring at least a portion of the user information from at least one of the one or more users as illustrated in FIG. 6A. For instance, the user information obtaining module 302* of the customized food preparation system 10a or 10b of FIG. 3A or 3B (or of the network control system 12a or 12b of FIG. 3D or 3E) acquiring the user information associated with the one or more users for preparing the one or more customized food items 22* for the one or more users by acquiring or obtaining at least a portion of the user information from at least one of the one or more users as entered via, for example, user interface 360 (e.g., touchscreen and/or keypad) of FIG. 3A, 3B, or 3C.

In various implementations, operation 602 may further include one or more additional operations including, in some cases, an operation 603 for acquiring at least a portion of the user information from at least one of the one or more users by acquiring one or more entries made by the at least one of the one or more users through a user interface of an automated customize food preparation system for preparing customized food packages for users. For instance, the user information obtaining module 302* including the user entry obtaining module 402 (see FIG. 4A) of the customized food preparation system 10a or 10b of FIG. 3A or 3B (or of the network control system 12a or 12b of FIG. 3D or 3E) acquiring at least a portion of the user information from at least one of the one or more users by having the user entry obtaining module 402 acquire or obtain one or more entries made by the at least one of the one or more users through a user interface 360 (e.g., touchscreen) of an automated customize food preparation system 10* for preparing customized food packages 20 (e.g., customized food items 22* and customized packagings 24*) for users.

In some implementations, operation 603 may further include an operation 604 for acquiring the one or more entries made by the at least one of the one or more users through the user interface of the automated customize food preparation system by acquiring one or more selections made by the at least one of the one or more users from a plurality of alternative options presented through the user interface. For instance, the user entry obtaining module 402 including the user selection obtaining module 404 (see FIG. 4A) of the customized food preparation system 10a or 10b of FIG. 3A or 3B (or of the network control system 12a or 12b of FIG. 3D or 3E) acquiring the one or more entries made by the at least one of the one or more users through the user interface 360 of the automated customize food preparation system 10* by having the user selection obtaining module 404 acquire or obtain one or more selections (e.g., selection from a food menu, selection made from a customization menu such as sweeter, saltier, etc., selection from an ingredient preference menu, etc.) made by the at least one of the one or more users from a plurality of alternative options presented through the user interface 360 (e.g., display 30 of FIG. 1A).

In some cases, operation 602 may include an operation 605 for acquiring at least a portion of the user information from the at least one of the one or more users by acquiring at least a portion of the user information from one or more devices associated with the at least one of the one or more users. For instance, the user information obtaining module 302* of the customized food preparation system 10a or 10b of FIG. 3A or 3B (or of the network control system 12a or 12b of FIG. 3D or 3E) acquiring at least a portion of the user information from the at least one of the one or more users by acquiring or obtaining at least a portion of the user information from one or more devices (e.g., mobile devices in the possession of users) associated with the at least one of the one or more users.

In some implementations, operation 605 may include an operation 606 for acquiring at least a portion of the user information from the one or more devices associated with the at least one of the one or more users by acquiring at least a portion of the user information from one or more of a credit card, a smart card, and/or a mobile computing device associated with the at least one of the one or more users. For instance, the user information obtaining module 302* of the customized food preparation system 10a or 10b of FIG. 3A or 3B (or of the network control system 12a or 12b of FIG. 3D or 3E) acquiring at least a portion of the user information from the one or more devices associated with the at least one of the one or more users by acquiring or obtaining at least a portion of the user information from one or more of a credit card, a smart card, and/or a mobile computing device (e.g., a smartphone, a tablet computer, a laptop, and so forth) associated with the at least one of the one or more users.

Figure 6B:
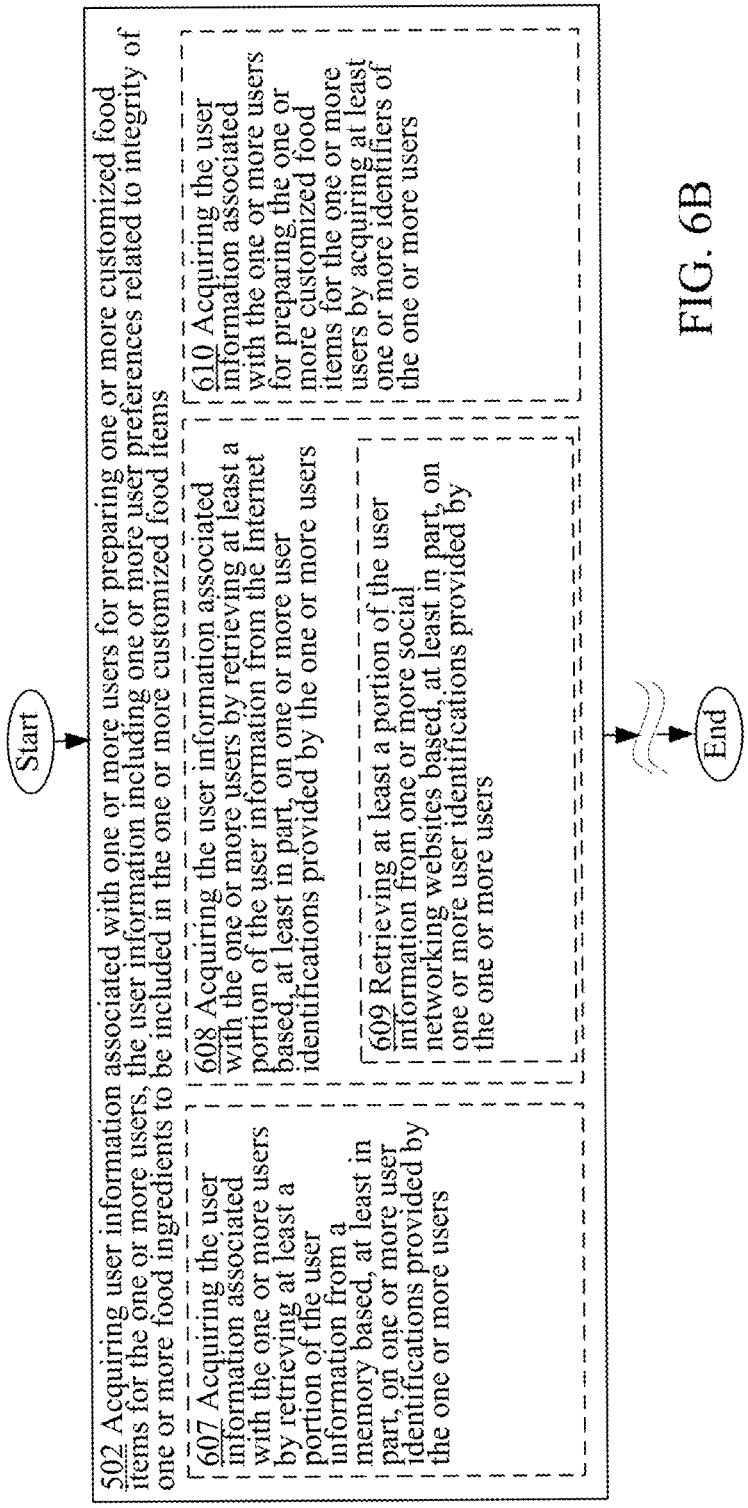
FIG. 6B is a high-level logic flowchart of a process depicting alternate implementations of the user information acquiring operation 502 of FIG. 5.

Referring now to FIG. 6B, in some cases, the user information acquiring operation 502 may actually include an operation 607 for acquiring the user information associated with the one or more users by retrieving at least a portion of the user information from a memory based, at least in part, on one or more user identifications provided by the one or more users. For instance, the user information obtaining module 302* including the memory retrieving module 406 (see FIG. 4A) of the customized food preparation system 10a or 10b of FIG. 3A or 3B (or of the network control system 12a or 12b of FIG. 3D or 3E) acquiring the user information associated with the one or more users by having the memory retrieving module 406 retrieve at least a portion of the user information (e.g., dietary schedules of a particular user, dietary restrictions of a particular user, historical dietary consumption data of a particular user, and so forth) from a memory 340 based, at least in part, on one or more user identifications (e.g., actual name, username, identification number, and so forth) provided by the one or more users.

In the same or alternative implementations, the user information acquiring operation 502 may include an operation 608 for acquiring the user information associated with the one or more users by retrieving at least a portion of the user information from the Internet based, at least in part, on one or more user identifications provided by the one or more users. For instance, the user information obtaining module 302* including the Internet retrieving module 408 (see FIG. 4A) of the customized food preparation system 10a or 10b of FIG. 3A or 3B (or of the network control system 12a or 12b of FIG. 3D or 3E) acquiring the user information associated with the one or more users by having the Internet retrieving module 408 retrieve at least a portion of the user information from the Internet based, at least in part, on one or more user identifications (e.g., usernames and passwords) provided by the one or more users.

In some cases, operation 608 may further include an operation 609 for retrieving at least a portion of the user information from one or more social networking websites based, at least in part, on one or more user identifications provided by the one or more users. For instance, the Internet retrieving module 408 of the customized food preparation system 10a or 10b of FIG. 3A or 3B (or of the network control system 12a or 12b of FIG. 3D or 3E) retrieving at least a portion of the user information from one or more social networking websites based, at least in part, on one or more user identifications (e.g., usernames and passwords) provided by the one or more users.

In the same or alternative implementations, the user information acquiring operation 502 may include an operation 610 for acquiring the user information associated with the one or more users for preparing the one or more customized food items for the one or more users by acquiring at least one or more identifiers of the one or more users. For instance, the user information obtaining module 302* including the user identifier obtaining module 410 (see FIG. 4A) of the customized food preparation system 10a or 10b of FIG. 3A or 3B (or of the network control system 12a or 12b of FIG. 3D or 3E) acquiring the user information associated with the one or more users for preparing the one or more customized food items for the one or more users by having the user identifier obtaining module 410 acquire (e.g., obtain) at least one or more identifiers (e.g., usernames, user number, etc.) of the one or more users.

Figure 6C:
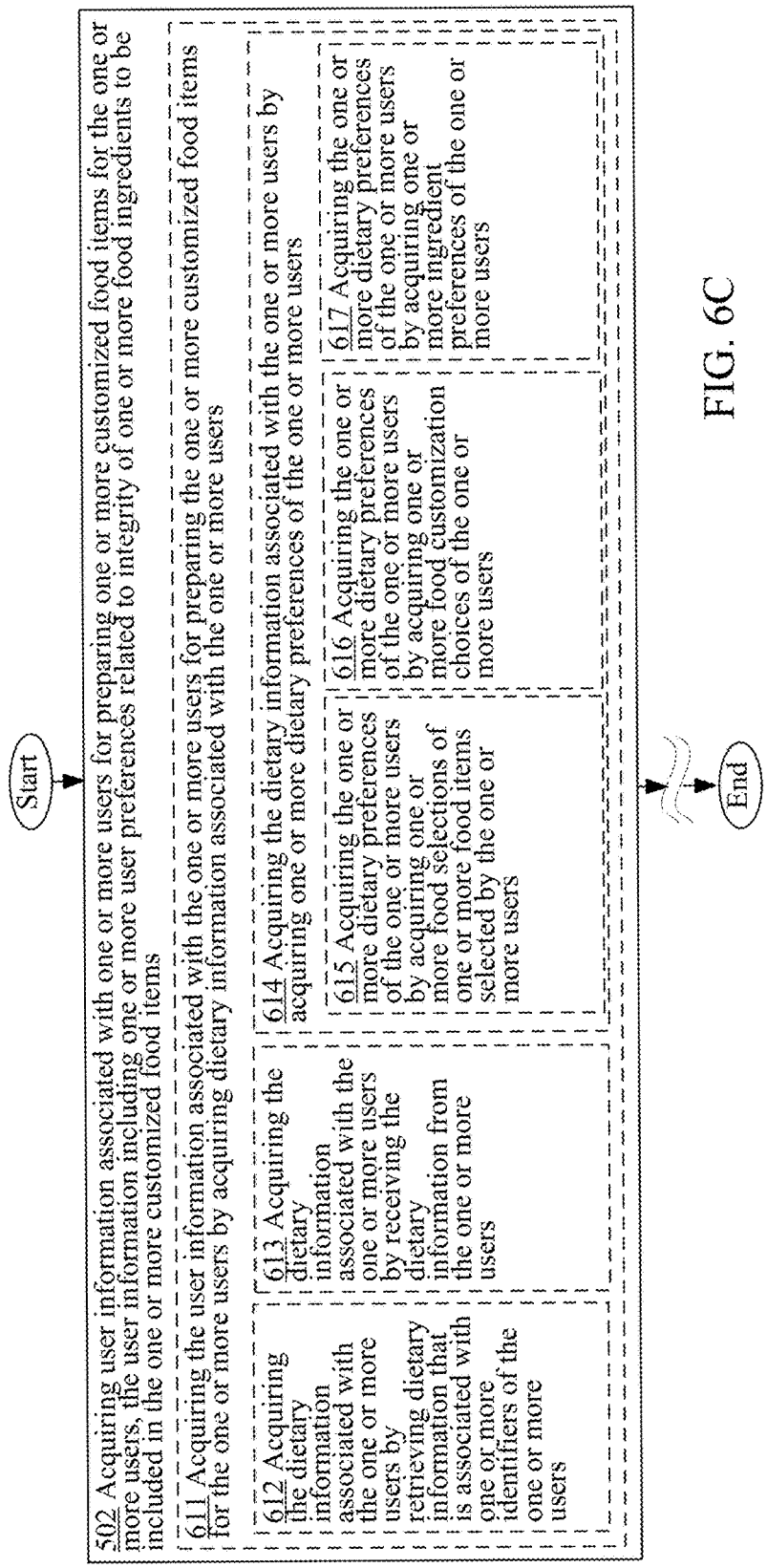
FIG. 6C is a high-level logic flowchart of a process depicting alternate implementations of the user information acquiring operation 502 of FIG. 5.

Turning now to FIG. 6C, in various implementations, the user information acquiring operation 502 may actually involve an operation 611 for acquiring the user information associated with the one or more users for preparing the one or more customized food items for the one or more users by acquiring dietary information associated with the one or more users. For instance, the user information obtaining module 302* including the dietary information obtaining module 412 (see FIG. 4A) of the customized food preparation system 10a or 10b of FIG. 3A or 3B (or of the network control system 12a or 12b of FIG. 3D or 3E) acquiring the user information associated with the one or more users for preparing the one or more customized food items for the one or more users by having the dietary information obtaining module 412 acquire (e.g., obtain) dietary information (e.g., dietary plans or schedules, dietary restrictions, dietary consumption history, and so forth) associated with the one or more users.

Figure 6D:
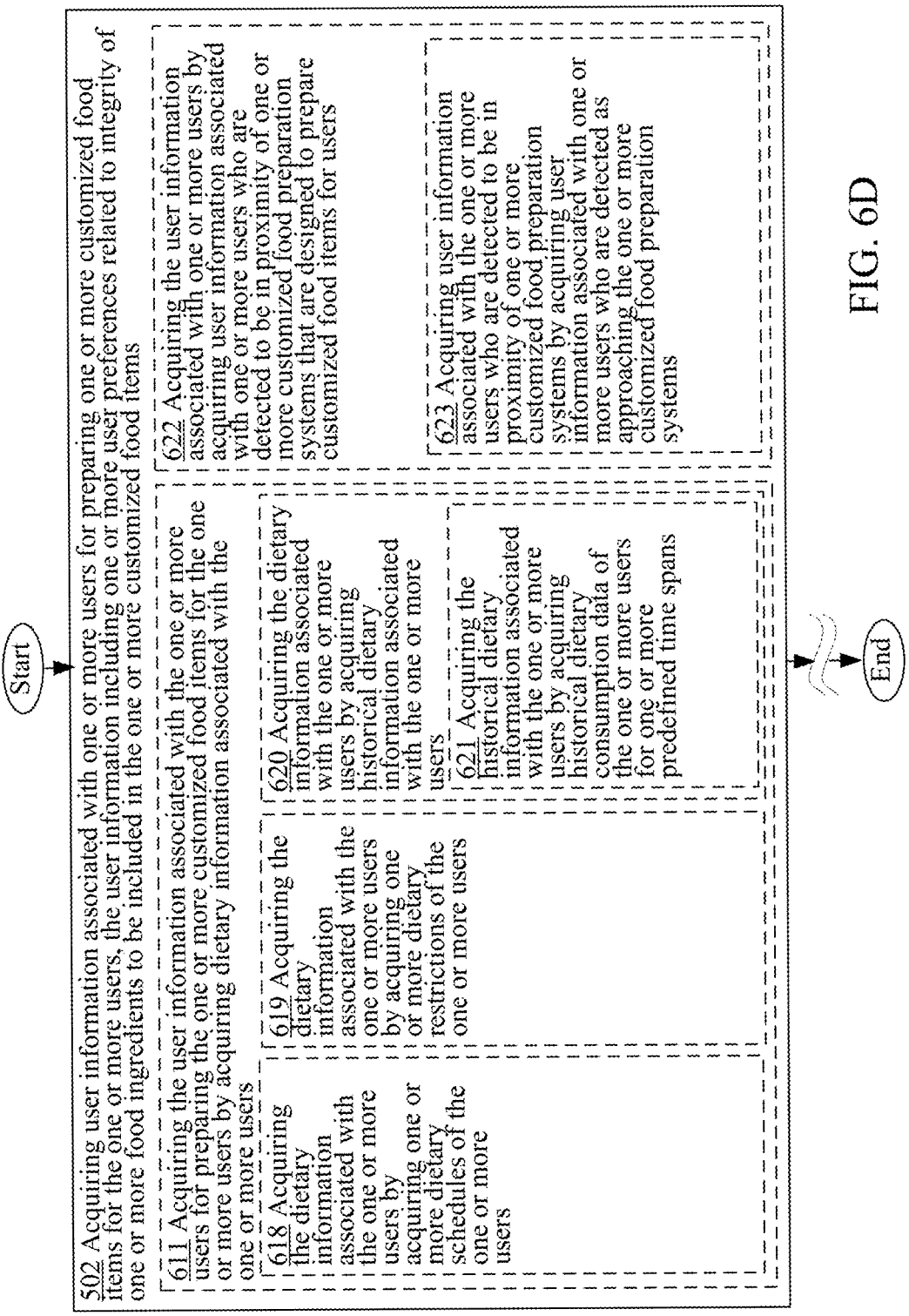
FIG. 6D is a high-level logic flowchart of a process depicting alternate implementations of the user information acquiring operation 502 of FIG. 5.

As further illustrated in FIGS. 6C and 6D, operation 611 may include one or more additional operations in various alternative implementations including, in some cases, an operation 612 for acquiring the dietary information associated with the one or more users by retrieving dietary information that is associated with one or more identifiers of the one or more users. For instance the dietary information obtaining module 412 including the dietary information retrieving module 414 (see FIG. 4A) of the customized food preparation system 10a or 10b of FIG. 3A or 3B (or of the network control system 12a or 12b of FIG. 3D or 3E) acquiring or obtaining the dietary information associated with the one or more users by having the dietary information retrieving module 414 retrieve (e.g., retrieve from a memory 340 or from the Internet) dietary information that is associated with one or more identifiers (e.g., usernames) of the one or more users.

In the same or alternative implementations, operation 611 may include an operation 613 for acquiring the dietary information associated with the one or more users by receiving the dietary information from the one or more users. For instance the dietary information obtaining module 412 including the dietary information receiving module 416 (see FIG. 4A) of the customized food preparation system 10a or 10b of FIG. 3A or 3B (or of the network control system 12a or 12b of FIG. 3D or 3E) acquiring or obtaining the dietary information associated with the one or more users by having the dietary information receiving module 416 receive the dietary information (e.g., food item selection) from the one or more users.

In the same or alternative implementations, operation 611 may include an operation 614 for acquiring the dietary information associated with the one or more users by acquiring one or more dietary preferences of the one or more users. For instance the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining one or more dietary preferences (e.g., choices or selections) of the one or more users.

In some implementations, operation 614 may actually include an operation 615 for acquiring the one or more dietary preferences of the one or more users by acquiring one or more food selections of one or more food items selected by the one or more users. For instance the dietary information obtaining module 412 of the customized food preparation system 10a or 10b of FIG. 3A or 3B (or of the network control system 12a or 12b of FIG. 3D or 3E) acquiring the one or more dietary preferences of the one or more users by acquiring or obtaining one or more food selections of one or more food items selected by the one or more users. For example, a user selecting a peanut butter energy bar rather than a strawberry energy bar or chocolate chip-pecan energy bar.

In some implementations, operation 614 may additionally or alternatively include an operation 616 for acquiring the one or more dietary preferences of the one or more users by acquiring one or more food customization choices of the one or more users. For instance the dietary information obtaining module 412 of the customized food preparation system 10a or 10b of FIG. 3A or 3B (or of the network control system 12a or 12b of FIG. 3D or 3E) acquiring the one or more dietary preferences (e.g., very spicy, very sweet, more calories, less sweet, and so forth) of the one or more users by acquiring or obtaining one or more food customization choices of the one or more users.

In some implementations, operation 614 may additionally or alternatively include an operation 617 for acquiring the one or more dietary preferences of the one or more users by acquiring one or more ingredient preferences of the one or more users. For instance the dietary information obtaining module 412 of the customized food preparation system 10a or 10b of FIG. 3A or 3B (or of the network control system 12a or 12b of FIG. 3D or 3E) acquiring the one or more dietary preferences of the one or more users by acquiring or obtaining one or more ingredient preferences (e.g., reduced salt content, high fiber content, reduced sugar, and so forth) of the one or more users.

In the same or alternative implementations, operation 611 may include an operation 618 for acquiring the dietary information associated with the one or more users by acquiring one or more dietary schedules of the one or more users as illustrated in FIG. 6D. For instance the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining one or more dietary schedules (e.g., diet plans) of the one or more users.

In some implementations, operation 611 may additionally or alternatively include an operation 619 for acquiring the dietary information associated with the one or more users by acquiring one or more dietary restrictions of the one or more users. For instance the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining one or more dietary restrictions (e.g., low-sodium requirement, low-carbohydrate requirement, and so forth) of the one or more users.

In some implementations, operation 611 may additionally or alternatively include an operation 620 for acquiring the dietary information associated with the one or more users by acquiring historical dietary information associated with the one or more users. For instance the dietary information obtaining module 412 of the customized food preparation system 10a or 10b of FIG. 3A or 3B (or of the network control system 12a or 12b of FIG. 3D or 3E) acquiring the dietary information associated with the one or more users by acquiring or obtaining historical dietary information associated with the one or more users. For example, previous purchases of customized food items by a particular user may be continuously recorded and tracked. Such information may then be retrieved or made available once the particular user is, for example, ready to purchase another customized food item.

As further illustrated in FIG. 6D, operation 620 may further include an operation 621 for acquiring the historical dietary information associated with the one or more users by acquiring historical dietary consumption data of the one or more users for one or more predefined time spans. For instance the dietary information obtaining module 412 of the customized food preparation system 10a or 10b of FIG. 3A or 3B (or of the network control system 12a or 12b of FIG. 3D or 3E) acquiring the historical dietary information associated with the one or more users by acquiring or obtaining historical dietary consumption data of the one or more users for one or more predefined time spans (e.g., food consumption information for previous two months such as sodium consumption data).

In various implementations, the user information acquiring operation 502 may include an operation 622 for acquiring the user information associated with one or more users by acquiring user information associated with one or more users who are detected to be in proximity of one or more customized food preparation systems that are designed to prepare customized food items for users. For instance, the user information obtaining module 302* of the customized food preparation system 10a or 10b of FIG. 3A or 3B (or of the network control system 12a or 12b of FIG. 3D or 3E) acquiring the user information associated with one or more users by acquiring or obtaining user information associated with one or more users who are detected by, for example, the user proximity detecting module 308* (see FIG. 3A, 3B, 3D, or 3E), to be in proximity (e.g., within 30 feet) of one or more customized food preparation systems 10* that are designed to prepare customized food items for users.

In some cases, operation 622 may, in turn, further include an operation 623 for acquiring user information associated with the one or more users who are detected to be in proximity of one or more customized food preparation systems by acquiring user information associated with one or more users who are detected as approaching the one or more customized food preparation systems. For instance, the user information obtaining module 302* of the customized food preparation system 10a or 10b of FIG. 3A or 3B (or of the network control system 12a or 12b of FIG. 3D or 3E) acquiring user information associated with the one or more users who are detected to be in proximity of one or more customized food preparation systems by acquiring or obtaining user information associated with one or more users who are detected by, for example, the user proximity detecting module 308*, as approaching the one or more customized food preparation systems.

Figure 6E:
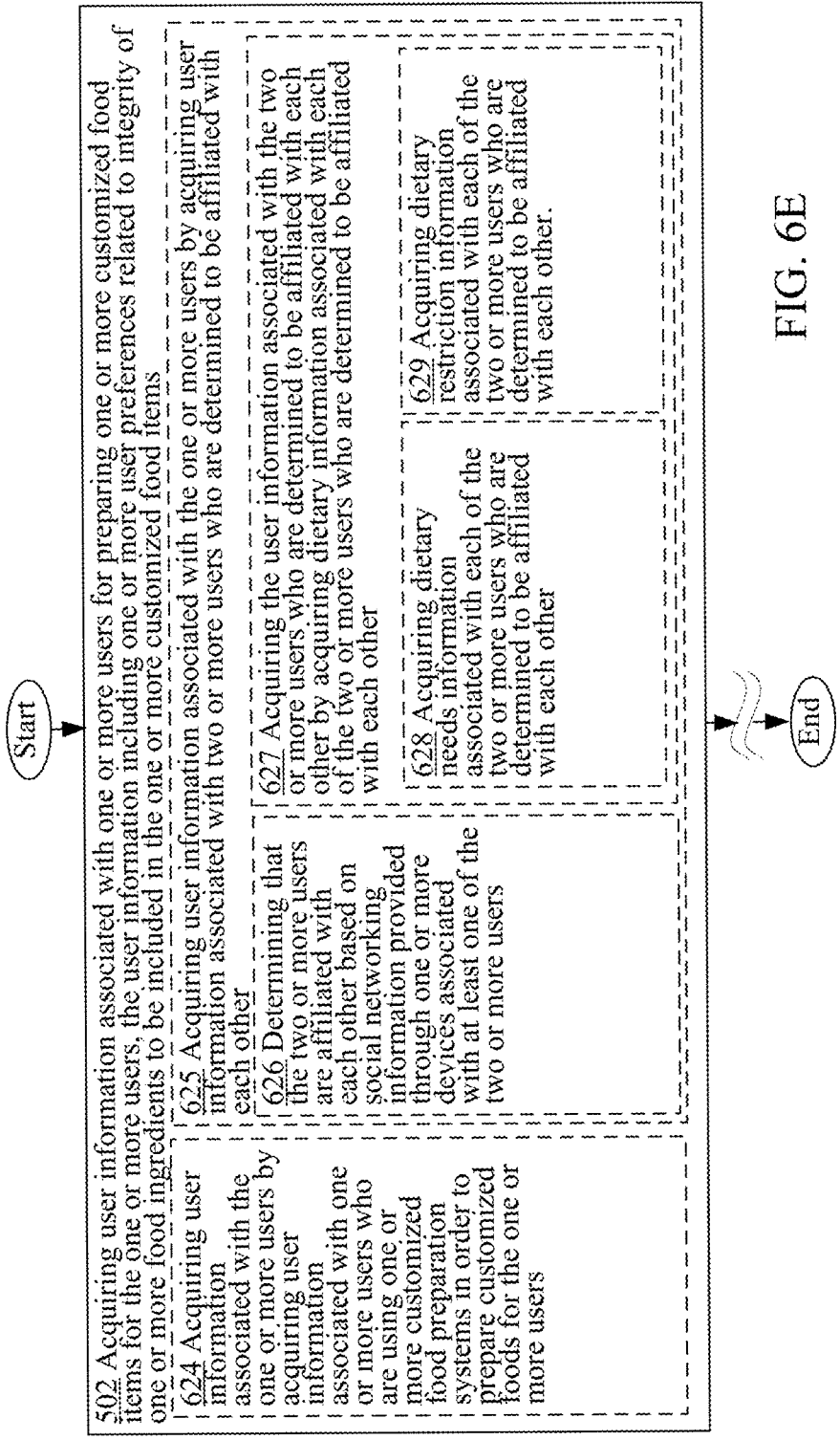
FIG. 6E is a high-level logic flowchart of a process depicting alternate implementations of the user information acquiring operation 502 of FIG. 5.

Referring to FIG. 6E, in some implementations, the user information acquiring operation 502 of FIG. 5 may include an operation 624 for acquiring user information associated with the one or more users by acquiring user information associated with one or more users who are using one or more customized food preparation systems in order to prepare customized foods for the one or more users. For instance, the user information obtaining module 302* of the customized food preparation system 10a or 10b of FIG. 3A or 3B (or of the network control system 12a or 12b of FIG. 3D or 3E) acquiring user information associated with the one or more users by acquiring or obtaining user information associated with one or more users who are using (e.g., engaged or interfacing with) one or more customized food preparation systems 10* in order to prepare customized foods for the one or more users. In some implementations, a determination may be made as to whether a particular user is engaged or interfacing with a customized food preparation system 10* when the user provides input (e.g., input via keypad or via credit card or smartcard) into the customized food preparation system 10*.

In various implementations, the user information acquiring operation 502 may include an operation 625 for acquiring user information associated with the one or more users by acquiring user information associated with two or more users who are determined to be affiliated with each other. For instance, the user information obtaining module 302* including the user affiliated determining module 418 (see FIG. 4A) of the customized food preparation system 10a or 10b of FIG. 3A or 3B (or of the network control system 12a or 12b of FIG. 3D or 3E) acquiring user information associated with the one or more users by acquiring or obtaining user information associated with two or more users who are determined, by the user affiliated determining module 418, to be affiliated with each other (e.g., are social or business acquaintances). Various techniques may be employed in order to determine whether two or more users are affiliated with each other.

For example, in some implementations, operation 625 may include an operation 626 for determining that the two or more users are affiliated with each other based on social networking information provided through one or more devices associated with at least one of the two or more users. For instance, the user affiliated determining module 418 of the customized food preparation system 10a or 10b of FIG. 3A or 3B (or of the network control system 12a or 12b of FIG. 3D or 3E) determining that the two or more users are affiliated with each other based on social networking information provided through one or more devices (e.g., mobile devices such as Smartphones) associated with at least one of the two or more users. For example, a mobile device such as a smartphone of a user may provide various social networking information through a social networking website, which the mobile device has access to, or through an application such as Microsoft Outlook that has contact information of acquaintances.

In the same or alternative implementations, operation 625 may additionally or alternatively include an operation 627 for acquiring the user information associated with the two or more users who are determined to be affiliated with each other by acquiring dietary information associated with each of the two or more users who are determined to be affiliated with each other. For instance, the user information obtaining module 302* including the dietary information obtaining module 412 of the customized food preparation system 10a or 10b of FIG. 3A or 3B (or of the network control system 12a or 12b of FIG. 3D or 3E) acquiring the user information associated with the two or more users who are determined to be affiliated with each other by having the dietary information obtaining module 412 acquire or obtain dietary information associated with each of the two or more users who are determined by, for example, the user affiliated determining module 418, to be affiliated with each other.

As further illustrated in FIG. 6E, operation 627 may actually include or involve one or more additional operations including, in some cases, an operation 628 for acquiring dietary needs information associated with each of the two or more users who are determined to be affiliated with each other. For instance, the dietary information obtaining module 412 of the customized food preparation system 10a or 10b of FIG. 3A or 3B (or of the network control system 12a or 12b of FIG. 3D or 3E) acquiring or obtaining dietary needs information (e.g., high fiber diet or vitamin D enriched diet) associated with each of the two or more users who are determined by, for example, the user affiliated determining module 418, to be affiliated with each other.

In the same or alternative implementations, operation 627 may additionally or alternatively include an operation 629 for acquiring dietary restriction information associated with each of the two or more users who are determined to be affiliated with each other. For instance, the dietary information obtaining module 412 of the customized food preparation system 10a or 10b of FIG. 3A or 3B (or of the network control system 12a or 12b of FIG. 3D or 3E) acquiring or obtaining dietary restriction information (e.g., low-sodium diet, low-carbohydrate diet, and so forth) associated with each of the two or more users who are determined by, for example, the user affiliated determining module 418, to be affiliated with each other.

Figure 6F:
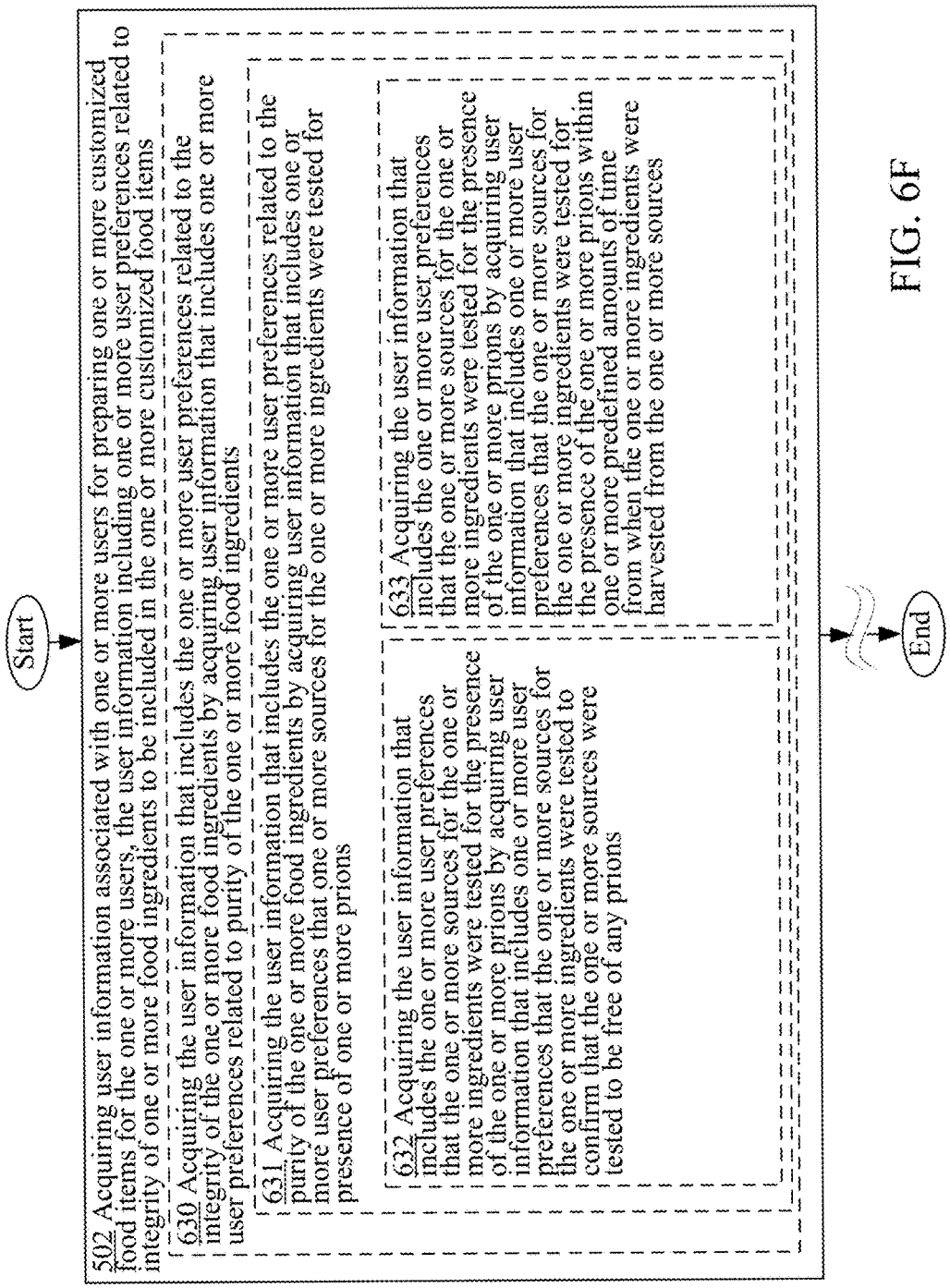
FIG. 6F is a high-level logic flowchart of a process depicting alternate implementations of the user information acquiring operation 502 of FIG. 5.

Referring now to FIG. 6F, in various implementations, the user information acquiring operation 502 may include an operation 630 for acquiring the user information that includes the one or more user preferences related to the integrity of the one or more food ingredients by acquiring user information that includes one or more user preferences related to purity of the one or more food ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the integrity of the one or more food ingredients by acquiring or obtaining user information that includes one or more user preferences (e.g., user prefers no antibiotics in the customized food or prefers that beef ingredients not come from Britain) related to purity of the one or more food ingredients.

Figure 6G:
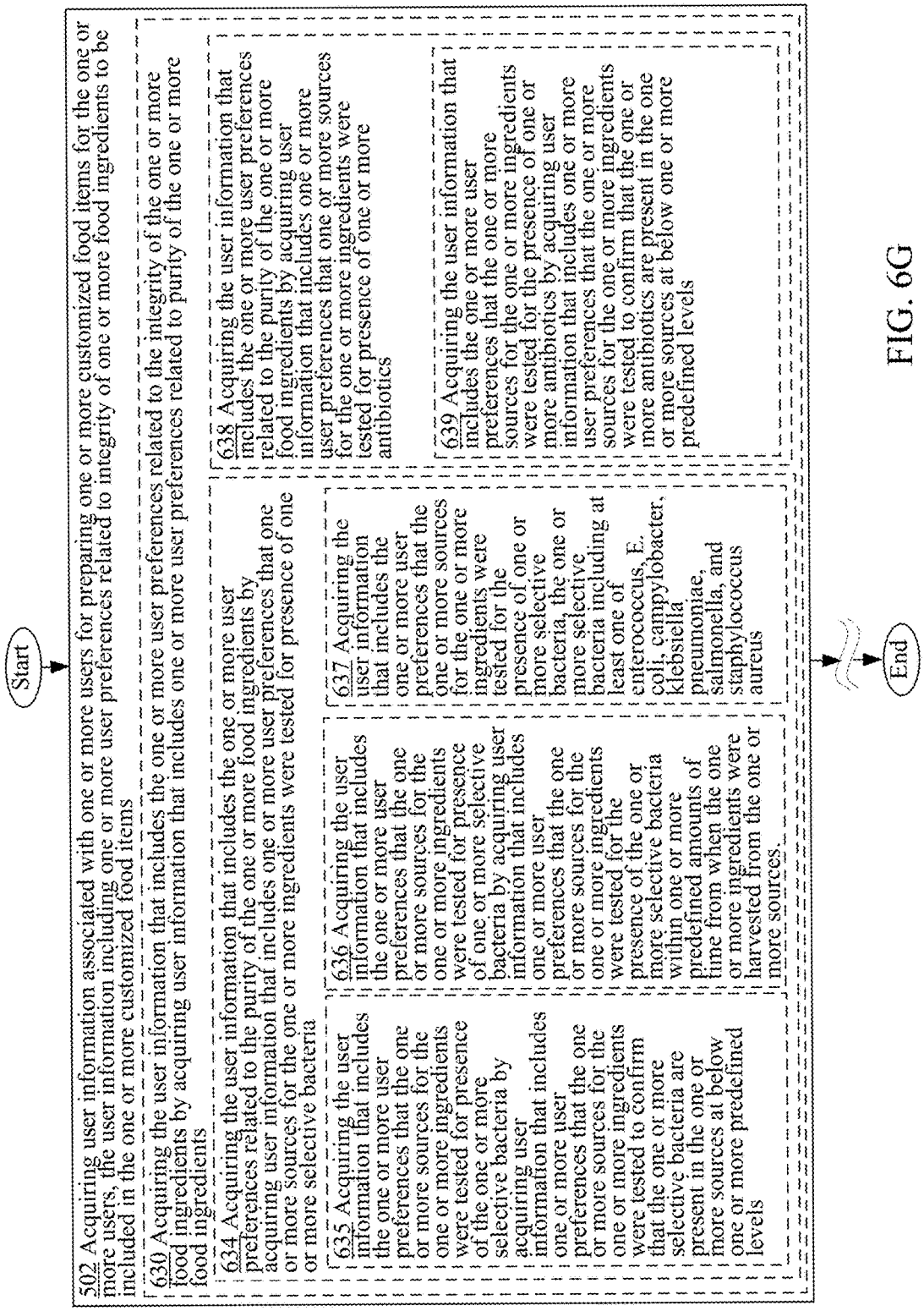
FIG. 6G is a high-level logic flowchart of a process depicting alternate implementations of the user information acquiring operation 502 of FIG. 5.
Figure 6H:
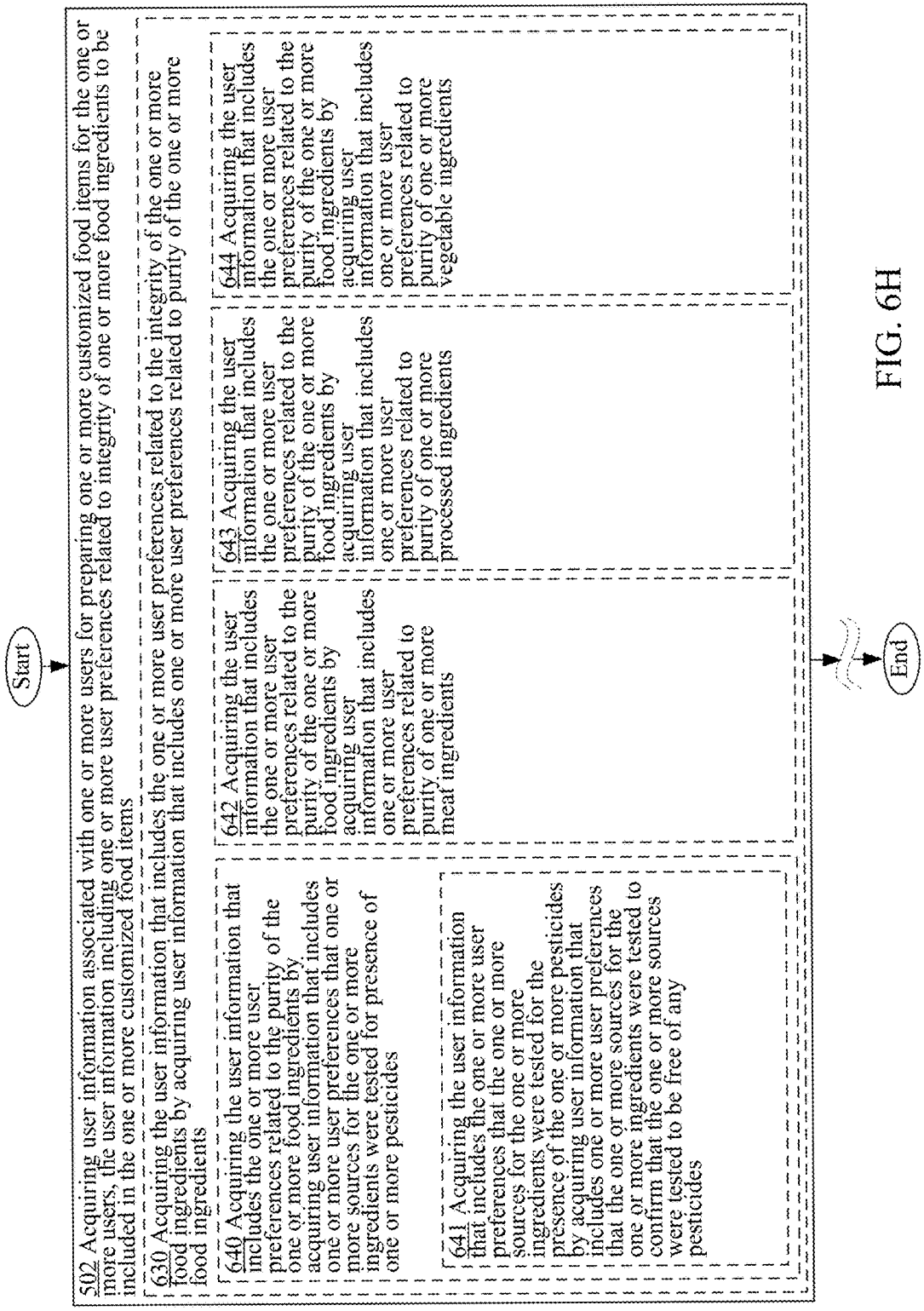
FIG. 6H is a high-level logic flowchart of a process depicting alternate implementations of the user information acquiring operation 502 of FIG. 5.

As further illustrated in FIGS. 6F, 6G, and 6H, operation 630 may further include one or more additional operations in various alternative implementations. For example, in some cases, operation 630 may include an operation 631 for acquiring the user information that includes the one or more user preferences related to the purity of the one or more food ingredients by acquiring user information that includes one or more user preferences that one or more sources for the one or more ingredients were tested for presence of one or more prions as illustrated in FIG. 6F. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the purity of the one or more food ingredients by acquiring user information that includes one or more user preferences that one or more sources (e.g., domesticated animals such as cattle, pork, poultry, and so forth) for the one or more ingredients were tested for presence of one or more prions.

Operation 631, in turn, may further include an operation 632 for acquiring the user information that includes the one or more user preferences that the one or more sources for the one or more ingredients were tested for the presence of the one or more prions by acquiring user information that includes one or more user preferences that the one or more sources for the one or more ingredients were tested to confirm that the one or more sources were free of any prions in various implementations. For instance, the user information obtaining module 302* of the customized food preparation system 10a or 10b of FIG. 3A or 3B (or of the network control system 12a or 12b of FIG. 3D or 3E) acquiring the user information that includes the one or more user preferences that the one or more sources for the one or more ingredients were tested for the presence of the one or more prions by acquiring or obtaining user information that includes one or more user preferences that the one or more sources for the one or more ingredients were tested (e.g., saliva testing, DNA sequencing, and so forth) to confirm that the one or more sources were tested to be free of any prions.

In some implementations, operation 631 may include an operation 633 for acquiring the user information that includes the one or more user preferences that the one or more sources for the one or more ingredients were tested for the presence of the one or more prions by acquiring user information that includes one or more user preferences that the one or more sources for the one or more ingredients were tested for the presence of the one or more prions within one or more predefined amounts of time from when the one or more ingredients were harvested from the one or more sources. For instance, the user information obtaining module 302* of the customized food preparation system 10a or 10b of FIG. 3A or 3B (or of the network control system 12a or 12b of FIG. 3D or 3E) acquiring the user information that includes the one or more user preferences that the one or more sources for the one or more ingredients were tested for the presence of the one or more prions by acquiring or obtaining user information that includes one or more user preferences that the one or more sources for the one or more ingredients were tested for the presence of the one or more prions within one or more predefined amounts of time (e.g., 6 months) from when the one or more ingredients were harvested (e.g., when the animal was slaughtered) from the one or more sources (e.g., cattle).

In some implementations, operation 630 may include an operation 634 for acquiring the user information that includes the one or more user preferences related to the purity of the one or more food ingredients by acquiring user information that includes one or more user preferences that one or more sources for the one or more ingredients were tested for presence of one or more selective bacteria as illustrated in FIG. 6G. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the purity of the one or more food ingredients by acquiring or obtaining user information that includes one or more user preferences that one or more sources (e.g., cattle, chickens, batch dairy products such as a tank of milk, batch of processed foods such as flour or sugar, and so forth) for the one or more ingredients were tested for presence of one or more selective bacteria.

Operation 634 may, in turn, include one or more additional operations including, in some cases, an operation 635 for acquiring the user information that includes the one or more user preferences that the one or more sources for the one or more ingredients were tested for presence of the one or more selective bacteria by acquiring user information that includes one or more user preferences that the one or more sources for the one or more ingredients were tested to confirm that the one or more selective bacteria are present in the one or more sources at below one or more predefined levels. For instance, the user information obtaining module 302* of the customized food preparation system 10a or 10b of FIG. 3A or 3B (or of the network control system 12a or 12b of FIG. 3D or 3E) acquiring the user information that includes the one or more user preferences that the one or more sources for the one or more ingredients were tested for presence of the one or more selective bacteria by acquiring or obtaining user information that includes one or more user preferences that the one or more sources for the one or more ingredients were tested to confirm that the one or more selective bacteria are present in the one or more sources (e.g., batch milk) at below one or more predefined levels (e.g., less than $1 \times 10^8$ cells/mL).

In some implementations, operation 634 may include an operation 636 for acquiring the user information that includes the one or more user preferences that the one or more sources for the one or more ingredients were tested for presence of one or more selective bacteria by acquiring user information that includes one or more user preferences that the one or more sources for the one or more ingredients were tested for the presence of the one or more selective bacteria within one or more predefined amounts of time from when the one or more ingredients were harvested from the one or more sources. For instance, the user information obtaining module 302* of the customized food preparation system 10a or 10b of FIG. 3A or 3B (or of the network control system 12a or 12b of FIG. 3D or 3E) acquiring the user information that includes the one or more user preferences that the one or more sources for the one or more ingredients were tested for presence of one or more selective bacteria by acquiring or obtaining user information that includes one or more user preferences that the one or more sources (e.g., chicken or milk batch) for the one or more ingredients were tested for the presence of the one or more selective bacteria within one or more predefined amounts of time (e.g., one week) from when the one or more ingredients were harvested (e.g., slaughter a chicken or draw milk from a milk batch) from the one or more sources (e.g., chicken or milk batch).

In some implementations, operation 634 may include an operation 637 for acquiring the user information that includes the one or more user preferences that the one or more sources for the one or more ingredients were tested for the presence of one or more selective bacteria, the one or more selective bacteria including at least one of *enterococcus, E. coli, campylobacter, klebsiella pneumoniae, salmonella, staphylococcus aureus*. For instance, the user information obtaining module 302* of the customized food preparation system 10a or 10b of FIG. 3A or 3B (or of the network control system 12a or 12b of FIG. 3D or 3E) acquiring or obtaining the user information that includes the one or more user preferences that the one or more sources for the one or more ingredients were tested for the presence of one or more selective bacteria, the one or more selective bacteria including at least one of *enterococcus, E. coli, campylobacter, klebsiella pneumoniae, salmonella*, or *staphylococcus aureus*.

In various implementations, operation 630 may include an operation 638 for acquiring the user information that includes the one or more user preferences related to the purity of the one or more food ingredients by acquiring user information that includes one or more user preferences that one or more sources for the one or more ingredients were tested for presence of one or more antibiotics. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the purity of the one or more food ingredients by acquiring or obtaining user information that includes one or more user preferences that one or more sources (e.g., cow, sheep, and so forth) for the one or more ingredients (e.g., meat, milk, cheese, and so forth) were tested for presence of one or more antibiotics.

In some cases, operation 638 may, in turn, further include an operation 639 for acquiring the user information that includes the one or more user preferences that the one or more sources for the one or more ingredients were tested for the presence of one or more antibiotics by acquiring user information that includes one or more user preferences that the one or more sources for the one or more ingredients were tested to confirm that the one or more antibiotics are present in the one or more sources at below one or more predefined levels. For instance, the user information obtaining module 302* of the customized food preparation system 10a or 10b of FIG. 3A or 3B (or of the network control system 12a or 12b of FIG. 3D or 3E) acquiring the user information that includes the one or more user preferences that the one or more sources for the one or more ingredients were tested for the presence of one or more antibiotics by acquiring or obtaining user information that includes one or more user preferences that the one or more sources (e.g., pork) for the one or more ingredients were tested to confirm that the one or more antibiotics are present in the one or more sources at below one or more predefined levels (e.g., a user may accept an ingredient if it does not contain levels of antibiotics that are greater than a certain predefined amount).

Turning now to FIG. 6H, in various implementations, operation 630 may include an operation 640 for acquiring the user information that includes the one or more user preferences related to the purity of the one or more food ingredients by acquiring user information that includes one or more user preferences that one or more sources for the one or more ingredients were tested for presence of one or more pesticides. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the purity of the one or more food ingredients by acquiring or obtaining user information that includes one or more user preferences that one or more sources (e.g., silos) for the one or more ingredients (e.g., processed foods such as sugar or flour) were tested for presence of one or more pesticides.

In some cases, operation 640 may, in turn, further include an operation 641 for acquiring the user information that includes the one or more user preferences that the one or more sources for the one or more ingredients were tested for the presence of the one or more pesticides by acquiring user information that includes one or more user preferences that the one or more sources for the one or more ingredients were tested to confirm that the one or more sources were tested to be free of any pesticides. For instance, the user information obtaining module 302* of the customized food preparation system 10a or 10b of FIG. 3A or 3B (or of the network control system 12a or 12b of FIG. 3D or 3E) acquiring the user information that includes the one or more user preferences that the one or more sources for the one or more ingredients were tested for the presence of the one or more pesticides by acquiring or obtaining user information that includes one or more user preferences that the one or more sources (e.g., vegetable crop) for the one or more ingredients (e.g., vegetable) were tested to confirm that the one or more sources were free of any pesticides.

In various implementations, operation 630 may include an operation 642 for acquiring the user information that includes the one or more user preferences related to the purity of the one or more food ingredients by acquiring user information that includes one or more user preferences related to purity of one or more meat ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the purity of the one or more food ingredients by acquiring or obtaining user information that includes one or more user preferences related to purity of one or more meat ingredients (e.g., beef, pork, poultry, fish, and so forth).

In some implementations, operation 630 may include an operation 643 for acquiring the user information that includes the one or more user preferences related to the purity of the one or more food ingredients by acquiring user information that includes one or more user preferences related to purity of one or more processed ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the purity of the one or more food ingredients by acquiring or obtaining user information that includes one or more user preferences related to purity of one or more processed ingredients (e.g., flour, sugar, cheese, and so forth).

In some implementations, operation 630 may include an operation 644 for acquiring the user information that includes the one or more user preferences related to the purity of the one or more food ingredients by acquiring user information that includes one or more user preferences related to purity of one or more vegetable ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the purity of the one or more food ingredients by acquiring or obtaining user information that includes one or more user preferences related to purity of one or more vegetable ingredients (e.g., carrots, peas, alfalfa sprouts, spinach, and so forth).

Figure 6J:
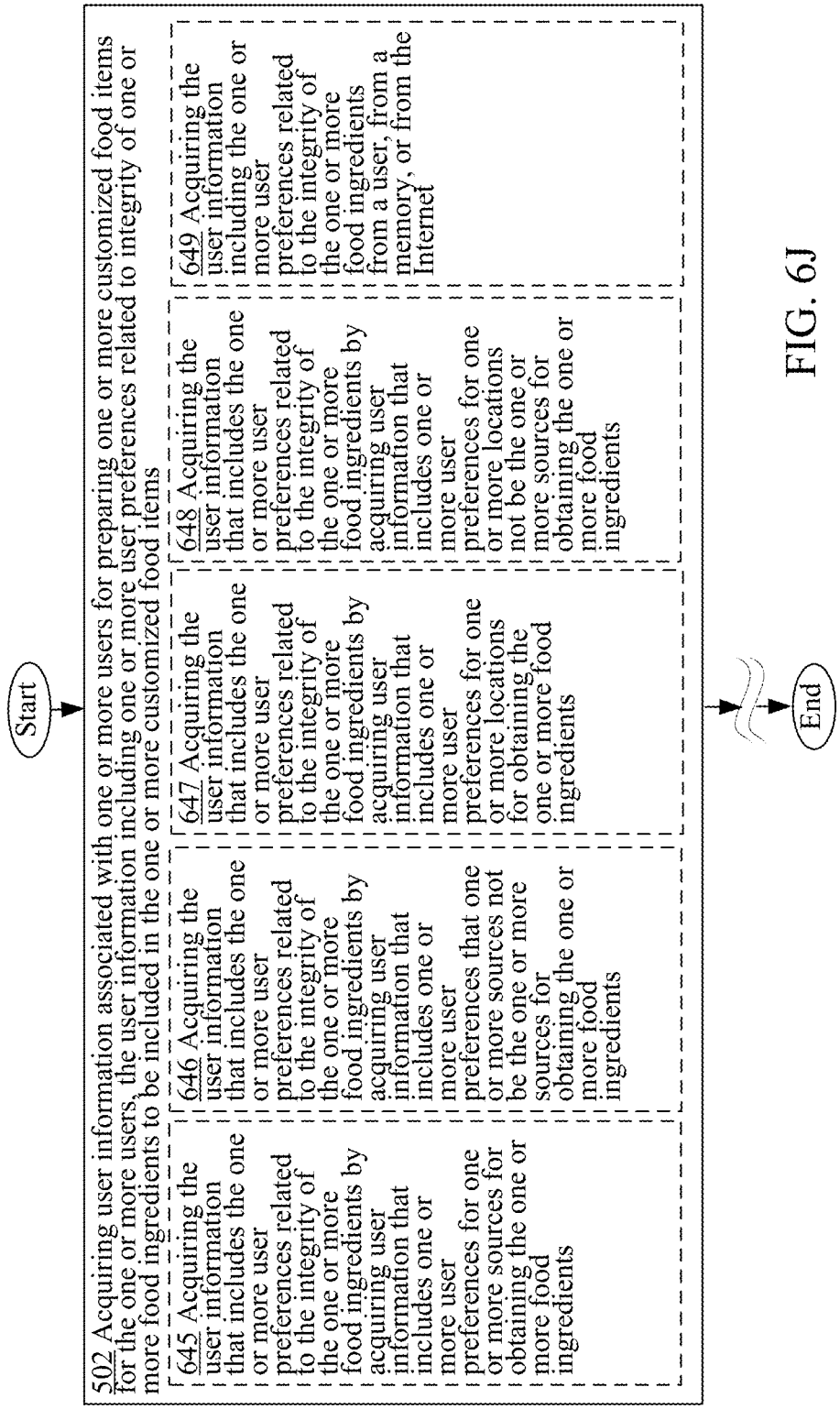
FIG. 6J is a high-level logic flowchart of a process depicting alternate implementations of the user information acquiring operation 502 of FIG. 5.

Referring now to FIG. 6J, in various implementations, the user information acquiring operation 502 may include an operation 645 for acquiring the user information that includes the one or more user preferences related to the integrity of the one or more food ingredients by acquiring user information that includes one or more user preferences for one or more sources for obtaining the one or more food ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the integrity of the one or more food ingredients by acquiring or obtaining user information that includes one or more user preferences for one or more sources (e.g., Tyson's chicken, C & H sugar, Meadow Gold, and so forth) for obtaining the one or more food ingredients.

In some implementations, the user information acquiring operation 502 may include an operation 646 for acquiring the user information that includes the one or more user preferences related to the integrity of the one or more food ingredients by acquiring user information that includes one or more user preferences that one or more sources not be the one or more sources for obtaining the one or more food ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the integrity of the one or more food ingredients by acquiring or obtaining user information that includes one or more user preferences that one or more sources (e.g., Tyson's chicken) not be the one or more actual sources for obtaining the one or more food ingredients (e.g., chicken meat).

In some implementations, the user information acquiring operation 502 may include an operation 647 for acquiring the user information that includes the one or more user preferences related to the integrity of the one or more food ingredients by acquiring user information that includes one or more user preferences for one or more locations for obtaining the one or more food ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the integrity of the one or more food ingredients by acquiring or obtaining user information that includes one or more user preferences for one or more locations (e.g., Kobe, Japan) for obtaining the one or more food ingredients (e.g., Beef).

In some implementations, the user information acquiring operation 502 may include an operation 648 for acquiring the user information that includes the one or more user preferences related to the integrity of the one or more food ingredients by acquiring user information that includes one or more user preferences for one or more locations not be the one or more sources for obtaining the one or more food ingredients. For instance, the user information obtaining module 302* of the customized food preparation system 10a or 10b of FIG. 3A or 3B (or of the network control system 12a or 12b of FIG. 3D or 3E) acquiring the user information that includes the one or more user preferences related to the integrity of the one or more food ingredients by acquiring user information that includes one or more user preferences for one or more locations (e.g., Brittan) not be the one or more sources for obtaining the one or more food ingredients (e.g., Beef).

In some implementations, the user information acquiring operation 502 may include an operation 649 for acquiring the user information including the one or more user preferences related to the integrity of the one or more food ingredients from a user, from a memory, or from the Internet. For instance, the user information obtaining module 302* of the customized food preparation system 10a or 10b of FIG. 3A or 3B (or of the network control system 12a or 12b of FIG. 3D or 3E) acquiring or obtaining the user information including the one or more user preferences related to the integrity of the one or more food ingredients from a user, from a memory, or from the Internet.

Referring back to the customized packaging generation directing operation 504 of FIG. 5, the customized packaging generation directing operation 504 similar to the user information acquiring operation 502 of FIG. 5 may be executed in a number of different ways in various alternative embodiments as illustrated, for example, in FIGS. 7A, 7B, 7C, 7D, 7E, 7F, 7G, 7H, 7J, 7K, and 7L. In some cases, for example, the customized packaging generation directing operation 504 may actually include or involve an operation 730 for directing the generation of the one or more customized packagings by providing one or more instructions for generating the one or more customized packagings. For instance, the customized packaging generation controlling module 304* including the instruction providing module 420 (see FIG. 4B) of the customized food preparation system 10a or 10b of FIG. 3A or 3B (or of the network control system 12a or 12b of FIG. 3D or 3E) directing or controlling the generation of the one or more customized packagings 24* by having the instruction providing module 420 provide one or more instructions for generating the one or more customized packagings 24*. For example, the instruction providing module 420 of the network control system 12* of FIG. 1B transmitting instructions for generating the one or more customized packagings to one or more customized food preparation systems 10c.

In some implementations, the customized packaging generation directing operation 504 may include an operation 731 for directing the generation of the one or more customized packagings by controlling one or more components of one or more customized packaging production systems to generate the one or more customized packagings. For instance, the customized packaging generation controlling module 304* including the component control module 422 (see FIG. 4B) of the customized food preparation system 10a or 10b of FIG. 3A or 3B (or of the network control system 12a or 12b of FIG. 3D or 3E) directing or controlling the generation of the one or more customized packagings 24* by having the component control module 422 control one or more components of one or more customized packaging production systems 324* (e.g., the customized packaging production system 324' and/or the customized packaging production system 324" of FIGS. 4E and 4F) to generate the one or more customized packagings 24*.

In the same or alternative implementations, the customized packaging generation directing operation 504 may include an operation 732 for directing the generation of the one or more customized packagings having one or more features that are customized based, at least in part, on the acquired user information by directing generation of one or more customized packagings that display customized information that has been customized based, at least in part, on the acquired user information as illustrated in FIGS. 7A, 7B, 7C, 7D, 7E, 7F, and 7G. For instance, the customized packaging generation controlling module 304* of the customized food preparation system 10a or 10b of FIG. 3A or 3B (or of the network control system 12a or 12b of FIG. 3D or 3E) directing the generation of the one or more customized packagings having one or more features (e.g., visual features such as color, pattern, textual information, and so forth) that are customized based, at least in part, on the acquired user information by directing or controlling generation of one or more customized packagings 24* that display customized information that has been customized based, at least in part, on the acquired user information (e.g., listing of customized ingredients and their quantities used to produce the one or more customized food items).

Figure 7A:
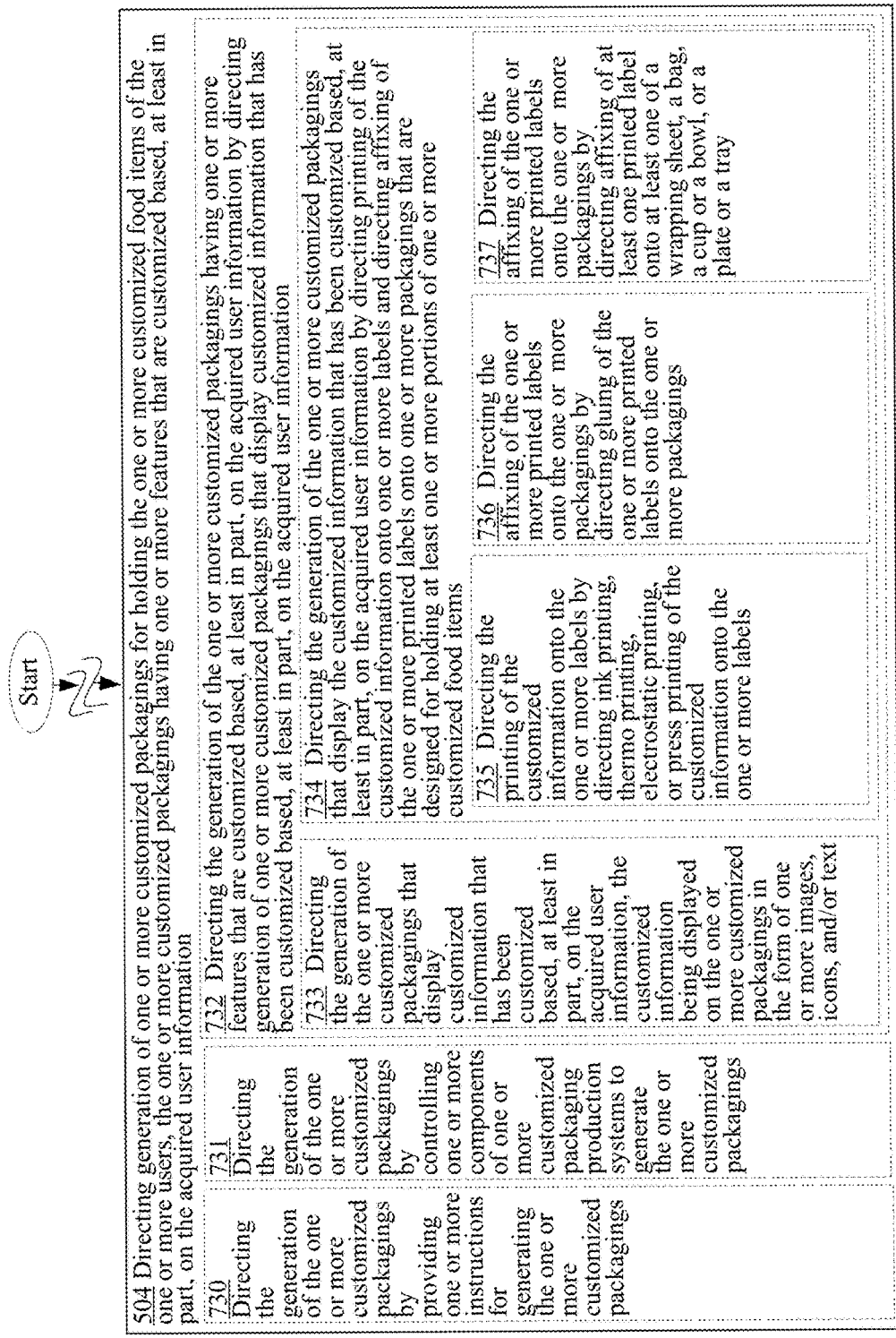
FIG. 7A is a high-level logic flowchart of a process depicting alternate implementations of the customized packaging generation directing operation 504 of FIG. 5.

As further illustrated in FIG. 7A, in some cases, operation 732 may actually include an operation 733 for directing the generation of the one or more customized packagings that display customized information that has been customized based, at least in part, on the acquired user information, the customized information being displayed on the one or more customized packagings in the form of one or more images, icons, and/or text. For instance, the customized packaging generation controlling module 304* of the customized food preparation system 10a or 10b of FIG. 3A or 3B (or of the network control system 12a or 12b of FIG. 3D or 3E) directing or controlling the generation of the one or more customized packagings 24* that display customized information 26* that has been customized based, at least in part, on the acquired user information, the customized information being displayed on the one or more customized packagings 24* in the form of one or more images, icons, and/or text. For example, in some cases, a customized packaging 24* may be customized to include an image of the user that the customized packaging 24* (and the customized food item 22* that it holds) is customized for. Icons may also be printed onto a customized packaging 24* in order to, for example, identify the ingredients included in the customized food item 22* to be held by the customized packaging 24* or to indicate that certain ingredients are absent in the customized food item 22*. Of course, and as previously illustrated, the use of text may be the easiest or most efficient way of conveying information to users in many cases.

In the same or alternative implementations, operation 732 may actually involve an operation 734 for directing the generation of the one or more customized packagings that display the customized information that has been customized based, at least in part, on the acquired user information by directing printing of the customized information onto one or more labels and directing affixing of the one or more printed labels onto one or more packagings that are designed for holding at least one or more portions of one or more customized food items. For instance, the customized packaging generation controlling module 304* including the customized information label printing controlling module 424 and the label affixing controlling module 426 (see FIG. 4B) of the customized food preparation system 10a or 10b of FIG. 3A or 3B (or of the network control system 12a or 12b of FIG. 3D or 3E) directing the generation of the one or more customized packagings 24* that display the customized information 26* that has been customized based, at least in part, on the acquired user information by having customized information label printing controlling module 424 direct or control printing of the customized information 26* onto one or more labels 220 and having the label affixing controlling module 426 directing or controlling affixing of the one or more printed labels 220 onto one or more packagings (e.g., customized packaging 24c of FIG. 2C or 2E) that are designed for holding at least one or more portions of one or more customized food items.

AS further illustrated in FIG. 7A, in some cases, operation 734 may, in turn, further include an operation 735 for directing the printing of the customized information onto the one or more labels by directing ink printing, thermo printing, electrostatic printing, or press printing of the customized information onto the one or more labels. For instance, the customized information label printing controlling module 424 of the customized food preparation system 10a or 10b of FIG. 3A or 3B (or of the network control system 12a or 12b of FIG. 3D or 3E) directing the printing of the customized information 26* onto the one or more labels 220 by directing or controlling ink printing, thermo printing, electrostatic printing, or press printing of the customized information onto the one or more labels 220.

In the same or alternative implementations, operation 734 may include an operation 736 for directing the affixing of the one or more printed labels onto the one or more packagings by directing gluing of the one or more printed labels onto the one or more packagings. For instance, the label affixing controlling module 426 of the customized food preparation system 10a or 10b of FIG. 3A or 3B (or of the network control system 12a or 12b of FIG. 3D or 3E) directing the affixing of the one or more printed labels onto the one or more packagings by directing or controlling gluing of the one or more printed labels 220 onto the one or more packagings (e.g., customized packaging 24a or 24b of FIG. 2A or 2B).

In the same or alternative implementations, operation 734 may include an operation 737 for directing the affixing of the one or more printed labels onto the one or more packagings by directing affixing of at least one printed label onto at least one of a wrapping sheet, a bag, a cup or a bowl, or a plate or a tray. For instance, the label affixing controlling module 426 of the customized food preparation system 10a or 10b of FIG. 3A or 3B (or of the network control system 12a or 12b of FIG. 3D or 3E) directing the affixing of the one or more printed labels 220 onto the one or more packagings (e.g., customized packagings 26*) by directing or controlling affixing of at least one printed label 220 onto at least one of a wrapping sheet (e.g., customized packaging 24c of FIG. 2C), a bag (e.g., customized packaging 24f of FIG. 2F), a cup or a bowl (e.g., customized packaging 24b of FIG. 2B), or a plate or a tray (e.g., customized packaging 24a of FIG. 2A).

In some cases, rather than printing the customized information 26* onto a label 220 and affixing the label 220 onto packaging (e.g., a customized packaging 24*), the customized information 26* may be printed directly onto a packaging (e.g., a customized packaging 24*). For example, in various implementations, operation 732 may include an operation 738 for directing the generation of the one or more customized packagings that display the customized information that has been customized based, at least in part, on the acquired user information by directing printing of the customized information onto one or more packagings that are designed for holding at least one or more portions of one or more customized food items illustrated in FIG. 7B. For instance, the customized packaging generation controlling module 304* including the customized information packaging printing controlling module 428 (see FIG. 4B) of the customized food preparation system 10a or 10b of FIG. 3A or 3B (or of the network control system 12a or 12b of FIG. 3D or 3E) directing the generation of the one or more customized packagings 24* that display the customized information 26* that has been customized based, at least in part, on the acquired user information by having the customized information packaging printing controlling module 428 direct or control printing of the customized information 26* onto one or more packagings (e.g., customized packaging 24*) that are designed for holding at least one or more portions of one or more customized food items (e.g., customized food items 22*).

In some implementations, operation 738 may include an operation 739 for directing the printing of the customized information onto the one or more packagings by directing ink printing, thermo printing, electrostatic printing, or press printing of the customized information onto the one or more packagings. For instance, the customized information packaging printing controlling module 428 of the customized food preparation system 10a or 10b of FIG. 3A or 3B (or of the network control system 12a or 12b of FIG. 3D or 3E) directing the printing of the customized information onto the one or more packagings by directing or controlling ink printing, thermo printing, electrostatic printing, or press printing (e.g., offset lithography, digital printing, letterpress, electrostatic printing, thermography, or flexography) of the customized information 26* onto the one or more packagings (e.g., customized packaging 24*).

In the same or alternative implementations, operation 738 may further include an operation 740 for directing the printing of the customized information onto the one or more packagings by directing printing of the customized information onto a wrapping sheet, a bag, a cup or a bowl, or a plate or a tray. For instance, the customized information packaging printing controlling module 428 of the customized food preparation system 10a or 10b of FIG. 3A or 3B (or of the network control system 12a or 12b of FIG. 3D or 3E) directing the printing of the customized information 26* onto the one or more packagings (e.g., customized packagings 24*) by directing or controlling printing of the customized information 26* onto a wrapping sheet (e.g., customized packaging 24c of FIG. 2C or 2E), a bag (e.g., customized packaging 24f of FIG. 2F), a cup or a bowl (e.g., customized packaging 24b of FIG. 2B), or a plate or a tray (e.g., customized packaging 24a of FIG. 2A).

Various types of information may be printed onto a customized packaging 24*. For example, and referring now to FIG. 7C, in some cases, operation 732 may include an operation 741 for directing the generation of the one or more customized packagings that display the customized information that has been customized based, at least in part, on the acquired user information by directing generation of one or more customized packagings that have been customized to have one or more visual indicators that provide information related to the one or more users. For instance, the customized packaging generation controlling module 304* including the user related information customized packaging generation controlling module 430 (see FIG. 4B) of the customized food preparation system 10a or 10b of FIG. 3A or 3B (or of the network control system 12a or 12b of FIG. 3D or 3E) directing the generation of the one or more customized packagings 24* that display the customized information 26* that has been customized based, at least in part, on the acquired user information by having the user related information customized packaging generation controlling module 430 direct or control generation of one or more customized packagings 24* that have been customized to have one or more visual indicators (e.g., one or more images, icons, and/or text) that provide information (e.g., user identification, user dietary information, and so forth) related to the one or more users.

Figure 7C:
FIG. 7C is a high-level logic flowchart of a process depicting alternate implementations of the customized packaging generation directing operation 504 of FIG. 5.

AS further illustrated in FIG. 7C, operation 741 in some cases may further include an operation 742 for directing the generation of the one or more customized packagings that have been customized to display the information related to the one or more users by directing generation of at least one customized packaging that has been customized to have one or more visual indicators that identifies at least one user associated with the at least one customized packaging. For instance, the user related information customized packaging generation controlling module 430 including the user identified customized packaging generation controlling module 432 (see FIG. 4B) of the customized food preparation system 10a or 10b of FIG. 3A or 3B (or of the network control system 12a or 12b of FIG. 3D or 3E) directing the generation of the one or more customized packagings 24* that have been customized to display the information related to the one or more users by having the user identified customized packaging generation controlling module 432 direct or control generation of at least one customized packaging 24* that has been customized to have one or more visual indicators that identifies at least one user specifically associated with the at least one customized packaging 24* and the customized food item 22* to be held by the customized packaging 24*.

In some implementations, operation 742 may include an operation 743 for directing the generation of at least one customized packaging that has been customized to have the one or more visual indicators that identifies the at least one user associated with the at least one customized packaging by directing generation of at least one customized packaging having at least one image of the user. For instance, the user identified customized packaging generation controlling module 432 of the customized food preparation system 10a or 10b of FIG. 3A or 3B (or of the network control system 12a or 12b of FIG. 3D or 3E) directing the generation of at least one customized packaging 24* that has been customized to have the one or more visual indicators that identifies the at least one user associated with the at least one customized packaging 24* by directing or controlling generation of at least one customized packaging 24* having at least one image of the user.

In some implementations, operation 742 may include an operation 744 for directing the generation of at least one customized packaging that has been customized to have the one or more visual indicators that identifies the at least one user associated with the at least one customized packaging by directing generation of at least one customized packaging having one or more icons or text that identifies the user. For instance, the user identified customized packaging generation controlling module 432 of the customized food preparation system 10a or 10b of FIG. 3A or 3B (or of the network control system 12a or 12b of FIG. 3D or 3E) directing the generation of at least one customized packaging 24* that has been customized to have the one or more visual indicators that identifies the at least one user associated with the at least one customized packaging 24* by directing or controlling generation of at least one customized packaging 24* having one or more icons or text (e.g., username) that identifies the user. Note that in some cases, a user can be identified by, for example, a customer number. That is, when a user purchases a customized food item through a customized food preparation system 10*, the customized food preparation system 10* may indicate or generate a receipt that indicates a customer number. Thus, if a group of users are concurrently using the same customized food preparation system 10*, then the customized food items 22* that are held by customized packagings 24* can be easily identified by customer numbers.

In some implementations, operation 742 may include an operation 745 for directing the generation of at least one customized packaging that has been customized to have the one or more visual indicators that identifies the at least one user associated with the at least one customized packaging by directing generation of at least one customized packaging having one or more bar codes that identifies the user. For instance, the user identified customized packaging generation controlling module 432 of the customized food preparation system 10a or 10b of FIG. 3A or 3B (or of the network control system 12a or 12b of FIG. 3D or 3E) directing the generation of at least one customized packaging 24* that has been customized to have the one or more visual indicators that identifies the at least one user associated with the at least one customized packaging 24* by directing or controlling generation of at least one customized packaging 24* having one or more bar codes that identifies the user. In some cases, by adding bar codes onto the customized packaging 24*, the dietary activities of a particular user may be tracked. That is, special refuse receptacles that are designed to be able to read bar codes may be located around customized food preparation systems 10* in order to receive discarded customized packagings 24* and to keep track of what is being consumed by users.

In some implementations, operation 742 may include an operation 746 for directing the generation of the at least one customized packaging that has been customized to have the one or more visual indicators that identifies the at least one user associated with the at least one customized packaging and that further displays information associated with a second user. For instance, the user identified customized packaging generation controlling module 432 including the secondary user information customized packaging generation controlling module 434 (see FIG. 4B) of the customized food preparation system 10a or 10b of FIG. 3A or 3B (or of the network control system 12a or 12b of FIG. 3D or 3E) directing or controlling the generation of the at least one customized packaging 24* that has been customized to have the one or more visual indicators that identifies the at least one user associated with the at least one customized packaging 24* (and the one or more customized food items 22* to be held by the customized packaging 24*) and that further displays information associated with a second user. For example, the customized packaging 24* may have been customized to indicate that a second user is allergic to an ingredient that is included in the customized food item 22* to be held by the customized packaging 24* or to indicate that the second user should not be given the customized food item 22* held by the customized packaging 24* as illustrated, for example, in FIG. 2B (e.g., "DO NOT GIVE TO DOLLY").

In some cases, operation 746 may further include an operation 747 for directing the generation of the at least one customized packaging that has been customized to have the one or more visual indicators that identifies the at least one user associated with the at least one customized packaging and that further displays an alert or a warning associated with a second user and the customized food item to be included in the customized packaging. For instance, the user identified customized packaging generation controlling module 432 including the secondary user information customized packaging generation controlling module 434 of the customized food preparation system 10a or 10b of FIG. 3A or 3B (or of the network control system 12a or 12b of FIG. 3D or 3E) directing or controlling the generation of the at least one customized packaging 24* that has been customized to have the one or more visual indicators that identifies the at least one user associated with the at least one customized packaging 24* and that further displays an alert or a warning (see, for example, the customized information 26b of FIG. 2B, which states "DO NOT GIVE TO DOLLY") associated with a second user and the customized food item 22* to be included in the customized packaging 24*.

Figure 7D:
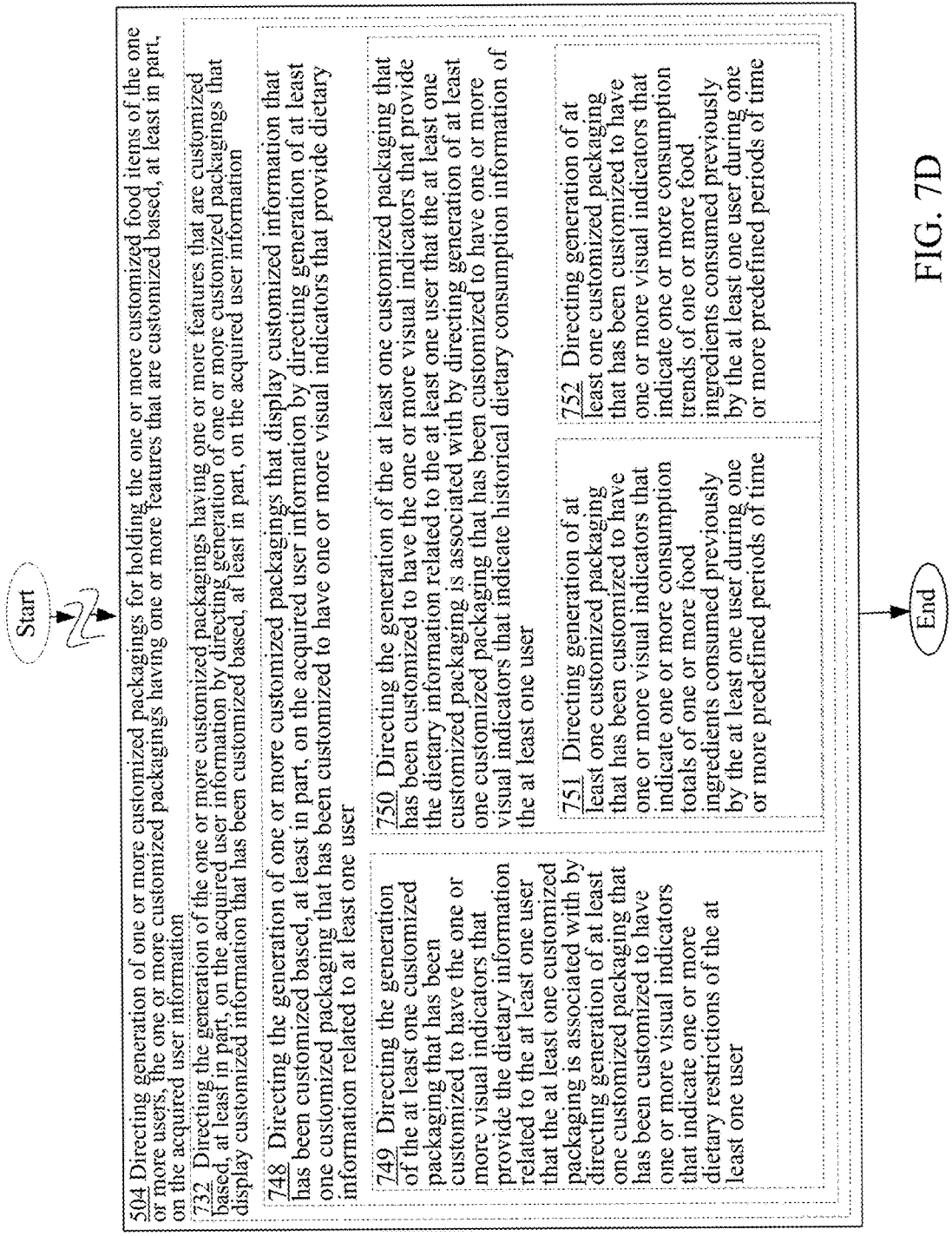
FIG. 7D is a high-level logic flowchart of a process depicting alternate implementations of the customized packaging generation directing operation 504 of FIG. 5.

Turning now to FIG. 7D, in some implementations operation 732 may include an operation 748 for directing the generation of one or more customized packagings that display customized information that has been customized based, at least in part, on the acquired user information by directing generation of at least one customized packaging that has been customized to have one or more visual indicators that provide dietary information related to at least one user. For instance, the user identified customized packaging generation controlling module 432 including the user related dietary information customized packaging generation controlling module 436 (see FIG. 4B) of the customized food preparation system 10a or 10b of FIG. 3A or 3B (or of the network control system 12a or 12b of FIG. 3D or 3E) directing the generation of one or more customized packagings 24* that are generated to display customized information 26* that has been customized based, at least in part, on the acquired user information by having the user related dietary information customized packaging generation controlling module 436 direct or control generation of at least one customized packaging (e.g., the customized packaging 24f of FIG. 2F, which includes customized information 26f that indicates dietary consumption information of a particular user) that has been customized to have one or more visual indicators that provide dietary information specifically related to at least one user.

As further illustrated in FIG. 7D, operation 748 may further include one or more additional operations in various alternative implementations, including, in some cases, an operation 749 for directing the generation of the at least one customized packaging that has been customized to have the one or more visual indicators that provide the dietary information related to the at least one user that the at least one customized packaging is associated with by directing generation of at least one customized packaging that has been customized to have one or more visual indicators that indicate one or more dietary restrictions of the at least one user. For instance, the user related dietary information customized packaging generation controlling module 436 of the customized food preparation system 10a or 10b of FIG. 3A or 3B (or of the network control system 12a or 12b of FIG. 3D or 3E) directing the generation of the at least one customized packaging 24* that has been customized to have the one or more visual indicators that provide the dietary information related to the at least one user that the at least one customized packaging 24* (and the one or more customized food items 22* to be held by the customized packaging 24*) is associated with by directing or controlling generation of at least one customized packaging 24* that has been customized to have one or more visual indicators that indicate one or more dietary restrictions (e.g., no peanuts, no dairy products, low sodium, etc.) of the at least one user.

In the same or alternative implementations, operation 748 may additionally or alternatively include an operation 750 for directing the generation of the at least one customized packaging that has been customized to have the one or more visual indicators that provide the dietary information related to the at least one user that the at least one customized packaging is associated with by directing generation of at least one customized packaging that has been customized to have one or more visual indicators that indicate historical dietary consumption information of the at least one user. For instance, the user related dietary information customized packaging generation controlling module 436 of the customized food preparation system 10a or 10b of FIG. 3A or 3B (or of the network control system 12a or 12b of FIG. 3D or 3E) directing the generation of the at least one customized packaging 24* that has been customized to have the one or more visual indicators that provide the dietary information related to the at least one user that the at least one customized packaging 24* (and the one or more customized food items 22* to be held by the customized packaging 24*) is associated with by directing or controlling generation of at least one customized packaging 24* that has been customized to have one or more visual indicators that indicate historical dietary consumption information (e.g., total sodium consumption amount for the previous week) of the at least one user.

In some implementations, operation 750 may further include an operation 751 for directing generation of at least one customized packaging that has been customized to have one or more visual indicators that indicate one or more consumption totals of one or more food ingredients consumed previously by the at least one user during one or more predefined periods of time. For instance, the user related dietary information customized packaging generation controlling module 436 of the customized food preparation system 10a or 10b of FIG. 3A or 3B (or of the network control system 12a or 12b of FIG. 3D or 3E) directing or controlling generation of at least one customized packaging 24* that has been customized to have one or more visual indicators that indicate one or more consumption totals of one or more food ingredients (e.g., salt, sugar, etc.) consumed previously by the at least one user during one or more predefined periods of time (e.g., a day, a week, a month, and so forth).

In the same or alternative implementations, operation 750 may additionally or alternatively include an operation 752 for directing generation of at least one customized packaging that has been customized to have one or more visual indicators that indicate one or more consumption trends of one or more food ingredients consumed previously by the at least one user during one or more predefined periods of time. For instance, the user related dietary information customized packaging generation controlling module 436 of the customized food preparation system 10a or 10b of FIG. 3A or 3B (or of the network control system 12a or 12b of FIG. 3D or 3E) directing or controlling generation of at least one customized packaging 24* that has been customized to have one or more visual indicators that indicate one or more consumption trends of one or more food ingredients consumed previously by the at least one user during one or more predefined periods of time. For example, graphical or textual representations indicating decline in salt consumption during the past month being printed onto the customized packaging 24*.

Figure 7E:
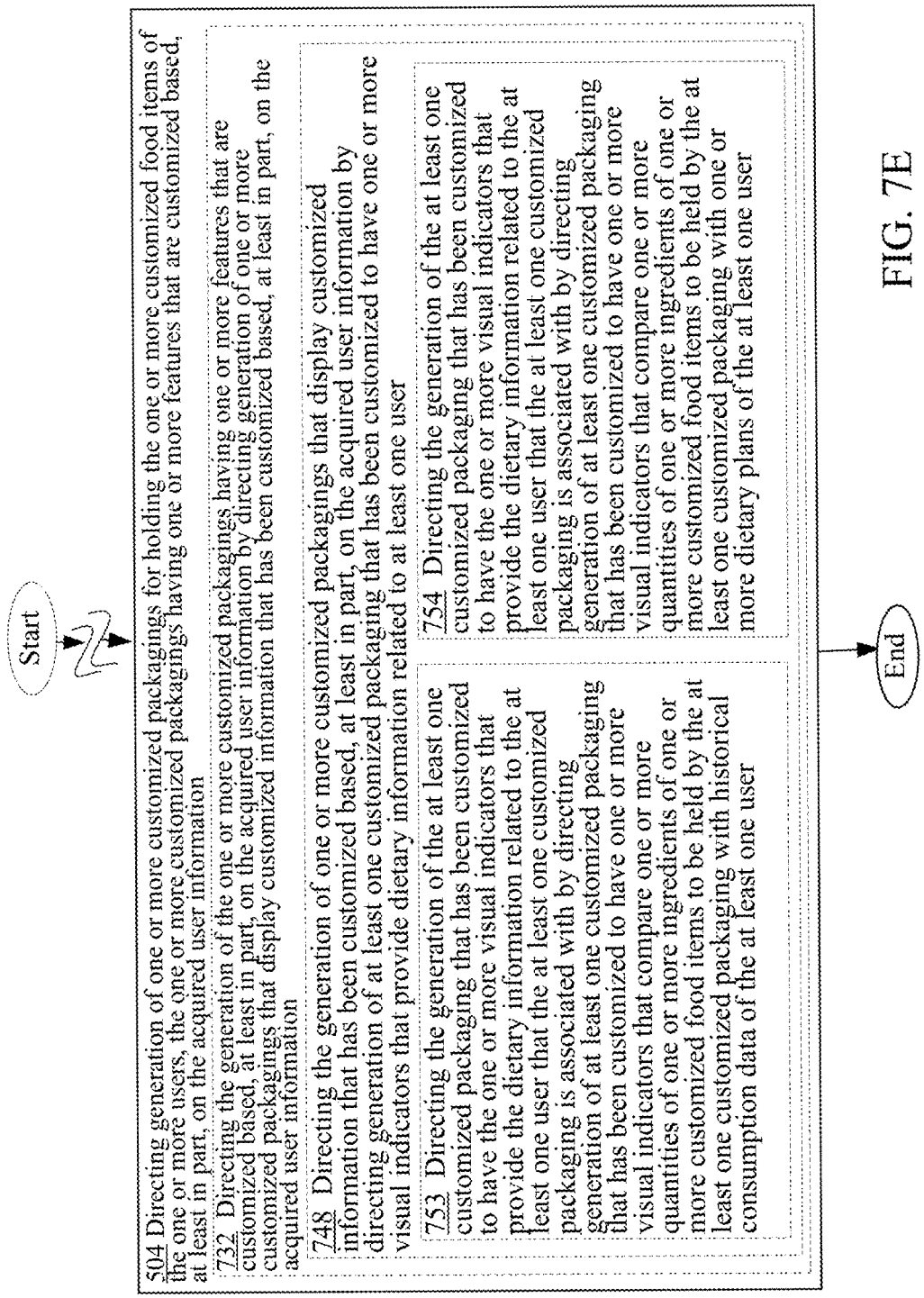
FIG. 7E is a high-level logic flowchart of a process depicting alternate implementations of the customized packaging generation directing operation 504 of FIG. 5.

In some cases, operation 748 may include an operation 753 for directing the generation of the at least one customized packaging that has been customized to have the one or more visual indicators that provide the dietary information related to the at least one user that the at least one customized packaging is associated with by directing generation of at least one customized packaging that has been customized to have one or more visual indicators that compare one or more quantities of one or more ingredients of one or more customized food items to be held by the at least one customized packaging with historical consumption data of the at least one user as illustrated in FIG. 7E. For instance, the user related dietary information customized packaging generation controlling module 436 of the customized food preparation system 10a or 10b of FIG. 3A or 3B (or of the network control system 12a or 12b of FIG. 3D or 3E) directing the generation of the at least one customized packaging 24* that has been customized to have the one or more visual indicators that provide the dietary information related to the at least one user that the at least one customized packaging 24* (and the one or more customized food items 22* to be held by the customized packaging 24*) is associated with by directing or controlling generation of at least one customized packaging 24* that has been customized to have one or more visual indicators that compare one or more quantities of one or more ingredients of one or more customized food items 22* to be held by the at least one customized packaging 24* with historical consumption data of the at least one user (e.g., comparing salt content of the customized food item 22* with past salt consumption trends of the user over the past month).

In the same or alternative implementations, operation 748 may include an operation 754 for directing the generation of the at least one customized packaging that has been customized to have the one or more visual indicators that provide the dietary information related to the at least one user that the at least one customized packaging is associated with by directing generation of at least one customized packaging that has been customized to have one or more visual indicators that compare one or more quantities of one or more ingredients of one or more customized food items to be held by the at least one customized packaging with one or more dietary plans of the at least one user. For instance, the user related dietary information customized packaging generation controlling module 436 of the customized food preparation system 10a or 10b of FIG. 3A or 3B (or of the network control system 12a or 12b of FIG. 3D or 3E) directing the generation of the at least one customized packaging 24* that has been customized to have the one or more visual indicators that provide the dietary information related to the at least one user that the at least one customized packaging 24* (and the one or more customized food items 22* to be held by the customized packaging 24*) is associated with by directing or controlling generation of at least one customized packaging 24* that has been customized to have one or more visual indicators that compare one or more quantities of one or more ingredients of one or more customized food items 22* to be held by the at least one customized packaging 24* with one or more dietary plans (schedule) of the at least one user.

Figure 7F:
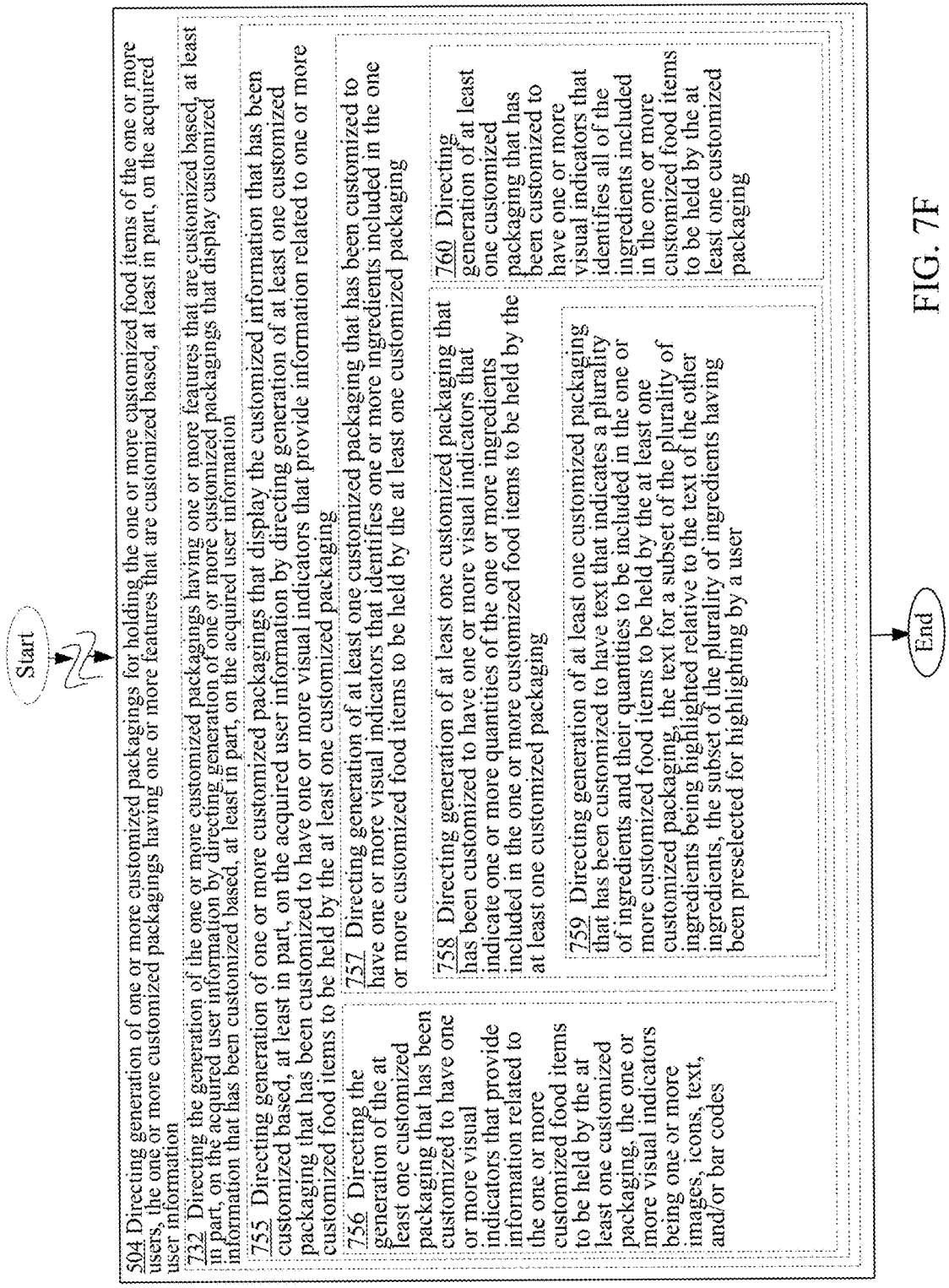
FIG. 7F is a high-level logic flowchart of a process depicting alternate implementations of the customized packaging generation directing operation 504 of FIG. 5.

Referring now to FIG. 7F, in various implementations, operation 732 may include an operation 755 for directing generation of one or more customized packagings that display the customized information that has been customized based, at least in part, on the acquired user information by directing generation of at least one customized packaging that has been customized to have one or more visual indicators that provide information related to one or more customized food items to be held by the at least one customized packaging. For instance, the customized packaging generation controlling module 304* including the customized food item related information customized packaging generation controlling module 438 (see FIG. 4B) of the customized food preparation system 10a or 10b of FIG. 3A or 3B (or of the network control system 12a or 12b of FIG. 3D or 3E) directing generation of one or more customized packagings 24* that display the customized information 26* that has been customized based, at least in part, on the acquired user information by having the customized food item related information customized packaging generation controlling module 438 direct or control generation of at least one customized packaging 24* that has been customized to have one or more visual indicators that provide information (e.g., ingredients, quantities of ingredients, missing ingredients, and so forth) related to one or more customized food items 22* to be held by the at least one customized packaging 24*.

As further illustrated in FIG. 7F, operation 755 may further include one or more additional operations in various alternative implementations including, in some cases, an operation 756 for directing the generation of the at least one customized packaging that has been customized to have one or more visual indicators that provide information related to the one or more customized food items to be held by the at least one customized packaging, the one or more visual indicators being one or more images, icons, text, and/or bar codes. For instance, the customized food item related information customized packaging generation controlling module 438 (see FIG. 4B) of the customized food preparation system 10a or 10b of FIG. 3A or 3B (or of the network control system 12a or 12b of FIG. 3D or 3E) directing the generation of the at least one customized packaging 24* that has been customized to have one or more visual indicators that provide information related to the one or more customized food items 22* to be held by the at least one customized packaging 24*, the one or more visual indicators being one or more images, icons, text, and/or bar codes.

In the same or alternative implementations, operation 755 may include an operation 757 for directing generation of at least one customized packaging that has been customized to have one or more visual indicators that identifies one or more ingredients included in the one or more customized food items to be held by the at least one customized packaging. For instance, the customized food item related information customized packaging generation controlling module 438 of the customized food preparation system 10a or 10b of FIG. 3A or 3B (or of the network control system 12a or 12b of FIG. 3D or 3E) directing or controlling generation of at least one customized packaging 24* that has been customized to have one or more visual indicators that identifies one or more ingredients included in the one or more customized food items 22* to be held by the at least one customized packaging 24*.

In some cases, operation 757 may, in turn, further include an operation 758 for directing generation of at least one customized packaging that has been customized to have one or more visual indicators that indicate one or more quantities of the one or more ingredients included in the one or more customized food items to be held by the at least one customized packaging. For instance, the customized food item related information customized packaging generation controlling module 438 of the customized food preparation system 10a or 10b of FIG. 3A or 3B (or of the network control system 12a or 12b of FIG. 3D or 3E) directing or controlling generation of at least one customized packaging (e.g., customized packaging 24b of FIG. 2B) that has been customized to have one or more visual indicators that indicate one or more quantities of the one or more ingredients included in the one or more customized food items (e.g., customized food item 24b of FIG. 2B) to be held by the at least one customized packaging (e.g., customized packaging 24b).

In some implementations, operation 758 may further include an operation 759 for directing generation of at least one customized packaging that has been customized to have text that indicates a plurality of ingredients and their quantities to be included in the one or more customized food items to be held by the at least one customized packaging, the text for a subset of the plurality of ingredients being highlighted relative to the text of the other ingredients, the subset of the plurality of ingredients having been preselected for highlighting by a user. For instance, the customized food item related information customized packaging generation controlling module 438 of the customized food preparation system 10a or 10b of FIG. 3A or 3B (or of the network control system 12a or 12b of FIG. 3D or 3E) directing or controlling generation of at least one customized packaging (e.g., customized packaging 24b of FIG. 2B) that has been customized to have text that indicates a plurality of ingredients and their quantities to be included in the one or more customized food items (e.g., customized food item 22b) to be held by the at least one customized packaging (e.g., customized packaging 24b), the text for a subset of the plurality of ingredients being highlighted (e.g., "Extra Caffeine" highlighted in FIG. 2B) relative to the text of the other ingredients, the subset of the plurality of ingredients having been preselected for highlighting by a user.

In some implementations, operation 757 may include or involve an operation 760 for directing generation of at least one customized packaging that has been customized to have one or more visual indicators that identifies all of the ingredients included in the one or more customized food items to be held by the at least one customized packaging. For instance, the customized food item related information customized packaging generation controlling module 438 of the customized food preparation system 10a or 10b of FIG. 3A or 3B (or of the network control system 12a or 12b of FIG. 3D or 3E) directing or controlling generation of at least one customized packaging 24* that has been customized to have one or more visual indicators that identifies all of the ingredients included in the one or more customized food items 22* to be held by the at least one customized packaging 24*.

Figure 7G:
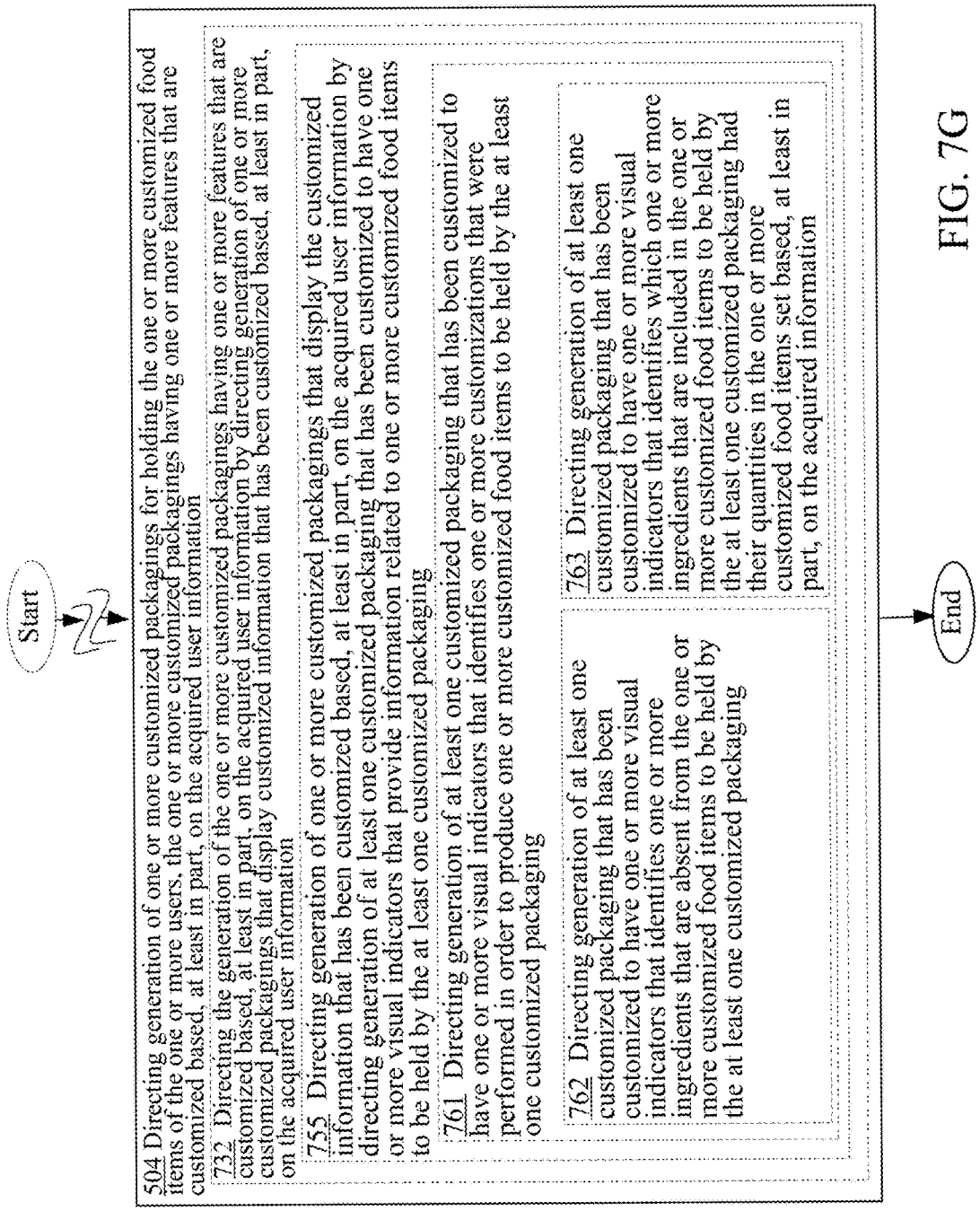
FIG. 7G is a high-level logic flowchart of a process depicting alternate implementations of the customized packaging generation directing operation 504 of FIG. 5.

Turning to FIG. 7G, in various implementations, operation 755 may further include an operation 761 for directing generation of at least one customized packaging that has been customized to have one or more visual indicators that identifies one or more customizations that were performed in order to produce one or more customized food items to be held by the at least one customized packaging. For instance, the customized food item related information customized packaging generation controlling module 438 of the customized food preparation system 10a or 10b of FIG. 3A or 3B (or of the network control system 12a or 12b of FIG. 3D or 3E) directing or controlling generation of at least one customized packaging (e.g., customized packaging 24b of FIG. 2B) that has been customized to have one or more visual indicators that identifies one or more customizations (e.g., "extra steam") that were performed in order to produce one or more customized food items (e.g., customized food item 22b of FIG. 2B) to be held by the at least one customized packaging (e.g., customized packaging 24b).

In some implementations, operation 761 may further include an operation 762 for directing generation of at least one customized packaging that has been customized to have one or more visual indicators that identifies one or more ingredients that are absent from the one or more customized food items to be held by the at least one customized packaging. For instance, the customized food item related information customized packaging generation controlling module 438 of the customized food preparation system 10a or 10b of FIG. 3A or 3B (or of the network control system 12a or 12b of FIG. 3D or 3E) directing or controlling generation of at least one customized packaging (e.g., customized packaging 24b of FIG. 2B) that has been customized to have one or more visual indicators that identifies one or more ingredients that are absent (e.g., 0 grams of sugar) from the one or more customized food items (e.g., customized food item 22b of FIG. 2B) to be held by the at least one customized packaging (e.g., customized packaging 24b).

In the same or alternative implementations, operation 761 may additionally or alternatively include an operation 763 for directing generation of at least one customized packaging that has been customized to have one or more visual indicators that identifies which one or more ingredients that are included in the one or more customized food items to be held by the at least one customized packaging had their quantities in the one or more customized food items set based, at least in part, on the acquired information. For instance, the customized food item related information customized packaging generation controlling module 438 of the customized food preparation system 10a or 10b of FIG. 3A or 3B (or of the network control system 12a or 12b of FIG. 3D or 3E) directing or controlling generation of at least one customized packaging 24* that has been customized to have one or more visual indicators that identifies which one or more ingredients that are included in the one or more customized food items 22* to be held by the at least one customized packaging 24* had their quantities in the one or more customized food items 22* set based, at least in part, on the acquired information.

Figure 7H:
FIG. 7H is a high-level logic flowchart of a process depicting alternate implementations of the customized packaging generation directing operation 504 of FIG. 5.

Referring to FIG. 7H, in various implementations, the customized packaging generation directing operation 504 may include an operation 764 for directing the generation of the one or more customized packagings having one or more features that are customized based, at least in part, on the acquired user information including selecting for customization one or more packaging having one or more particular colors based, at least in part, on the acquired user information. For instance, the customized packaging generation controlling module 304* including the packaging selecting module 440 of the customized food preparation system 10a or 10b of FIG. 3A or 3B (or of the network control system 12a or 12b of FIG. 3D or 3E) directing the generation of the one or more customized packagings 24* having one or more features that are customized based, at least in part, on the acquired user information including the packaging selecting module 440 selecting for customization one or more packaging (e.g., the customized packaging 24* of FIGS. 2A, 2B 2C, 2D, 2E, and/or 2F prior to being customized—note that in some cases, the selection process itself may be the customization) having one or more particular colors based, at least in part, on the acquired user information.

In some implementations, the customized packaging generation directing operation 504 may include an operation 765 for directing the generation of the one or more customized packagings having one or more features that are customized based, at least in part, on the acquired user information including selecting for customization one or more packaging having one or more particular patterns based, at least in part, on the acquired user information. For instance, the customized packaging generation controlling module 304* including the packaging selecting module 440 of the customized food preparation system 10a or 10b of FIG. 3A or 3B (or of the network control system 12a or 12b of FIG. 3D or 3E) directing the generation of the one or more customized packagings 24* having one or more features that are customized based, at least in part, on the acquired user information including the packaging selecting module 440 selecting for customization one or more packaging (e.g., the customized packaging 24* of FIGS. 2A, 2B 2C, 2D, 2E, and/or 2F prior to being customized—note that in some cases, the selection process itself may be the customization) having one or more particular patterns (e.g., stripes, checkered, etc.) based, at least in part, on the acquired user information.

In some implementations, the customized packaging generation directing operation 504 may include an operation 766 for directing the generation of the one or more customized packagings having one or more features that are customized based, at least in part, on the acquired user information including selecting for customization one or more packaging having one or more particular shapes based, at least in part, on the acquired user information. For instance, the customized packaging generation controlling module 304* including the packaging selecting module 440 of the customized food preparation system 10a or 10b of FIG. 3A or 3B (or of the network control system 12a or 12b of FIG. 3D or 3E) directing the generation of the one or more customized packagings 24* having one or more features that are customized based, at least in part, on the acquired user information including the packaging selecting module 440 selecting for customization one or more packaging (e.g., the customized packaging 24* of FIGS. 2A, 2B 2C, 2D, 2E, and/or 2F prior to being customized—note that in some cases, the selection process itself may be the customization) having one or more particular shapes (e.g., wrapping sheet, cup or bowl, a plate or tray, and so forth) based, at least in part, on the acquired user information.

In various implementations, the customized packaging generation directing operation 504 may include an operation 767 for directing the generation of the one or more customized packagings having the one or more features that are customized based, at least in part, on the acquired user information by directing the generation of the one or more customized packagings having the one or more features that are customized based, at least in part, on acquired dietary information associated with at least one of the one or more users. For instance, the customized packaging generation controlling module 304* of the customized food preparation system 10a or 10b of FIG. 3A or 3B (or of the network control system 12a or 12b of FIG. 3D or 3E) directing the generation of the one or more customized packagings 24* having the one or more features that are customized based, at least in part, on the acquired user information by directing or controlling the generation of the one or more customized packagings 24* having the one or more features that are customized based, at least in part, on acquired dietary information associated with at least one of the one or more users. The dietary information may be acquired from a variety of sources including from at least one user, from memory or from the Internet based, for example, on user identity or identifier provided by a user. As will be further described herein, various types of dietary information may be the basis for the customization of the customized packagings 24*.

For example, in some implementations, operation 767 may actually include an operation 768 for directing the generation of the one or more customized packagings having the one or more features that are customized based, at least in part, on the acquired dietary information associated with the at least one of the one or more users by directing the generation of the one or more customized packagings having the one or more features that are customized based, at least in part, on one or more food item selections that were made by the at least one of the one or more users. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized based, at least in part, on the acquired dietary information associated with the at least one of the one or more users by directing or controlling the generation of the one or more customized packagings 24* having the one or more features (e.g., textual, iconic, or image information) that are customized based, at least in part, on one or more food item selections that were made by the at least one of the one or more users. For example, the customization of a customized packaging 24* being based, at least in part, on the selection of a peanut butter energy bar rather than a caramel crunch energy bar.

In the same or alternative implementations, operation 767 may additionally or alternatively include an operation 769 for directing the generation of the one or more customized packagings having the one or more features that are customized based, at least in part, on the acquired dietary information associated with the at least one of the one or more users by directing the generation of the one or more customized packagings having the one or more features that are customized based, at least in part, on one or more food customization choices that were made by the at least one of the one or more users. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized based, at least in part, on the acquired dietary information associated with the at least one of the one or more users by directing or controlling the generation of the one or more customized packagings 24* having the one or more features (e.g., textual, iconic, or image information) that are customized based, at least in part, on one or more food customization choices (e.g., customization choices like sweeter, more spicy, creamier, hotter, and so forth) that were made by the at least one of the one or more users.

Figure 7J:
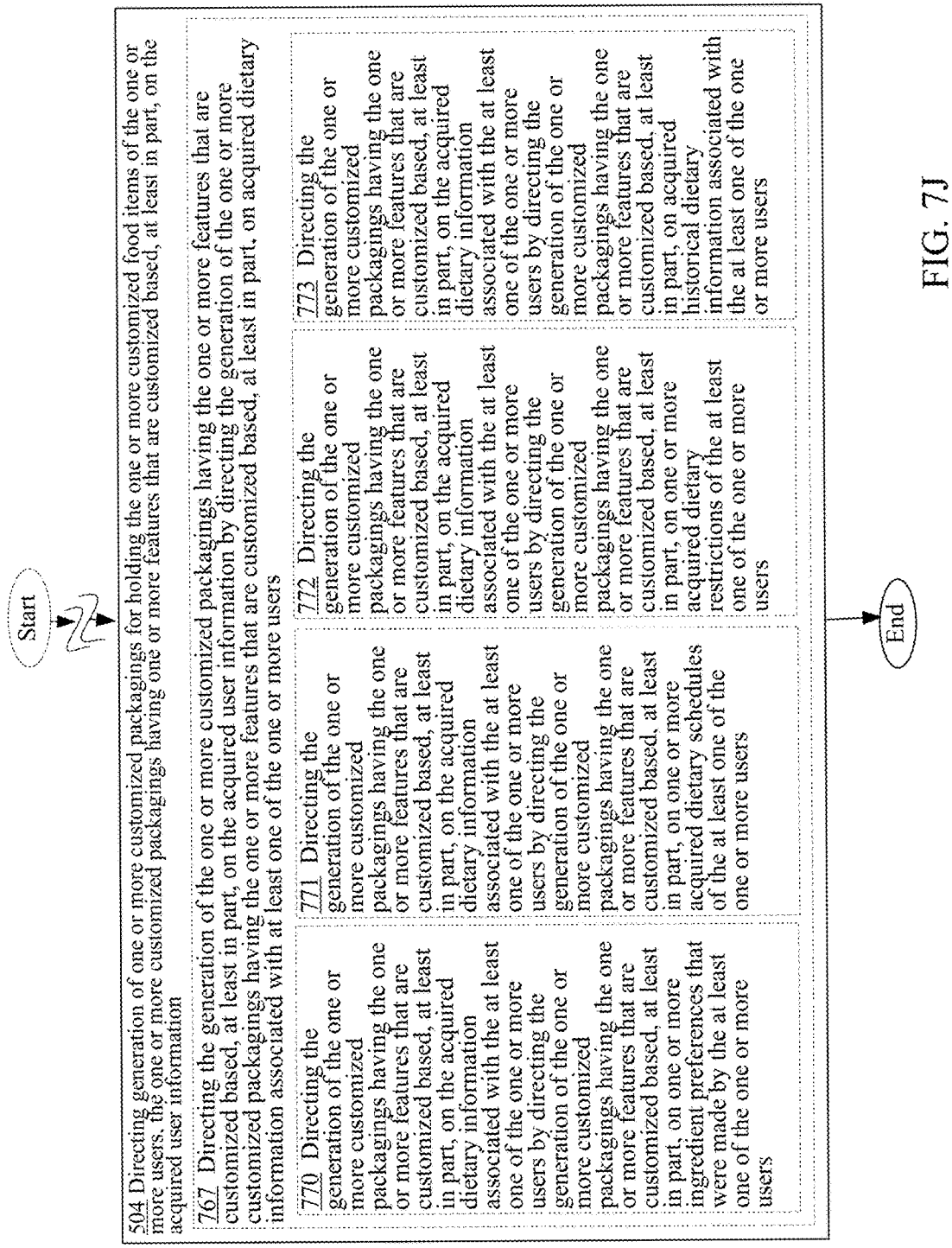
FIG. 7J is a high-level logic flowchart of a process depicting alternate implementations of the customized packaging generation directing operation 504 of FIG. 5.

In the same or alternative implementations, operation 767 may additionally or alternatively an operation 770 for directing the generation of the one or more customized packagings having the one or more features that are customized based, at least in part, on the acquired dietary information associated with the at least one of the one or more users by directing the generation of the one or more customized packagings having the one or more features that are customized based, at least in part, on one or more ingredient preferences that were made by the at least one of the one or more users as illustrated in FIG. 7J. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized based, at least in part, on the acquired dietary information associated with the at least one of the one or more users by directing or controlling the generation of the one or more customized packagings 24* having the one or more features (e.g., textual, iconic, or image information) that are customized based, at least in part, on one or more ingredient preferences (e.g., no salt, extra sugar, no peanuts, and so forth) that were made by the at least one of the one or more users.

In the same or alternative implementations, operation 767 may additionally or alternatively include an operation 771 for directing the generation of the one or more customized packagings having the one or more features that are customized based, at least in part, on the acquired dietary information associated with the at least one of the one or more users by directing the generation of the one or more customized packagings having the one or more features that are customized based, at least in part, on one or more acquired dietary schedules of the at least one of the one or more users. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized based, at least in part, on the acquired dietary information associated with the at least one of the one or more users by directing or controlling the generation of the one or more customized packagings 24* having the one or more features (e.g., textual, iconic, or image information) that are customized based, at least in part, on one or more acquired dietary schedules (e.g., diets or diet plans) of the at least one of the one or more users.

In the same or alternative implementations, operation 767 may additionally or alternatively an operation 772 for directing the generation of the one or more customized packagings having the one or more features that are customized based, at least in part, on the acquired dietary information associated with the at least one of the one or more users by directing the generation of the one or more customized packagings having the one or more features that are customized based, at least in part, on one or more acquired dietary restrictions of the at least one of the one or more users. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized based, at least in part, on the acquired dietary information associated with the at least one of the one or more users by directing or controlling the generation of the one or more customized packagings 24* having the one or more features (e.g., textual, iconic, or image information) that are customized based, at least in part, on one or more acquired dietary restrictions (e.g., no peanuts because of peanut allergy) of the at least one of the one or more users.

In the same or alternative implementations, operation 767 may additionally or alternatively an operation 773 for directing the generation of the one or more customized packagings having the one or more features that are customized based, at least in part, on the acquired dietary information associated with the at least one of the one or more users by directing the generation of the one or more customized packagings having the one or more features that are customized based, at least in part, on acquired historical dietary information associated with the at least one of the one or more users. For instance, the customized packaging generation controlling module 304\* of the customized food preparation system 10*a* or 10*b* of FIG. 3A or 3B (or of the network control system 12*a* or 12*b* of FIG. 3D or 3E) directing the generation of the one or more customized packagings 24\* having the one or more features that are customized based, at least in part, on the acquired dietary information associated with the at least one of the one or more users by directing or controlling the generation of the one or more customized packagings 24\* having the one or more features (e.g., textual, iconic, or image information) that are customized based, at least in part, on acquired historical dietary information (e.g., amounts of sodium consumed by a user during the past week) associated with the at least one of the one or more users. In some cases, such historical dietary information may be printed onto customized packaging 24\*.

Figure 7K:
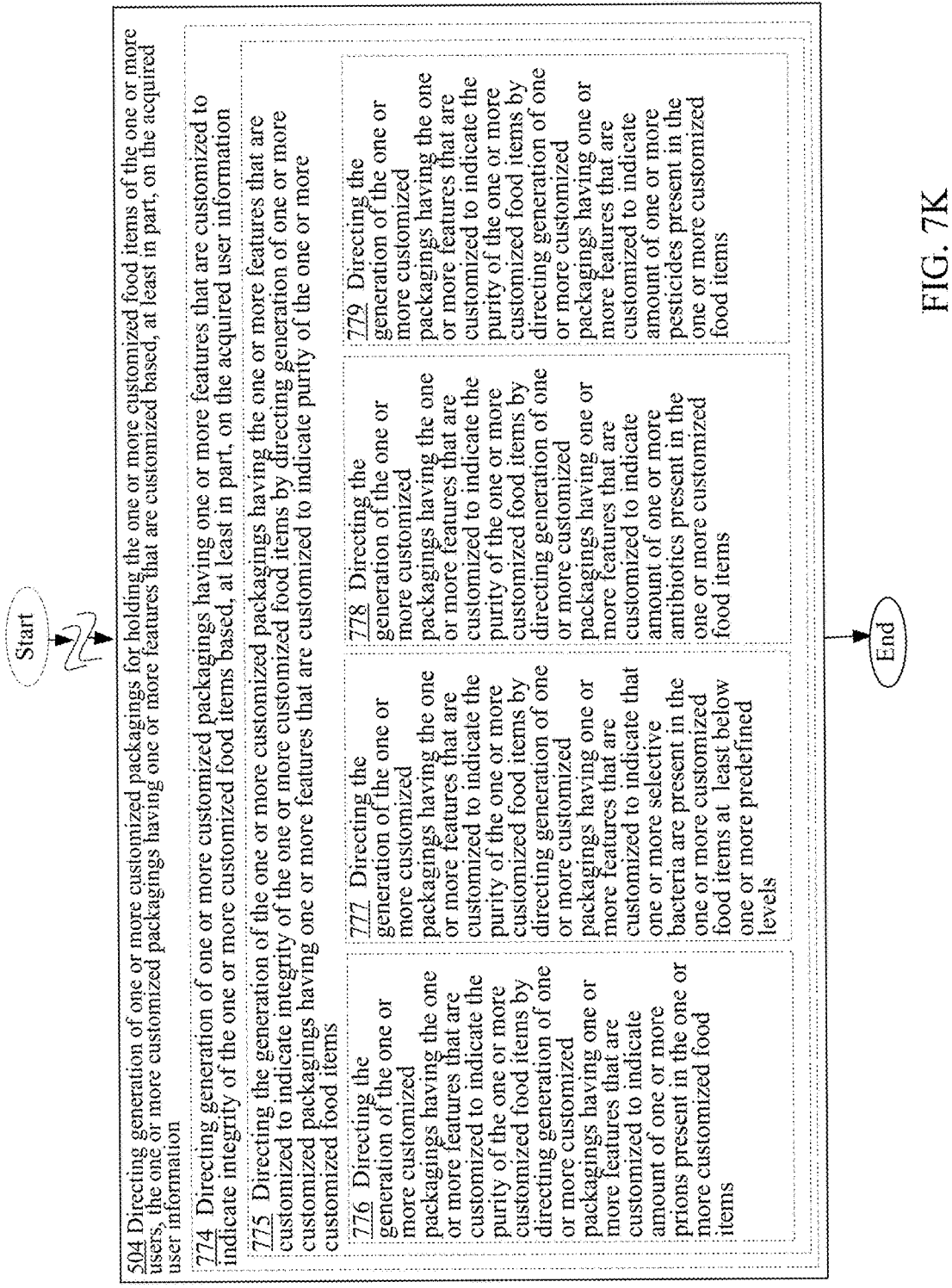
FIG. 7K is a high-level logic flowchart of a process depicting alternate implementations of the customized packaging generation directing operation 504 of FIG. 5.

Referring to FIG. 7K, in various implementations, the customized packaging generation directing operation 504 may include an operation 774 for directing generation of one or more customized packagings having one or more features that are customized to indicate integrity of the one or more customized food items based, at least in part, on the acquired user information. For instance, the customized packaging generation controlling module 304\* of the customized food preparation system 10*a* or 10*b* of FIG. 3A or 3B (or of the network control system 12*a* or 12*b* of FIG. 3D or 3E) directing or controlling generation of one or more customized packagings having one or more features that are customized to indicate integrity (e.g., purity, free of pollutants, and so forth) of the one or more customized food items based, at least in part, on the acquired user information (e.g., user preference that the one or more customized food items be free of pesticides or prions, thus, customized packaging 24\* indicating that the one or more customized food items 22\* that are held by the customized packaging 24\* being free of pesticides or prions).

As further illustrated in FIG. 7K, in various implementations, operation 774 may further include an operation 775 for directing the generation of the one or more customized packagings having the one or more features that are customized to indicate integrity of the one or more customized food items by directing generation of one or more customized packagings having one or more features that are customized to indicate purity of the one or more customized food items. For instance, the customized packaging generation controlling module 304\* of the customized food preparation system 10*a* or 10*b* of FIG. 3A or 3B (or of the network control system 12*a* or 12*b* of FIG. 3D or 3E) directing the generation of the one or more customized packagings 24\* having the one or more features that are customized to indicate integrity of the one or more customized food items by directing or controlling generation of one or more customized packagings 24\* having one or more features (e.g., text or icons) that are customized to indicate purity (e.g., free of pollutants or poison, free of prions, minimal amount of bacteria, and so forth) of the one or more customized food items (e.g., dairy products).

As further illustrated in FIG. 7K, operation 775 may further include one or more additional operations including, in some cases, an operation 776 for directing the generation of the one or more customized packagings having the one or more features that are customized to indicate the purity of the one or more customized food items by directing generation of one or more customized packagings having one or more features that are customized to indicate amount of one or more prions present in the one or more customized food items. For instance, the customized packaging generation controlling module 304\* of the customized food preparation system 10*a* or 10*b* of FIG. 3A or 3B (or of the network control system 12*a* or 12*b* of FIG. 3D or 3E) directing the generation of the one or more customized packagings 24\* having the one or more features that are customized to indicate the purity of the one or more customized food items 22\* by directing or controlling generation of one or more customized packagings 24\* having one or more features that are customized to indicate amount of one or more prions (e.g., "free of prions" or "zero prions") present in the one or more customized food items.

In some implementations, operation 775 may include an operation 777 for directing the generation of the one or more customized packagings having the one or more features that are customized to indicate the purity of the one or more customized food items by directing generation of one or more customized packagings having one or more features that are customized to indicate that one or more selective bacteria are present in the one or more customized food items at least below one or more predefined levels. For instance, the customized packaging generation controlling module 304\* of the customized food preparation system 10*a* or 10*b* of FIG. 3A or 3B (or of the network control system 12*a* or 12*b* of FIG. 3D or 3E) directing the generation of the one or more customized packagings 24\* having the one or more features that are customized to indicate the purity of the one or more customized food items 22\* by directing or controlling generation of one or more customized packagings 24\* having one or more features (e.g., text) that are customized to indicate that one or more selective bacteria (e.g., *salmonella*) are present in the one or more customized food items 22\* at least below one or more predefined levels.

In some implementations, operation 775 may include an operation 778 for directing the generation of the one or more customized packagings having the one or more features that are customized to indicate the purity of the one or more customized food items by directing generation of one or more customized packagings having one or more features that are customized to indicate amount of one or more antibiotics present in the one or more customized food items. For instance, the customized packaging generation controlling module 304\* of the customized food preparation system 10*a* or 10*b* of FIG. 3A or 3B (or of the network control system 12*a* or 12*b* of FIG. 3D or 3E) directing the generation of the one or more customized packagings 24\* having the one or more features that are customized to indicate the purity of the one or more customized food items 22\* by directing or controlling generation of one or more customized packagings 24\* having one or more features (e.g., printed text, images, or icons) that are customized to indicate amount of one or more antibiotics present in the one or more customized food items 22\* (e.g., customized beef stew).

In some implementations, operation 775 may include an operation 779 for directing the generation of the one or more customized packagings having the one or more features that are customized to indicate the purity of the one or more customized food items by directing generation of one or more customized packagings having one or more features that are customized to indicate amount of one or more pesticides present in the one or more customized food items. For instance, the customized packaging generation controlling module 304\* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized to indicate the purity of the one or more customized food items 22* by directing or controlling generation of one or more customized packagings 24* having one or more features (e.g., images, text, icons, and so forth) that are customized to indicate amount of one or more pesticides (e.g., "no pesticide") present in the one or more customized food items 22* (e.g., vegetable soup).

Figure 7L:
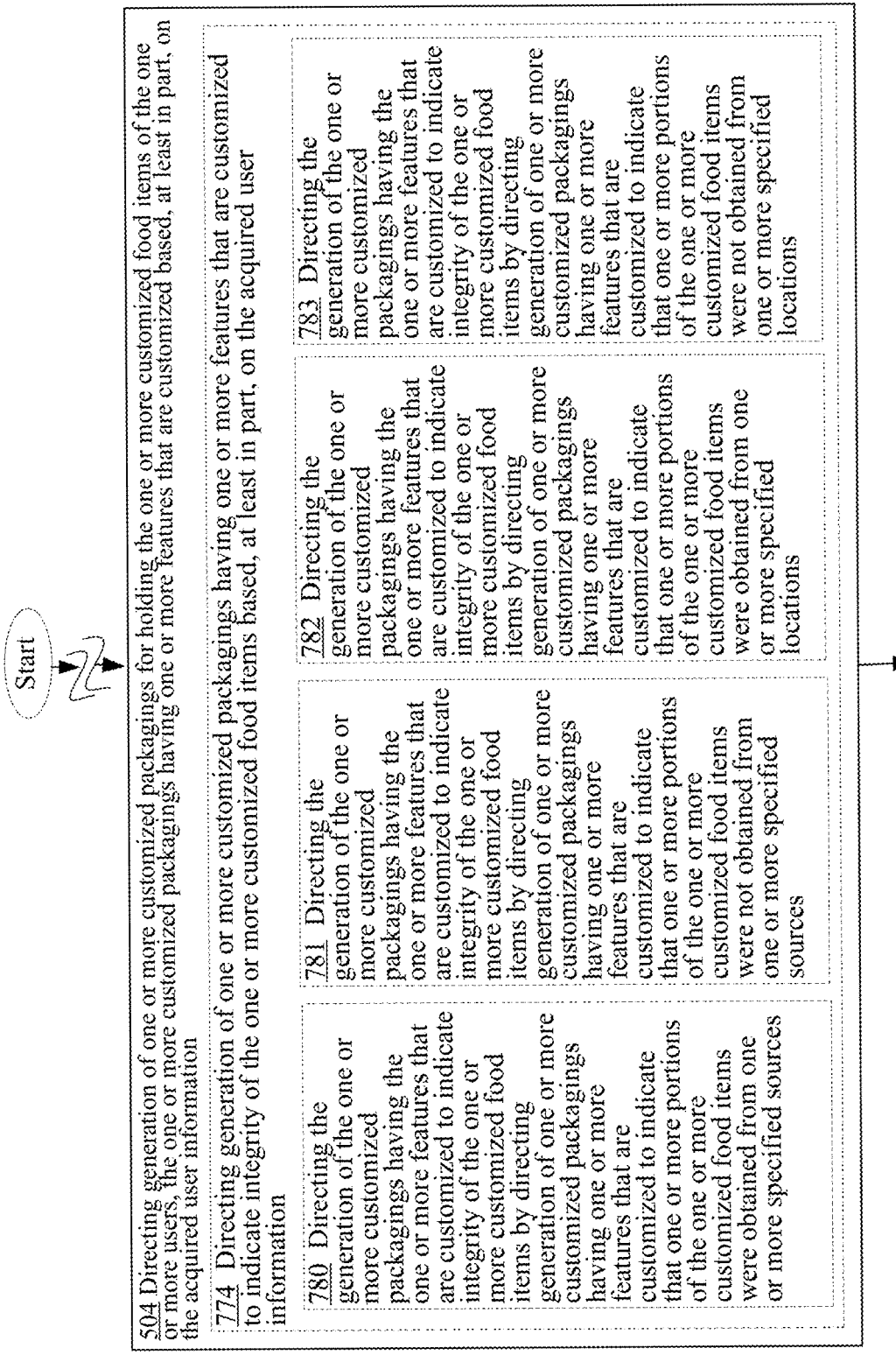
FIG. 7L is a high-level logic flowchart of a process depicting alternate implementations of the customized packaging generation directing operation 504 of FIG. 5.

Turning now to FIG. 7L, in various implementations, operation 774 may include an operation 780 for directing the generation of the one or more customized packagings having the one or more features that are customized to indicate integrity of the one or more customized food items by directing generation of one or more customized packagings having one or more features that are customized to indicate that one or more portions of the one or more customized food items were obtained from one or more specified sources. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized to indicate integrity of the one or more customized food items 22* by directing or controlling generation of one or more customized packagings 24* having one or more features that are customized to indicate that one or more portions (e.g., ingredients) of the one or more customized food items 22* were obtained from one or more specified sources (e.g., Tyson farms).

In some implementations, operation 774 may include an operation 781 for directing the generation of the one or more customized packagings having the one or more features that are customized to indicate integrity of the one or more customized food items by directing generation of one or more customized packagings having one or more features that are customized to indicate that one or more portions of the one or more customized food items were not obtained from one or more specified sources. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized to indicate integrity of the one or more customized food items 22* by directing or controlling generation of one or more customized packagings 24* having one or more features (e.g., printed labels) that are customized to indicate that one or more portions of the one or more customized food items 22* were not obtained from one or more specified sources (e.g., Del Monte).

In some implementations, operation 774 may include an operation 782 for directing the generation of the one or more customized packagings having the one or more features that are customized to indicate integrity of the one or more customized food items by directing generation of one or more customized packagings having one or more features that are customized to indicate that one or more portions of the one or more customized food items were obtained from one or more specified locations. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized to indicate integrity of the one or more customized food items 22* by directing or controlling generation of one or more customized packagings 24* having one or more features (e.g., printed text) that are customized to indicate that one or more portions of the one or more customized food items were obtained from one or more specified locations (e.g., Hawaii).

In some implementations, operation 774 may include an operation 783 for directing the generation of the one or more customized packagings having the one or more features that are customized to indicate integrity of the one or more customized food items by directing generation of one or more customized packagings having one or more features that are customized to indicate that one or more portions of the one or more customized food items were not obtained from one or more specified locations. For instance, the customized packaging generation controlling module 304* of the customized food preparation system 10*a* or 10*b* of FIG. 3A or 3B (or of the network control system 12*a* or 12*b* of FIG. 3D or 3E) directing the generation of the one or more customized packagings 24* having the one or more features that are customized to indicate integrity of the one or more customized food items 22* by directing or controlling generation of one or more customized packagings 24* having one or more features (e.g., printed text or icons) that are customized to indicate that one or more portions of the one or more customized food items 22* were not obtained from one or more specified locations (e.g., Britain).

Figure 8:
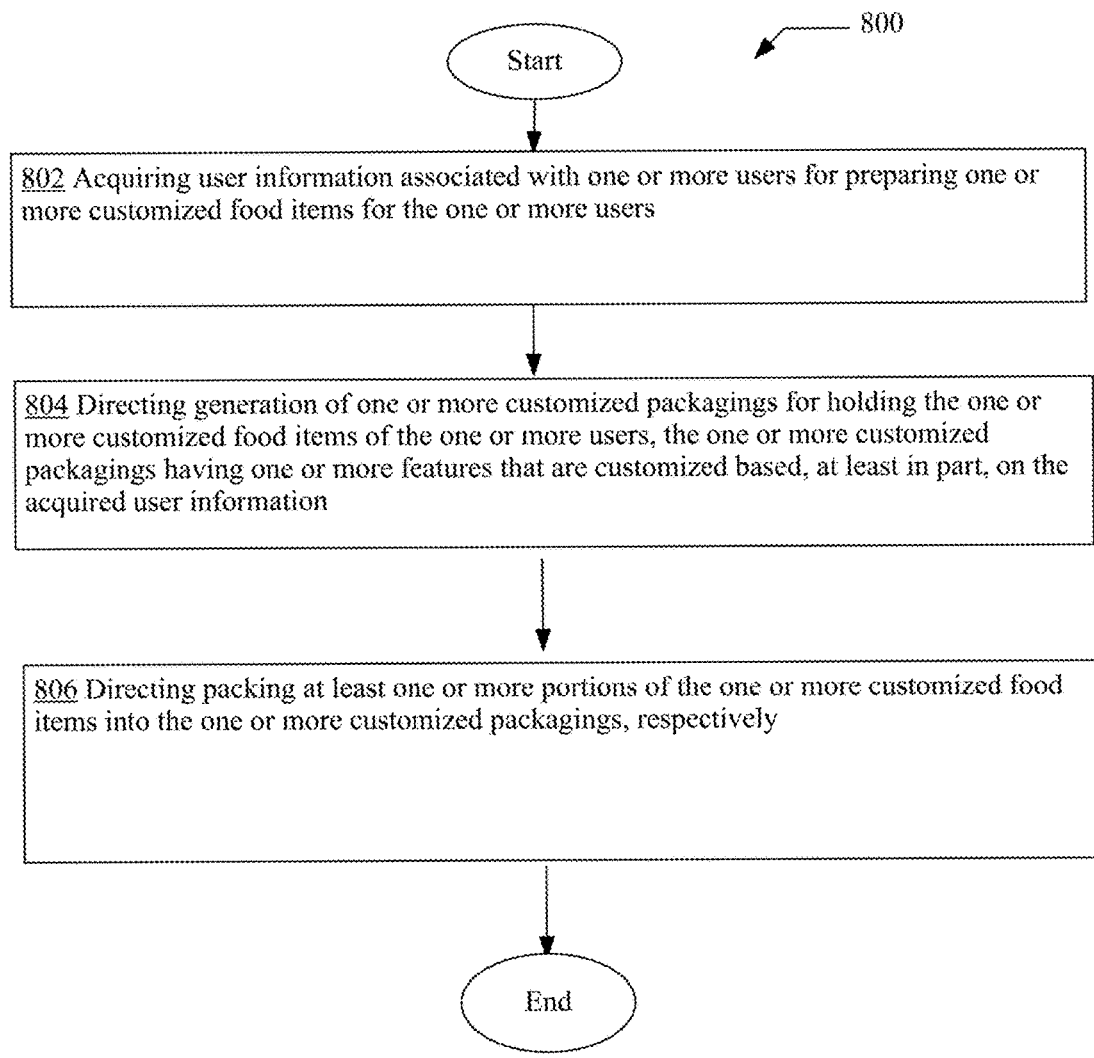
FIG. 8 is another high-level logic flowchart of another process, e.g., operational flow 800, according to some embodiments.

Turning now to FIG. 8 illustrating another operational flow 800. Operational flow 800 includes certain operations that mirror the operations included in operational flow 500 of FIG. 5. These operations include a user information acquiring operation 802 and a customized packaging generation directing operation 804 that corresponds to and mirrors the user information acquiring operation 502 and the customized packaging generation directing operation 504, respectively, of FIG. 5.

In addition, operational flow 800 further includes a customized food item packing directing operation 806 for directing packing at least one or more portions of the one or more customized food items into the one or more customized packagings, respectively. For instance, the customized food item packing directing module 306* of the customized food preparation system 10*a* or 10*b* of FIG. 3A or 3B (or of the network control system 12*a* or 12*b* of FIG. 3D or 3E) directing packing (e.g., forming, placing, depositing, wrapping, and so forth) of at least one or more portions of the one or more customized food items 22* into the one or more customized packagings 24*, respectively. Note that although the customizing of a packaging appears to be described herein as being performed prior to packing of the customized food item 22* into a customized packaging 24*, the customization (e.g., printing of customized information) of the packaging may actually in some cases be performed after the customized food item 22* has already been placed or wrapped into the non-customized packaging.

Figure 9:
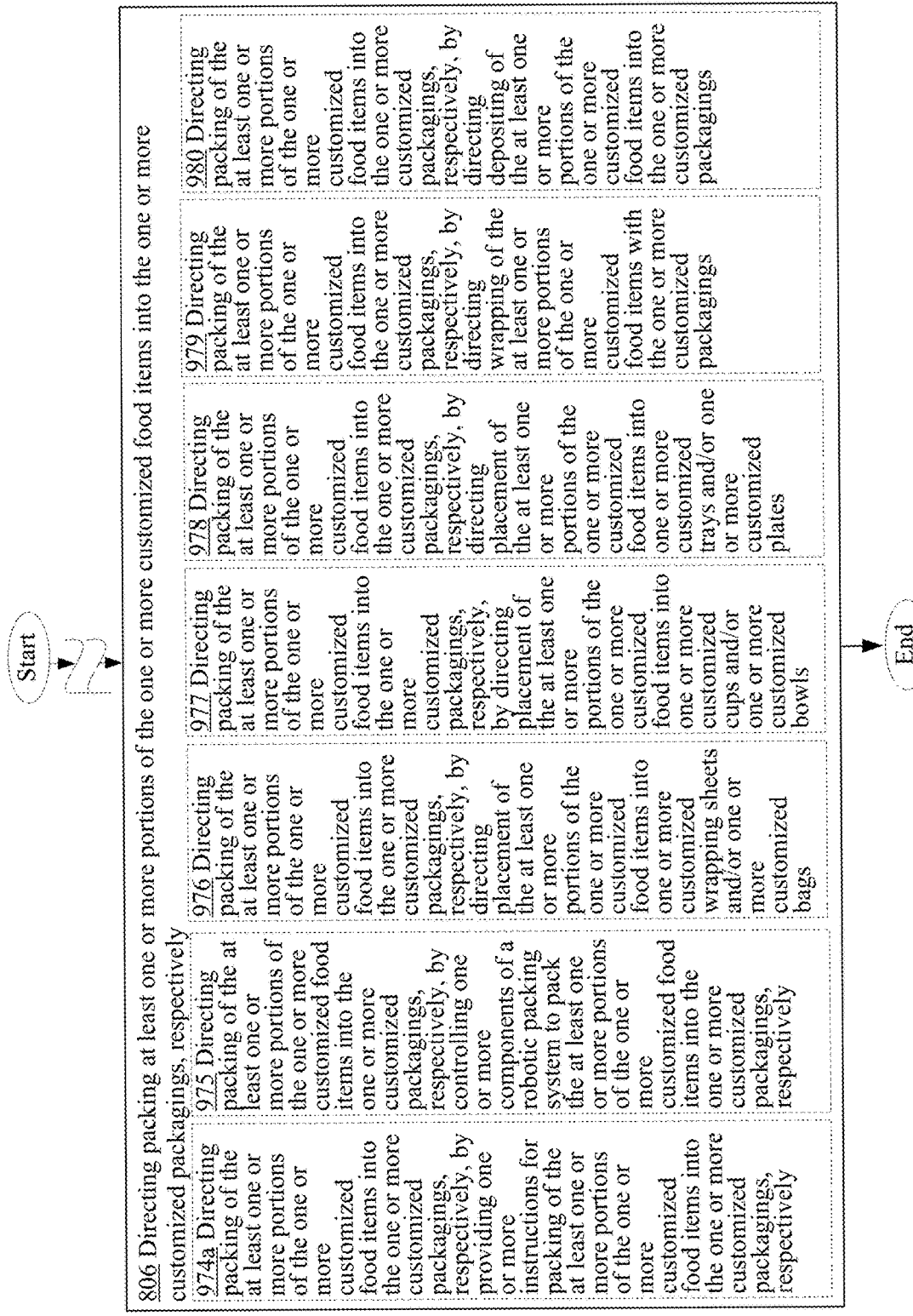
FIG. 9 is a high-level logic flowchart of a process depicting alternate implementations of the customized food item packing directing operation 806 of FIG. 8.

Turning now to FIG. 9, which illustrates various ways that the customized food item packing directing operation 806 of FIG. 8 may be implemented in various alternative implementations. For example, in some implementations, the customized food item packing directing operation 806 may include an operation 974*a* for directing packing of the at least one or more portions of the one or more customized food items into the one or more customized packagings, respectively, by providing one or more instructions for packing of the at least one or more portions of the one or more customized food items into the one or more customized packagings, respectively. For instance, the customized food item packing directing module 306* including the packing instruction providing module 442 (see FIG. 4C) of the network control system 12a or 12b of FIG. 3D or 3E directing packing of the at least one or more portions of the one or more customized food items 22* into the one or more customized packagings 24*, respectively, by having the packing instruction providing module 442 provide one or more instructions to one or more customized food preparation systems 10c for packing of the at least one or more portions of the one or more customized food items 22* into the one or more customized packagings 24*, respectively.

In some implementations, the customized food item packing directing operation 806 may include an operation 975 for directing packing of the at least one or more portions of the one or more customized food items into the one or more customized packagings, respectively, by controlling one or more components of a robotic packing system to pack the at least one or more portions of the one or more customized food items into the one or more customized packagings, respectively. For instance, the customized food item packing directing module 306* including the packing system component controlling module 444 (see FIG. 4C) of the customized food preparation system 10a or 10b of FIG. 3A or 3B (or of the network control system 12a or 12b of FIG. 3D or 3E) directing packing of the at least one or more portions of the one or more customized food items 22* into the one or more customized packagings 24*, respectively, by having the packing system component controlling module 444 control one or more components of a robotic packing system 325* (see FIGS. 4D, 4G, and 4H) to pack (e.g., form, place, dispense, wrap, etc.) the at least one or more portions of the one or more customized food items 22* into the one or more customized packagings 24*, respectively.

In some implementations, the customized food item packing directing operation 806 may include an operation 976 for directing packing of the at least one or more portions of the one or more customized food items into the one or more customized packagings, respectively, by directing placement of the at least one or more portions of the one or more customized food items into one or more customized wrapping sheets and/or one or more customized bags. For instance, the customized food item packing directing module 306* including the customized food item placement directing module 446 (see FIG. 4C) of the customized food preparation system 10a or 10b of FIG. 3A or 3B (or of the network control system 12a or 12b of FIG. 3D or 3E) directing packing of the at least one or more portions of the one or more customized food items 22* into the one or more customized packagings 24*, respectively, by having the customized food item placement directing module 446 direct placement (e.g., forming, placing, dispensing, wrapping, etc.) of the at least one or more portions of the one or more customized food items 22* into one or more customized wrapping sheets (e.g., customized packaging 24c of FIG. 2C, 2D, or 2E) and/or one or more customized bags (e.g., customized packaging 24f of FIG. 2F). Note that in some cases, a customized food item 22* may be manufactured or produced directly on a packaging (e.g., customized packaging 22c) as illustrated, for example, in FIG. 2C.

In some implementations, the customized food item packing directing operation 806 may include an operation 977 for directing packing of the at least one or more portions of the one or more customized food items into the one or more customized packagings, respectively, by directing placement of the at least one or more portions of the one or more customized food items into one or more customized cups and/or one or more customized bowls. For instance, the customized food item packing directing module 306* including the customized food item placement directing module 446 of the customized food preparation system 10a or 10b of FIG. 3A or 3B (or of the network control system 12a or 12b of FIG. 3D or 3E) directing packing of the at least one or more portions of the one or more customized food items 22* into the one or more customized packagings 24*, respectively, by having the customized food item placement directing module 446 direct placement of the at least one or more portions of the one or more customized food items 22* into one or more customized cups and/or one or more customized bowls (e.g., customized packaging 24b of FIG. 2B).

In some implementations, the customized food item packing directing operation 806 may include an operation 978 for directing packing of the at least one or more portions of the one or more customized food items into the one or more customized packagings, respectively, by directing placement of the at least one or more portions of the one or more customized food items into one or more customized trays and/or one or more customized plates. For instance, the customized food item packing directing module 306* including the customized food item placement directing module 446 of the customized food preparation system 10a or 10b of FIG. 3A or 3B (or of the network control system 12a or 12b of FIG. 3D or 3E) directing packing of the at least one or more portions of the one or more customized food items 22* into the one or more customized packagings 24*, respectively, by having the customized food item placement directing module 446 direct placement of the at least one or more portions of the one or more customized food items 22* into one or more customized trays and/or one or more customized plates (e.g., customized packaging 24a of FIG. 2A).

In some implementations, the customized food item packing directing operation 806 may include an operation 979 for directing packing of the at least one or more portions of the one or more customized food items into the one or more customized packagings, respectively, by directing wrapping of the at least one or more portions of the one or more customized food items with the one or more customized packagings. For instance, the customized food item packing directing module 306* including the customized food item wrapping directing module 448 (see FIG. 4C) of the customized food preparation system 10a or 10b of FIG. 3A or 3B (or of the network control system 12a or 12b of FIG. 3D or 3E) directing packing of the at least one or more portions of the one or more customized food items 22* into the one or more customized packagings 24*, respectively, by having the customized food item wrapping directing module 448 direct wrapping of the at least one or more portions of the one or more customized food items 22* with the one or more customized packagings 24* (e.g., customized packaging 24c of FIG. 2C).

In some implementations, the customized food item packing directing operation 806 may include an operation 980 for directing packing of the at least one or more portions of the one or more customized food items into the one or more customized packagings, respectively, by directing depositing of the at least one or more portions of the one or more customized food items into the one or more customized packagings. For instance, the customized food item packing directing module 306* including the customized food item depositing directing module 450 (see FIG. 4C) of the customized food preparation system 10a or 10b of FIG. 3A or 3B (or of the network control system 12a or 12b of FIG.

3D or 3E) directing packing of the at least one or more portions of the one or more customized food items 22\* into the one or more customized packagings 24\*, respectively, by having the customized food item depositing directing module 450 direct depositing of the at least one or more portions of the one or more customized food items 22\* into the one or more customized packagings 24\*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A food packaging customization system, comprising:
   at least one processing device; and
   at least one non-transitory medium including one or more instructions which, when executed by the at least one processing device, cause the at least one processing device to be configured as at least:
   circuitry configured for acquiring at least two user identifiers associated with at least two users, the at least two user identifiers including at least one identifier associated with at least one user proximate to the food packaging customization system and at least one identifier associated with at least one other user determined to be affiliated with the at least one user proximate to the food packaging customization system;
   circuitry configured for retrieving, based at least in part on the at least two user identifiers, one or more user customizations to be applied during preparation of one or more customized food items;
   circuitry configured for obtaining at least one image identifying at least one of the at least two users;
   circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users; and
   circuitry configured for controlling one or more components of a robotic packaging system to pack one or more portions of the one or more customized food items into the one or more customized packagings.

2. The food packaging customization system of claim 1, wherein circuitry configured for retrieving, based at least in part on the at least two user identifiers, one or more user customizations to be applied during preparation of one or more customized food items comprises:
   circuitry configured for retrieving dietary information associated with at least one of the at least two users.

3. The food packaging customization system of claim 2, wherein circuitry configured for retrieving dietary information associated with at least one of the at least two users comprises:
   circuitry configured for retrieving at least one of one or more dietary preferences, one or more ingredient preferences, one or more dietary schedules, or one or more dietary restrictions associated with at least one of the at least two users.

4. The food packaging customization system of claim 1, wherein circuitry configured for acquiring at least two user identifiers associated with at least two users, the at least two user identifiers including at least one identifier associated with at least one user proximate to the food packaging customization system and at least one identifier associated with at least one other user determined to be affiliated with the at least one user proximate to the food packaging customization system comprises:
   circuitry configured for determining that the at least one other user is affiliated with the at least one user proximate to the food packaging customization system using at least some social networking data.

5. The food packaging customization system of claim 4, wherein circuitry configured for determining that the at least one other user is affiliated with the at least one user proximate to the food packaging customization system using at least some social networking data comprises:
   circuitry configured for determining that the at least one other user is affiliated with the at least one user proximate to the food packaging customization system using at least some social networking data obtained by the food packaging customization system via at least one wireless communication between at least one mobile device of the at least one user proximate to the food packaging customization system and the food packaging customization system.

6. The food packaging customization system of claim 1, wherein circuitry configured for retrieving, based at least in part on the at least two user identifiers, one or more user customizations to be applied during preparation of one or more customized food items comprises:
   circuitry configured for retrieving one or more preferences of at least one of the at least two users related to purity of one or more food ingredients.

7. The food packaging customization system of claim 6, wherein circuitry configured for retrieving one or more preferences of at least one of the at least two users related to purity of one or more food ingredients comprises:
   circuitry configured for retrieving one or more preferences of at least one of the at least two users that one or more sources for the one or more ingredients were tested for presence of at least one of one or more prions, one or more antibiotics, or one or more selective bacteria.

8. The food packaging customization system of claim 1, wherein circuitry configured for retrieving, based at least in part on the at least two user identifiers, one or more user customizations to be applied during preparation of one or more customized food items comprises:
   circuitry configured for retrieving one or more preferences of at least one of the at least two users for at least one of one or more sources or one or more locations for obtaining one or more food ingredients.

9. The food packaging customization system of claim 1, wherein circuitry configured for retrieving, based at least in part on the at least two user identifiers, one or more user customizations to be applied during preparation of one or more customized food items comprises:
   circuitry configured for retrieving one or more preferences of at least one of the at least two users that one or more food ingredients not be obtained from at least one of one or more specified sources or one or more specified locations.

10. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
    circuitry configured for directing printing of information indicative of the one or more user customizations applied during preparation of the one or more customized food items and including the at least one image identifying the at least one of the at least two users onto one or more labels; and
    circuitry configured for directing affixing of the one or more printed labels onto one or more packagings designed for holding one or more portions of the one or more customized food items.

11. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
- circuitry configured for directing printing of information indicative of the one or more user customizations applied during preparation of the one or more customized food items and including the at least one image identifying the at least one of the at least two users onto one or more packagings designed for holding one or more portions of one or more customized food items.

12. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
- circuitry configured for directing generation of one or more customized packagings including at least one or more visual indicators providing information related to at least one of the two or more users.

13. The food packaging customization of claim 12, wherein circuitry configured for directing generation of one or more customized packagings including at least one or more visual indicators providing information related to at least one of the two or more users comprises:
- circuitry configured for directing generation of at least one customized packaging including at least one image of the at least one user proximate to the food packaging customization system.

14. The food packaging customization system of claim 12, wherein circuitry configured for directing generation of one or more customized packagings including at least one or more visual indicators providing information related to at least one of the two or more users comprises:
- circuitry configured for directing generation of at least one customized packaging including at least one image of the at least one other user determined to be affiliated with the at least one user proximate to the food packaging customization system.

15. The food packaging customization system of claim 14, wherein circuitry configured for directing generation of at least one customized packaging including at least one image of the at least one other user determined to be affiliated with the at least one user proximate to the food packaging customization system comprises:
- circuitry configured for directing generation of at least one customized packaging including at least the at least one image of the at least one other user determined to be affiliated with the at least one user proximate to the food packaging customization system and one or more of an alert or a warning associated with the at least one other user determined to be affiliated with the at least one user proximate to the food packaging customization system and the customized food item.

16. The food packaging customization system of claim 1, wherein circuitry configured for obtaining at least one image identifying at least one of the at least two users comprises:
- circuitry configured for obtaining social networking data through at least one mobile device of the at least one user proximate to the food packaging customization system, including at least obtaining one visual indicator that provides user identification identifying the at least one user proximate to the food packaging customization system from at least one social networking website.

17. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
- circuitry configured for directing generation of at least one customized packaging including at least one or more visual indicators providing dietary information related to at least one of the at least two users.

18. The food packaging customization system of claim 17, wherein circuitry configured for directing generation of at least one customized packaging including at least one or more visual indicators providing dietary information related to at least one of the at least two users comprises:
- circuitry configured for directing generation of at least one customized packaging including at least one or more visual indicators indicating historical dietary consumption information of the at least one of the at least two users.

19. The food packaging customization system of claim 17, wherein circuitry configured for directing generation of at least one customized packaging including at least one or more visual indicators providing dietary information related to at least one of the at least two users comprises:
- circuitry configured for directing generation of at least one customized packaging including at least one or more visual indicators comparing one or more quantities of one or more ingredients of one or more customized food items to be held by the at least one customized packaging with historical consumption data of the at least one of the at least two users.

20. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
- circuitry configured for directing generation of at least one customized packaging including at least one or more visual indicators providing information related to one or more customized food items to be held by the at least one customized packaging.

21. The food packaging customization system of claim 20, wherein circuitry configured for directing generation of at least one customized packaging including at least one or more visual indicators providing information related to one or more customized food items to be held by the at least one customized packaging comprises:
- circuitry configured for directing generation of at least one customized packaging including at least one or more visual indicators identifying one or more ingredients included in the one or more customized food items to be held by the at least one customized packaging.

22. The food packaging customization system of claim 20, wherein circuitry configured for directing generation of at least one customized packaging including at least one or more visual indicators providing information related to one or more customized food items to be held by the at least one customized packaging comprises:
circuitry configured for directing generation of at least one customized packaging including at least one or more visual indicators indicating one or more quantities of the one or more ingredients included in the one or more customized food items to be held by the at least one customized packaging.

23. The food packaging customization system of claim 20, wherein circuitry configured for directing generation of at least one customized packaging including at least one or more visual indicators providing information related to one or more customized food items to be held by the at least one customized packaging comprises:
circuitry configured for directing generation of at least one customized packaging including at least one or more visual indicators indicating one or more customizations performed in order to produce one or more customized food items to be held by the at least one customized packaging.

24. The food packaging customization system of claim 23, wherein circuitry configured for directing generation of at least one customized packaging including at least one or more visual indicators indicating one or more customizations performed in order to produce one or more customized food items to be held by the at least one customized packaging comprises:
circuitry configured for directing generation of at least one customized packaging including at least one or more visual indicators identifying one or more ingredients absent, in accordance with the one or more customizations, from the one or more customized food items to be held by the at least one customized packaging.

25. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
circuitry configured for directing generation of one or more customized packagings including at least one or more features indicative of acquired dietary information associated with the at least one of the at least two users.

26. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
circuitry configured for directing generation of one or more customized packagings including at least one or more features indicative of one or more ingredient preferences associated with the at least one of the at least two users.

27. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
circuitry configured for directing generation of one or more customized packagings including at least one or more features indicative of integrity of the one or more customized food items.

28. The food packaging customization system of claim 27, wherein circuitry configured for directing generation of one or more customized packagings including at least one or more features indicative of integrity of the one or more customized food items comprises:
circuitry configured for directing generation of one or more customized packagings including at least one or more features indicative of purity of the one or more customized food items.

29. The food packaging customization system of claim 28, wherein circuitry configured for directing generation of one or more customized packagings including at least one or more features indicative of purity of the one or more customized food items in accordance with the one or more user customizations comprises:
circuitry configured for directing generation of one or more customized packagings including at least one or more features indicative of purity of the one or more customized food items in accordance with the one or more user customizations, the purity of the one or more customized food items including at least one of that one or more selective bacteria are present in the one or more customized food items at least below one or more predefined levels, that one or more portions of the one or more customized food items were not obtained from one or more specified sources, or that one or more portions of the one or more customized food items were not obtained from one or more specified locations.

30. The food packaging customization system of claim 1, wherein circuitry configured for controlling one or more components of a robotic packaging system to pack one or more portions of the one or more customized food items into the one or more customized packagings comprises:
circuitry configured for directing packing of one or more portions of the one or more customized food items into the one or more customized packagings, respectively.

31. The food packaging customization system of claim 1, wherein circuitry configured for controlling one or more components of a robotic packaging system to pack one or more portions of the one or more customized food items into the one or more customized packagings comprises:
circuitry configured for controlling one or more components of a robotic packaging system to place one or more portions of the one or more customized food items into at least one of one or more customized wrapping sheets or one or more customized bags.

32. The food packaging customization system of claim 1, wherein circuitry configured for controlling one or more components of a robotic packaging system to pack one or more portions of the one or more customized food items into the one or more customized packagings comprises:

circuitry configured for controlling one or more components of a robotic packaging system to deposit one or more portions of the one or more customized food items into the one or more customized packagings.

33. The food packaging customization system of claim 1, wherein circuitry configured for acquiring at least two user identifiers associated with at least two users, the at least two user identifiers including at least one identifier associated with at least one user proximate to the food packaging customization system and at least one identifier associated with at least one other user determined to be affiliated with the at least one user proximate to the food packaging customization system comprises:
  circuitry configured for detecting the at least one user in a proximity of the food packaging customization system; and
  circuitry configured for acquiring the at least one identifier associated with the at least one user in the proximity of the food packaging customization system in response to the detecting.

34. The food packaging customization system of claim 33, wherein circuitry configured for detecting the at least one user in a proximity of the food packaging customization system comprises:
  circuitry configured for detecting the at least one user approaching the food packaging customization system.

35. The food packaging customization system of claim 34, wherein circuitry configured for detecting the at least one user approaching the food packaging customization system comprises:
  circuitry configured for detecting the at least one user approaching the food packaging customization system via the food packaging customization system receiving an indication of at least one mobile device of the at least one user attempting to obtain a wireless network connection via at least one wireless access point of the food packaging customization system.

36. The food packaging customization system of claim 1, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
  circuitry configured for controlling preparation of the one or more customized food items; and
  circuitry configured for controlling generation of the one or more customized packagings for holding the one or more customized food items, the one or more customized packagings including at least the one or more features indicative of the one or more user customizations applied during the preparation of the one or more customized food items and including the at least one image identifying the at least one of the at least two users.

37. The food packaging customization system of claim 36, wherein circuitry configured for controlling preparation of the one or more customized food items comprises:
  circuitry configured for directing three-dimensional printing of the one or more customized food items in accordance with the one or more user customizations.

38. The food packaging customization system of claim 37, wherein circuitry configured for directing three-dimensional printing of the one or more customized food items in accordance with the one or more user customizations comprises:
  circuitry configured for depositing one or more ingredients to form the one or more customized food items, including at least omitting depositing of at least one ingredient to which at least one of the at least two users is allergic in accordance with the one or more user customizations.

39. The food packaging customization system of claim 36, wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users comprises:
  circuitry configured for directing generation of a plate for holding the one or more customized food items, the plate including at least the one or more features indicative of the one or more user customizations applied during preparation of the one or more customized food items; and
  circuitry configured for directing generation of a wrapper for wrapping the plate holding the one or more customized food items, the wrapper including at least the at least one image identifying the at least one of the at least two users.

40. The food packaging customization system of claim 1, wherein circuitry configured for retrieving, based at least in part on the at least two user identifiers, one or more user customizations to be applied during preparation of one or more customized food items comprises:
  circuitry configured for retrieving at least one dietary restriction related to at least one other user determined to be affiliated with the at least one user based, at least in part, on network data obtainable via at least one mobile device of the at least one user proximate to the food packaging customization system; and
  wherein circuitry configured for directing generation of one or more customized packagings for holding the one or more customized food items, the one or more customized packagings including at least one or more features indicative of the one or more user customizations applied during preparation of the one or more customized food items and including the at least one image identifying the at least one of the at least two users includes at least:
    circuitry configured for determining that the one or more customized food items have at least one ingredient included in the at least one dietary restrictions related to the at least one other user; and
    circuitry configured for directing generation of one or more customized packagings for holding the one or more customized food items, the one or more customized packagings identifying the at least one other user and including at least one warning indicative of the at least one ingredient included in the at least one dietary restriction related to at least one other user.

41. The food packaging customization system of claim 40, wherein circuitry configured for retrieving at least one dietary restriction related to at least one other user determined to be affiliated with the at least one user based, at least in part, on social networking data obtainable from at least one mobile device of the at least one user proximate to the food packaging customization system comprises:

circuitry configured for retrieving at least one dietary restriction related to at least one other user determined to be affiliated with the at least one user, the at least one dietary restriction related to the at least one other user being unknown to the at least one user, and the at least one other user not detected proximate to the food packaging customization system.

42. A food packaging customization system, comprising:

acquiring at least two user identifiers associated with at least two users, the at least two user identifiers including at least one identifier associated with at least one user proximate to the food packaging customization system and at least one identifier associated with at least one other user determined to be affiliated with the at least one user proximate to the food packaging customization system;

retrieving, based at least in part on the at least two user identifiers, one or more user customizations to be applied during preparation of one or more customized food items;

obtaining at least one image identifying at least one of the at least two users;

directing generation of one or more customized packagings for holding the one or more customized food items, the one or more customized packagings including at least one or more features indicative of the one or more user customizations applied during preparation of the one or more customized food items and including the at least one image identifying the at least one of the at least two users; and controlling one or more components of a robotic packaging system to pack one or more portions of the one or more customized food items into the one or more customized packagings, wherein at least one of the acquiring, retrieving, obtaining, directing, or controlling is at least partially implemented using at least one processing device.

43. A food packaging customization system, comprising:

at least one processing device; and one or more instructions which, when executed by the at least one processing device, cause the at least one processing device to perform one or more operations including at least:

acquiring at least two user identifiers associated with at least two users, the at least two user identifiers including at least one identifier associated with at least one user proximate to the food packaging customization system and at least one identifier associated with at least one other user determined to be affiliated with the at least one user proximate to the food packaging customization system;

retrieving, based at least in part on the at least two user identifiers, one or more user customizations to be applied during preparation of one or more customized food items;

obtaining at least one image identifying at least one of the at least two users;

directing generation of one or more customized packagings for holding the one or more customized food items, the one or more customized packagings including at least one or more features indicative of the one or more user customizations applied during preparation of the one or more customized food items and including the at least one image identifying the at least one of the at least two users; and controlling one or more components of a robotic packaging system to pack one or more portions of the one or more customized food items into the one or more customized packagings.

\* \* \* \* \*